United States Patent [19]

Trimble et al.

[11] Patent Number: 5,660,715

[45] Date of Patent: *Aug. 26, 1997

[54] APPARATUS AND METHOD FOR QUENCHING IN HYDROPROCESSING OF A HYDROCARBON FEED STREAM

[75] Inventors: Harold J. Trimble, Novato; Bruce E. Reynolds, Martinez; Robert W. Bachtel, El Cerrito; Robert J. Klett, San Francisco; David N. Brossard, Oakland; David E. Earls, Pinole, all of Calif.

[73] Assignee: Chevron U.S.A. Inc., San Francisco, Calif.

[*] Notice: The term of this patent shall not extend beyond the expiration date of Pat. No. 5,409,598.

[21] Appl. No.: 466,863

[22] Filed: Jun. 6, 1995

Related U.S. Application Data

[63] Continuation of Ser. No. 273,526, Jul. 11, 1994, Pat. No. 5,492,617, which is a continuation-in-part of Ser. No. 215,254, Mar. 21, 1994, Pat. No. 5,409,598, which is a division of Ser. No. 14,847, Feb. 8, 1993, Pat. No. 5,302,357, which is a continuation of Ser. No. 727,656, Jul. 9, 1991, abandoned, which is a division of Ser. No. 381,948, Jul. 19, 1989, Pat. No. 5,076,908.

[51] Int. Cl.$^6$ .................. C10G 11/18; C10G 35/04
[52] U.S. Cl. .................. 208/148; 208/157; 208/158; 208/165; 208/166
[58] Field of Search .................. 208/148, 158, 208/159, 160, 164, 166, 172, 176, 152, 165, 113, 157

[56] References Cited

U.S. PATENT DOCUMENTS

| 2,567,207 | 9/1951 | Hoge | 196/52 |
| 2,631,968 | 3/1953 | Peery | 196/52 |
| 2,688,401 | 9/1954 | Schmitkons et al. | 209/172 |
| 2,987,465 | 6/1961 | Johanson | 208/10 |
| 2,987,470 | 6/1961 | Turken | 208/253 |
| 3,336,217 | 8/1967 | Meaux | 208/143 |
| 3,398,085 | 8/1968 | Engle | 208/157 |
| 3,410,791 | 11/1968 | Perry et al. | 208/143 |

(List continued on next page.)

FOREIGN PATENT DOCUMENTS

| 1217756 | 2/1987 | Canada . |
| 1550285 | 8/1979 | United Kingdom . |

OTHER PUBLICATIONS

W.A. Horne and J. McAfee, "Hydrogenation of Petroleum and its Fractions" *Advances in Petroleum Chemistry and Refining*, 1960: Interscience Publishers, Inc., New York, vol. 3, p. 252.

M.C. Chervanek, et al., "H–Oil Process Treats Wide Range of Oils" *Petroleum Refiner*, Oct. 1960, p. 151.

LC–Fining in *Hydrocarbon Processing*, Sep. 1976, p. 151.

*Primary Examiner*—Glenn A. Caldarola
*Assistant Examiner*—Bekir L. Yildirim
*Attorney, Agent, or Firm*—Alan W. Klaassen

[57] ABSTRACT

This invention makes possible substantially continuous flow of uniformly distributed hydrogen and hydrocarbon liquid across a densely packed catalyst bed which substantially fills the entire volume of a reactor vessel. Catalyst are selected to be essentially the same density, shape and size at a design feed rate of liquids and gas to prevent ebullation of the packed catalyst bed at the design feed rates. The liquid and gas components of the hydrocarbon feed stream flow into the bed of catalyst and a quenching medium, which is preferably a liquid, is injected into the bed of catalyst. Injection of a liquid quench reduces the gas component of the hydrocarbon feed stream while simultaneously increasing the residence time and reducing the liquid velocity of the liquid component of the hydrocarbon feed stream within the substantially packed bed of catalyst. Injection of a liquid quench also increases penetration and contact of the liquid component into and on the surface area of the catalyst while simultaneously decreasing the viscosity of the liquid component. An apparatus for quenching in hydroprocessing of a hydrocarbon feed stream.

10 Claims, 20 Drawing Sheets

U.S. PATENT DOCUMENTS

| | | | |
|---|---|---|---|
| 3,410,792 | 11/1968 | Van Driesen et al. | 208/143 |
| 3,425,810 | 2/1969 | Scott | 23/289 |
| 3,470,090 | 9/1969 | Carson | 208/138 |
| 3,489,674 | 1/1970 | Borst | 208/108 |
| 3,523,888 | 8/1970 | Stewart et al. | 208/157 |
| 3,524,731 | 8/1970 | Effron et al. | 23/288 |
| 3,541,002 | 11/1970 | Rapp | 208/143 |
| 3,652,450 | 3/1972 | Boyd | 208/146 |
| 3,652,451 | 3/1972 | Boyd | 208/145 |
| 3,685,971 | 8/1972 | Carson | 23/288 |
| 3,705,016 | 12/1972 | Ludwigsen et al. | 23/283 |
| 3,716,478 | 2/1973 | Kodera et al. | 208/152 |
| 3,725,247 | 4/1973 | Johnson et al. | 208/111 |
| 3,728,249 | 4/1973 | Antezana et al. | 208/57 |
| 3,730,880 | 5/1973 | Van der Toorn et al. | 208/213 |
| 3,841,981 | 10/1974 | Layng | 208/48 Q |
| 3,870,623 | 3/1975 | Johnson et al. | 208/108 |
| 3,880,569 | 4/1975 | Bannister et al. | 431/4 |
| 3,880,598 | 4/1975 | van der Toorn et al. | 23/289 |
| 3,893,911 | 7/1975 | Rovesti et al. | 208/251 H |
| 3,915,847 | 10/1975 | Hutchings | 208/146 |
| 3,915,894 | 10/1975 | Clements et al. | 252/439 |
| 3,932,269 | 1/1976 | Lehman | 208/157 |
| 3,972,803 | 8/1976 | Wolk et al. | 208/97 |
| 3,977,834 | 8/1976 | Alcock et al. | 23/288 |
| 4,016,106 | 4/1977 | Sawyer et al. | 252/455 R |
| 4,051,019 | 9/1977 | Johnson | 208/146 |
| 4,059,502 | 11/1977 | James | 108/152 |
| 4,119,530 | 10/1978 | Czajkowski et al. | 208/213 |
| 4,167,474 | 9/1979 | Sikonia | 208/140 |
| 4,172,024 | 10/1979 | Simone et al. | 208/10 |
| 4,188,283 | 2/1980 | Czajkowski et al. | 208/143 |
| 4,212,835 | 7/1980 | Koros | 261/116 |
| 4,213,850 | 7/1980 | Riddick, Jr. et al. | 208/216 R |
| 4,217,206 | 8/1980 | Nongbri | 208/251 H |
| 4,259,294 | 3/1981 | Van Zijill Langhout et al. | 422/190 |
| 4,287,088 | 9/1981 | Sirkar | 252/414 |
| 4,312,741 | 1/1982 | Jacquin | 208/11 LE |
| 4,344,840 | 8/1982 | Kunesh | 208/59 |
| 4,392,943 | 7/1983 | Euzen et al. | 208/152 |
| 4,398,852 | 8/1983 | Milligan | 406/47 |
| 4,411,768 | 10/1983 | Unger et al. | 208/59 |
| 4,411,771 | 10/1983 | Bambrick et al. | 208/112 |
| 4,422,960 | 12/1983 | Shiroto et al. | 502/206 |
| 4,444,653 | 4/1984 | Euzen et al. | 208/152 |
| 4,481,105 | 11/1984 | Chou | 208/254 |
| 4,502,946 | 3/1985 | Pronk | 208/152 |
| 4,571,326 | 2/1986 | Bischoff et al. | 422/207 |
| 4,576,710 | 3/1986 | Nongbri et al. | 208/58 |
| 4,590,045 | 5/1986 | van der Wal et al. | 422/216 |
| 4,639,354 | 1/1987 | Bischoff et al. | 422/140 |
| 4,684,456 | 8/1987 | Van Driesen et al. | 208/143 |
| 4,685,842 | 8/1987 | Smith et al. | 406/106 |
| 4,687,382 | 8/1987 | Smith | 406/168 |
| 4,716,142 | 12/1987 | Laine et al. | 502/220 |
| 4,725,571 | 2/1988 | Tuszynski | 502/220 |
| 4,738,770 | 4/1988 | Hastings et al. | 208/152 |
| 4,744,837 | 5/1988 | Van Driesen et al. | 208/152 |
| 4,753,721 | 6/1988 | McDaniel et al. | 208/143 |
| 4,767,523 | 8/1988 | Kukes et al. | 208/217 |
| 4,808,297 | 2/1989 | Chen | 208/164 |
| 4,820,676 | 4/1989 | Kukes et al. | 502/220 |
| 4,875,995 | 10/1989 | Van Driesen et al. | 208/152 |
| 4,960,571 | 10/1990 | Bhagat et al. | 422/194 |
| 4,968,409 | 11/1990 | Smith | 208/157 |
| 5,008,003 | 4/1991 | Smegal et al. | 208/254 H |
| 5,021,147 | 6/1991 | Van Driesen et al. | 208/152 |
| 5,045,518 | 9/1991 | Heinerman et al. | 602/216 |
| 5,076,908 | 12/1991 | Stangeland et al. | 208/148 |
| 5,098,230 | 3/1992 | Scheuerman | 406/143 |
| 5,100,629 | 3/1992 | Tampa | 422/392 |
| 5,209,840 | 5/1993 | Sherwood, Jr. et al. | 208/210 |
| 5,232,673 | 8/1993 | Notestein | 422/216 |
| 5,308,476 | 5/1994 | Buttke | 208/147 |

APPARATUS AND METHOD FOR QUENCHING IN HYDROPROCESSING OF A HYDROCARBON FEED STREAM

This is a continuation of U.S. application Ser. No. 08/273,526, filed Jul. 11, 1994, now U.S. Pat. No. 5,492,617, which is a continuation in part of U.S. application Ser. No. 08/215,254, filed Mar. 21, 1994, now U.S. Pat. No. 5,409,598, which is a divisional of U.S. application Ser. No. 08/014,847, filed Feb. 8, 1993, now U.S. Pat. No. 5,302,357, which is a continuation of U.S. application Ser. No. 07/727,656, filed Jul. 9, 1991, now abandoned, which is a divisional of U.S. application Ser. No. 07/381,948, filed Jul. 19, 1989, now U.S. Pat. No. 5,076,908. Benefit of the earliest filing date is claimed, especially with respect to all common subject matter.

BACKGROUND OF THE INVENTION

1. Field of the Invention

The present invention relates to an apparatus and method for quenching, and to an on-stream catalyst replacement during hydroprocessing of a hydrocarbon feed stream.

More particularly, the present invention provides for an apparatus and method for quenching in hydroprocessing of a hydrocarbon feed stream through a hydroprocessing vessel and for economically utilizing space within the hydroprocessing vessel over a wide range of processing rates without substantial fluidization or ebullation of a packed bed of catalyst during high counterflow rates of the hydrocarbon feed and a hydrogen containing gas through the packed bed, while maintaining continuous or intermittent replacement of catalyst for plug-like flow of the bed through the vessel. Such plug flow with high processing rates is obtained by selecting the size, shape and density of the catalyst particles to prevent ebullation and bed expansion at the design flow rate so as to maximize the amount of catalyst in the vessel during normal operation and during catalyst transfer. Catalysts are of uniform or substantially the same size, shape and density and are selected by measuring bed expansion, such as in a large pilot plant run, with hydrocarbon, hydrogen and catalyst at the design pressures and flow velocities within the available reaction volume of the vessel. Catalyst is removed from the bed by laminar flow of the catalyst particles in a liquid slurry system in which the liquid flow line is uniform in diameter, and substantially larger than the catalyst particles, throughout the flow path between the reactor vessel and a pressurizable vessel including passageways through the flow control valves.

2. Description of the Prior Art

Hydroprocessing or hydrotreatment to remove undesirable components from hydrocarbon feed streams is a well known method of catalytically treating such heavy hydrocarbons to increase their commercial value. "Heavy" hydrocarbon liquid streams, and particularly reduced crude oils, petroleum residua, tar sand bitumen, shale oil or liquified coal or reclaimed oil, generally contain product contaminants, such as sulfur, and/or nitrogen, metals and organo-metallic compounds which tend to deactivate catalyst particles during contact by the feed stream and hydrogen under hydroprocessing conditions. Such hydroprocessing conditions are normally in the range of 212 degree(s) F. to 1200 degree(s) F. (100 degree(s) to 650 degree(s) C.) at pressures of from 20 to 300 atmospheres. Generally such hydroprocessing is in the presence of catalyst containing group VI or VIII metals such as platinum, molybdenum, tungsten, nickel, cobalt, etc., in combination with various other metallic element particles of alumina, silica, magnesia and so forth having a high surface to volume ratio. More specifically, catalyst utilized for hydrodemetallation, hydrodesulfurization, hydrodenitrification, hydrocracking etc., of heavy oils and the like are generally made up of a carrier or base material; such as alumina, silica, silica-alumina, or possibly, crystalline aluminosilicate, with one more promoter(s) or catalytically active metal(s) (or compound(s)) plus trace materials. Typical catalytically active metals utilized are cobalt, molybdenum, nickel and tungsten; however, other metals or compounds could be selected dependent on the application.

Because these reactions must be carried out by contact of a hydrogen-containing gas with the hydrocarbon feed stream at elevated temperatures and pressures, the major costs of such processing are essentially investment in vessels and associated furnaces, heat exchangers, pumps, piping and valves capable of such service and the replacement cost of catalyst contaminated in such service. Commercial hydroprocessing of relatively low cost feed stocks such as reduced crude oils containing pollutant compounds, requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand corrosion and metal embrittlement by the hydrogen and sulfur compounds, while carrying out the desired reactions, such as demetallation, denitrification, desulfurization, and cracking at elevated pressure and temperatures. For example, because of metallurgy and safety requirements, such vessels may cost on the order of $700.00 per cubic foot of catalyst capacity. Thus a vessel capable of handling 25,000 barrels per day of a hydrocarbon feed stream may run on the order of $4,000,000 to $5,000,000. Pumps, piping and valves for handling fluid streams containing hydrogen at such pressures and temperatures are also costly, because at such pressures seals must remain hydrogen impervious over extended service periods of many months.

Further, hydroprocessing catalyst for such a reactor, which typically contains metals such as titanium, cobalt, nickel, tungsten, molybdenum, etc., may involve a catalyst inventory of 500,000 pounds or more at a cost of $2 to $4/lb. Accordingly, for economic feasibility in commercial operations, the process must handle high flow rates and the vessel should be filled with as much catalyst inventory as possible to maximize catalyst activity and run length. Additionally, the down-time for replacement or renewal of catalyst must be as short as possible. Further, the economics of the process will generally depend upon the versatility of the system to handle feed streams of varying amounts of contaminants such as sulfur, nitrogen, metals and/or organic-metallic compounds, such as those found in a wide variety of the more plentiful (and hence cheaper) reduced crude oils, residua, or liquified coal, tar sand bitumen or shale oils, as well as used oils, and the like. The following three acceptable reactor technologies are currently available to the industry for hydrogen upgrading of "heavy" hydrocarbon liquid streams: (i) fixed bed reactor systems; (ii) ebullated or expanded type reactor systems which are capable of onstream catalyst replacement and are presently known to industry under the trademarks H-Oil$_R$ and LC-Fining$_R$; and (iii) the substantially packed-bed type reactor system having an onstream catalyst replacement system, as more particularly described in U.S. Pat. No. 5,076,908 to Stangeland et al, having a common assignee with the current inventions and discoveries.

A fixed bed reactor system may be defined as a reactor system having one or more reaction zone(s) of stationary catalyst, through which feed streams of liquid hydrocarbon and hydrogen flow downwardly and concurrently with respect to each other.

An ebullated or expanded bed reactor system may be defined as a reactor system having an upflow type single reaction zone reactor containing catalyst in random motion in an expanded catalytic bed state, typically expanded from 10% by volume to about 35% or more by volume above a "slumped" catalyst bed condition (e.g. a non-expanded or non-ebullated state).

As particularly described in U.S. Pat. No. 5,076,908 to Stangeland et al., the substantially packed-bed type reactor system is an upflow type reactor system including multiple reaction zones of packed catalyst particles having little or no movement during normal operating conditions of no catalyst addition or withdrawal. In the substantially packed-bed type reactor system of Stangeland et al., when catalyst is withdrawn from the reactor during normal catalyst replacement, the catalyst flows in a downwardly direction under essentially plug flow or in an essentially plug flow fashion, with a minimum of mixing with catalyst in layers which are adjacent either above or below the catalyst layer under observation.

Of the three acceptable reactor systems, most hydroconversion reactor systems presently in operation on a worldwide basis are fixed bed reactors wherein a liquid hydrocarbon feed and a hydrogen stream flow concurrently through the catalyst beds in a downward flow path. While these fixed bed downflow type processes assure maximum density or volume of catalyst within a reaction zone without expansion of the bed, they are limited by the tendency of the catalyst to form local deposits of feed metals and other contaminates, particularly in the top catalyst bed (i.e. first reaction zone), affecting distribution and reaction rates. As reactor average temperatures are progressively increased to maintain processing objectives under conditions of increasing local metal deposits, catalyst deactivation due to carbon deposition accelerates. When processing objectives can no longer be maintained due to catalyst deactivation (i.e. normally recognized as "End of Run" conditions), the reactor system must be taken offstream for catalyst regeneration or replacement. Accordingly, in general, it is preferred to counterflow the catalyst and process fluid streams relative to each other. However, as noted above, when the process feed rates are high, the volume of catalyst that can be contained by the vessel may be as little as 10% of the original settled volume. At lower fluid velocities, catalyst volume may be up to about 80% to 90%, but useful reaction space for the process is still wasted and turbulence causes axial mixing of the catalyst. Therefore, one particular object of the present invention is to run a counterflow processing system where the catalyst and fluid velocity combinations limit bed expansion to less than 10% by length (more preferably less than about 5% by length, most preferably less than 2% or even less than 1% by length) beyond a substantially full axial length of the bed in a packed bed state.

It is also known to use a series of individual vessels stacked one above the other, with fluid flow either co-current or counterflow to catalyst. In such a process, catalyst moves by gravity from the upper vessel to a lower vessel by periodically shutting off, or closing, valves between the individual vessels. In a counterflow system, this permits removal of catalyst from the lowermost or first stage vessel, where the most contaminated, or raw, feed stock, originally contacts the catalyst. In this way, most of the major contaminating components in the hydrocarbon stream are removed before the hydrocarbon material reaches major conversion steps of the process performed in higher vessels of the stacked series. Thus, most of the deactivating components of the feed stream are removed before it reaches the least contaminated catalyst added to the topmost vessel. However, such systems require valves suitable for closing off catalyst flow against catalyst trapped in the line. Hence, valve life is relatively short and down-time for replacement or repair of the valves is relatively costly.

Since the late 1960's, there have been several heavy oil hydroprocessing units built and brought on stream that utilize the ebullated or expanded catalyst bed reactor technology where a hydrocarbon feed stream and hydrogen gas flow upwardly through a dilute phase reaction zone of catalyst in random motion. Stated alternatively, continuous operation of an ebullated or expanded bed hydroprocessing system include the upward flow of a hydrocarbon feed stream and hydrogen gas through a single catalyst containing vessel or a series of catalyst containing vessels. Reactor liquid is recirculated internally at rates sufficient to expand or ebullate the catalyst to produce a dilute phase reaction zone of catalyst in random or ebullating motion. Catalyst is replaced by continuous or periodic, onstream removal of catalyst from the vessel followed by addition. As noted above, such ebullation tends to increase the fluid volume in the vessel relative to catalyst volume necessary to hydroprocess the feed stream and hydrogen with the catalyst, with adequate contact time to react the fluids. Further, such ebullated beds tend to result in separation or segregation of "fines" from the larger (and heavier) particles as they pass downwardly through the upflow streams. As frequently happens, and especially where the catalyst is locally agitated, as by eddy currents, the particles tend to abrade by such higher flow rates of the feed streams through the ebullating bed. Depending on the size of the fines, they either travel upward where they contaminate the product or they tend to accumulate in the reactor because they cannot work their way down to the bottom of the bed. Such counterflow systems have also been used because of the relative ease of withdrawing limited amounts of the ebullated catalyst in a portion of the reacting hydrocarbon and hydrogen fluids, particularly where such turbulent flow of the catalyst is needed to assist gravity drainage through a funnel-shaped opening into a central pipe at the bottom of a vessel.

While it has been proposed heretofore to use plug-flow or packed-bed flow of catalyst to reduce such agitation and thus assure uniform disbursement of hydrogen throughout the liquid volume flowing upwardly through the catalyst bed, in general such flow has been controlled by limiting the maximum flow rate that can be tolerated without ebullating or levitating the bed more than about 10%. Further in prior systems where expansion of the bed is limited, hydrogen flow rates are made sufficiently high at the bottom of the bed to assure relative turbulence of the catalyst at the withdrawal point in the vessel. While this does assure such turbulence, it also wasts space, damages the catalyst and permits direct entrainment of hydrogen with catalyst entering the withdrawal tube. Such turbulent flow of catalyst is apparently necessary to assist gravity removal of catalyst from the vessel.

The basic process design of the ebullated bed reactors with appropriate mechanical features overcome some of the limitations of the conventional fixed bed reactor. The ebullated or expanded catalyst bed reactor schemes provide ability to replace catalyst on stream and operate with a very "flat" reaction zone temperature profile instead of the steeper pyramiding profile of conventional fixed bed reactors. The nature of the process, with a broad spectrum of catalyst size, shape, particle density, and activity level in random motion in a "dilute phase reaction zone," creates near isothermal temperature conditions, with only a few degrees temperature rise from the bottom to the top of the reaction zone. Quench fluids are not normally required to limit reaction rates except in cases when series reactors are applied. In other words, the reactor internal recycle oil flow, used to expand (or ebullate) the catalyst bed and maintain distribution (typically 10 to 1 ratio of fresh oil feed) serves also as "internal quench" to control reaction rate and peak operating temperatures. Because the highest temperatures experienced in the reactors are only a few degrees above the average temperature required to maintain processing objectives and not the higher "end of run" peak temperatures experienced in fixed bed reactor systems, the accelerated fouling rate of the catalyst by carbon deposition experienced in conventional fixed bed reactor systems at "end of run" conditions is minimized; however, the normal carbon deposition rate is much greater than that of the fixed bed reactor due to overall operating conditions.

Unfortunately, implementing the ebullated bed technology results in inefficient use of reactor volume and less than optimum usage of hydroconversion catalyst. Catalyst replacement rates for ebullated bed reactors are based on maintaining "catalyst equilibrium conditions" necessary to maintain processing objectives. The backmixing nature of ebullated catalyst beds, combined with the characteristics of the typical extrudate catalyst particulate used (i.e. a full range of sizes and shapes), promote isothermal temperature conditions but create selectivity difficulties in regard to the withdrawal of expended catalyst. Fresh or partially expended catalyst commingle with expended catalyst withdrawn from the bottom of the catalyst bed requires complicated procedures and equipment to recover, and are usually discarded with minimum recovery value. In other words, use of various size and shape catalyst in ebullated bed type reactors leads to somewhat inefficient use of catalyst value.

The additional reactor volume required for the ebullated bed process is to accommodate the expansion of the catalyst load by 25–35% of its original slumped (or "packed bed") volume or height, by controlling the velocity of an internal liquid recycle stream. Space required within an ebullated bed reactor for the disengagement of solids and catalyst bed level controls, and the space required to satisfy suction conditions for the reactor internal recycle pump, combined with the space the pump suction line occupies, consumes a substantial amount of space available within the ebullated bed reactor. Additional disadvantages of the ebullated bed technology are the added cost, maintenance, and the reliability of a single supply source for the reactor recycle pump which is required to expand the catalyst bed. In order to compare efficient use of reactor volume purchased, the following examples are offered.

If ebullating bed reactor technology is implemented and 13-foot diameter reactors are selected, the tangent line to tangent line dimensions required for the 13-foot diameter reactors would be approximately 60 feet in order to load approximately 5,000 cubic feet (or about 175,000 lb) of typical hydroprocessing catalyst. Thus, the 5,000 cubic feet of catalyst occupies about 63% by volume of the approximately 7,900 cubic feet of reactor volume available between the bottom and top tangent line of the reactor. In the case of fixed bed reactors, in order to load 5,000 cubic feet of typical hydroprocessing catalyst in 13-foot diameter reactors would require tangent line to tangent line dimensions for the 13-foot diameter reactors of about 43 feet; however, the operating run length for the fixed bed reactors would be short as catalyst could not be replaced on stream. Should the 60-foot tangent line to tangent line dimensions required for the ebullated bed reactors be maintained for a fixed bed reactor, an additional catalyst volume of approximately 2000 cubic feet could be loaded.

In order to load 5,000 cubic feet of typical hydroprocessing catalyst in a 13-foot diameter bed reactor with the broad features and descriptions as disclosed in U.S. Pat. No. 5,076,908 to Stangeland et al, would require tangent line to tangent line dimensions of approximately 41 feet. There would be a reduction of reactor empty weight of between 100 to 200 tons, depending on the design pressure specification. Should the 60-foot tangent line to tangent line dimensions for a Stangeland et al reactor be maintained, an additional catalyst volume of approximately 2500 cubic feet could be loaded.

As particularly distinguished from prior known methods of on-stream catalyst replacement in hydroprocessing, the method and apparatus in U.S. Pat. No. 5,076,908 to Stangeland et al more specifically provides a system wherein plug flow of the catalyst bed is maintained over a wide range of counterflow rates of a hydrocarbon feed stream and hydrogen gas throughout the volume of the substantially packed catalyst bed. Such packed bed flow maintains substantially maximum volume and density of catalyst within a given vessel's design volume by controlling the size, shape and density of the catalyst so that the bed is not substantially expanded at the design rate of fluid flow therethrough. The proper size, shape and density are determined by applying coefficients gained during extensive studying of bed expansion in a large pilot plant runs with hydrocarbon, hydrogen and catalyst at the design pressures and flow velocities as particularly described below.

To further control such packed bed flow, the bed level of catalyst within the vessel is continuously measured, as by gamma ray absorption, to assure that little ebullation of the bed is occurring. Such control is further promoted by evenly distributing both the hydrogen and liquid feed throughout the length of the bed by concentrically distributing both the hydrogen gas component and the hydrocarbon fluid feed component in alternate, concentric annular paths across the full horizontal cross-sectional area of the vessel as they both enter the catalyst bed. Additionally, and as desirable, hydrogen is evenly redistributed and if needed, augmented, through a quench system at one or more intermediate levels along the length of the catalyst bed. Equalizing hydrogen and liquid feed across the full horizontal area along the length of the packed particle bed prevents local turbulence and undesirable vertical segregation of lighter particles from heavier particles flowing in a plug-like manner downwardly through the vessel.

Further in accordance with the method that is more particularly disclosed and described in U.S. Pat. No. 5,076, 908 to Stangeland et al, a system for replacing catalyst during continuing operation of the non-ebullating bed is assisted by carrying out the process at relatively high liquid feed rates, even without ebullation of the bed. In a preferred form, the catalyst transfer system includes an inverted J-tube as the withdrawal tube, so that the tube opens downwardly adjacent the center of the lower end of the vessel and directly above a center portion of the surrounding annular flow paths of liquid and gas into the catalyst bed. Thus, the intake for catalyst is out of the direct flow of such streams, and particularly the gas flow. In such a preferred form the annular flow paths are through a conical or pyramidal screen, or perforated plate, which supports the bed or column of catalyst across the vessel through a plurality of radially spaced apart and axially elongated concentric rings, or polygons, supported by radial arms extending from the center of the vessel to the cylindrical side wall of the vessel. Each ring is formed by a pair of peripheral members extending between the radial arms directly under the conical screen so that this forms a circular gas pocket at the upper level in each ring so that between each pair of said peripheral members alternate rings of gas and hydrocarbon liquid enter the bed simultaneously.

In accordance with a further preferred form of the method and apparatus that is more particularly disclosed and described in Stangeland et al, catalyst is both withdrawn from the bed and added to the vessel under laminar flow conditions as a liquid slurry to avoid abrasion and size segregation of particles during such transfer. Both the supply and withdrawal flow lines have a minimum diameter of at least five times and, preferably more than twenty times, the average diameter of the catalyst particles. Further, the flow lines are of uniform diameter throughout their length from either the catalyst supply chamber to the vessel, or from the vessel to the receiving chamber, including the through bore of a rotatable ball of the isolating, pressure control valves, known commercially as "full-port valves". Additionally, in each case a flush line is connected to the flow line between the isolating valve and the reactor vessel so that liquid hydrocarbon may be used to flush the line of catalyst or catalyst fines if necessary, before the valve ball is closed. Preferably, but not necessarily, the withdrawal line may include means for flowing auxiliary hydrogen back into the reactor through the withdrawal tube to prevent coking due to hydrogen starvation near or in the withdrawal tube.

The prior art does not disclose or suggest the above enumerated and pertinent features of either the total system or significant portions of such a system in U.S. Pat. No. 5,076,908 to Stangeland et al, as disclosed by the following patents:

Jacquin et al. U.S. Pat. No. 4,312,741, is directed toward a method of on-stream catalyst replacement in a hydroprocessing system by controlling the feed of hydrogen gas at one or more levels. Catalyst, as an ebullated bed counterflows through the reactor but is slowed at each of several levels by horizontally constricted areas which increase the hydrogen and hydrocarbon flow rates to sufficiently locally slow downward flow of catalyst. While local recycling thus occurs at each such stage, rapid through-flow of fresh catalyst, with resultant mixing with deactivated or contaminated catalyst, is suppressed. The ebullating bed aids simple gravity withdrawal of catalyst from the vessel. Improvement of the disclosed system over multiple vessels with valves between stages is suggested to avoid the risk of rapid wear and deterioration of valve seals by catalyst abrasion.

Kodera et al. U.S. Pat. No. 3,716,478, discloses low linear velocity of a mixed feed of liquid and $H_2$ gas to avoid expansion (or contraction) of catalyst bed. By low linear velocity of fluid upflow, gas bubbles are controlled by flow through the packed bed, but the bed is fluidized by forming the bottom with a small cross-sectional area adjacent the withdrawal tube. This assists discharge of catalyst without backmixing of contaminated catalyst with fresh catalyst at the top of the single vessel. The range of the bed level in the vessel is from 0.9 to 1.1 of the allowable bed volume (±10%) due to fluid flow through the bed. A particular limitation of the system is that flow of the fluids undergoing catalytic reaction is restricted to a rate that will not exceed such limits, but must be adequate to ebullate the bed adjacent the catalyst withdrawal tube. Alternatively, injection of auxiliary fluid from a slidable pipe section is required. The patentees particularly specify that the diameter of the lower end of the vessel is smaller to increase turbulence and ebullation of catalyst adjacent the inlet to the catalyst withdrawal line. Fluidization of catalyst is accordingly indicated to be essential to the process. However the disclosed gas flow rates are well below commercial flow rates and there is no suggestion of temperatures or pressures used in the tests or the size, density or shape of the catalyst.

Bischoff et al, U.S. Pat. No. 4,571,326, is directed to apparatus for withdrawing catalyst through the center of a catalyst bed counterflowing to a liquid hydrocarbon and gas feed stream. The system is particularly directed to arrangements for assuring uniform distribution of hydrogen gas with the liquid feed across the cross-sectional area of the bed. Such uniform distribution appears to be created because the bed is ebullating under the disclosed conditions of flow. Accordingly, considerable reactor space is used to initially mix the gas and hydrocarbon liquid feeds in the lower end of the vessel before flowing to other bottom feed distributors. The feeds are further mixed at a higher level by such distributor means in the form of "Sulzer Plates" or a "honeycomb" of hexagonal tubes beneath a truncated, conical, or pyramidal-shaped funnel screen. The arrangement may include an open ramp area parallel to the underside of the screen between the tube or plate ends. Further, to maintain gas distribution along the length of the catalyst bed, quench gas is supplied through upflowing jets in star-shaped or annular headers extending across middle portions of the vessel. The arrangement for withdrawal of spent catalyst requires ebullation of at least the lower portion of the bed. As noted above, added vessel space for uniform mixing of hydrogen and feed before introducing the fluids into an ebullated bed, as well as an ebullating bed, increases the required size of the hydroprocessing vessel, increases catalyst attrition, increases catalyst bed mixing and substantially increases initial, and continuing operating costs of the system.

Bischoff et al. U.S. Pat. No. 4,639,354, more fully describes a method of hydroprocessing, similar to U.S. Pat. No. 4,571,326 wherein similar apparatus obtains uniform ebullation through the vertical height of a catalyst bed, including a quench gas step.

Meaux U.S. Pat. No. 3,336,217, is particularly directed to a catalyst withdrawal method from an ebullating bed reactor. In the system, catalyst accumulating at the bottom of a vessel and supported on a flat bubble-tray may be withdrawn through an inverted J-tube having a particular ratio of the volume of the short leg of the J-tube to the longer leg.

The diameter of the J-tube is suited only to flow of catalyst from a body of catalyst ebullated by the upflowing hydrocarbon feed and gas.

U.S. Pat. Nos. 4,444,653 and 4,392,943, both to Euzen, et al., disclose removal systems for catalyst replacement in an ebullating bed. In these patents, the fluid charge including hydrocarbon containing gas is introduced by various arrangements of downwardly directed jets acting laterally against or directly onto the conical upper surface of the bed support screen or screens. Alternatively, the feed is introduced through a conical screen after passing through a distributor arrangement of tortuous paths or a multiplicity of separate tubes to mix the gas and liquid feed over the conical screen. Such arrangements use a considerable volume of the pressure vessel to assure such mixing.

U.S. Pat. Nos. 3,730,880 and 3,880,569, both to Van der Toorn, et al., disclose a series of catalytic reactors wherein catalyst moves downwardly by gravity from vessel to vessel through check valves. As noted above, such valves require opening and closing to regulate the rate of flow, or to start and stop catalyst transfer, with catalyst in the valve flow path. Feed of process fluids is either co-current or counter-current through the catalyst bed.

Van ZijllLanghaut et al. U.S. Pat. No. 4,259,294, is directed to a system for on-stream catalyst replacement by entrainment of the catalyst in oil pumped as a slurry either to withdraw catalyst from or to supply fresh catalyst to, a reactor vessel. Reacting feed is suggested to be either co-current or countercurrent with catalyst flow through the reactor. Valves capable of closing with catalyst in the line, or after back-flow of slurry oil, are required to seal off the catalyst containing vessel at operating temperatures and pressures from the receiving reactor vessel, or isolate the catalyst receiving lock hopper from the withdrawal section of the vessel.

Carson U.S. Pat. No. 3,470,090, and Sikama U.S. Pat. No. 4,167,474, respectively illustrate multiple single bed reactors and multi-bed reactors in which catalyst is replaced either continuously or periodically. The feed and catalyst flow co-currently and/or radially. Catalyst is regenerated and returned to the reactor, or disposed of. No catalyst withdrawal system is disclosed apart from either the configuration of the internal bed support or the shape of the vessel bottom to assist gravity discharge of catalyst.

One of the basic principles and teachings of Stangeland et al in U.S. Pat. No. 5,076,908, is that by specifically selecting the size, shape, and density of the catalyst pellets, combined with appropriate control of process liquid and gas velocities, random motion and backmixing of the catalyst can be minimized, and plugflow characteristics of the catalyst downward and the liquid and gas flows upward, maximized. Stangeland et al economically utilizes space within a hydroprocessing vessel over a wide range of processing rates without substantial random motion or ebullation of a packed bed of catalyst during high counterflow rates of the hydrocarbon feed and a hydrogen containing gas through the packed bed, while maintaining continuous or intermittent replacement of catalyst for plug-like flow of the bed through the vessel. Such plug flow with high processing rates is obtained by Stangeland et al by selecting the size, shape and density of the catalyst particles to prevent ebullation and bed expansion at the design flow rate so as to maximize the amount of catalyst in the vessel during normal operation and during catalyst transfer. Catalysts are selected utilizing data gained while studying catalyst bed expansion, such as in a large pilot plant run, with hydrocarbon, hydrogen and catalyst at the design pressures and flow velocities within the available reaction volume of the vessel. Catalyst is removed from the bed by Stangeland et al through laminar flow of the catalyst particles in a liquid slurry system in which the liquid flow line is uniform in diameter, and substantially larger than the catalyst particles, throughout the flow path between the reactor vessel and a pressurizable vessel including passageways through the flow control valves.

Experience in practicing the principles and teachings of Stangeland et al, U.S. Pat. No. 5,076,908 has demonstrated maximum utilization of available reactor volume, operability of reactors with feed upflowing through dense phase "packed catalyst beds," and the ability to replace catalyst on stream. Catalyst selection by size, shape and density of catalyst particles to fit each unique processing case has been validated as a key element in optimizing performance of an upflow type hydroprocessing reactor, regardless if "packed bed" or "expanded bed" reaction zones are involved.

In other words, through experience with same or uniform size, shape and density catalyst, additional technical advantages and opportunities have been discovered to further enhance performance and maximize catalyst life—not obtainable when random particle size catalyst is used in units where catalyst is replaced on stream. Therefore, a particular object of the present invention is to extend the life,of hydroprocessing catalyst from a hydroconversion reaction zone. Experience in practicing the principles and teachings of Stangeland et al has also demonstrated that when operating on once through catalyst replacement mode, the temperature profile in the final reaction zone (i.e. the freshest most active catalyst) could affect catalyst fouling rate by carbon deposition. The present invention provides for a method to adjust catalyst activity profile (i.e. temperature profile) in order to more favorably enhance overall hydroconversion reactor performance, thus optimizing reactor performance and extending the life of the hydroprocessing catalyst in the hydroconversion reactor.

It is well known to those skilled in the art of hydrogen upgrading of heavy hydrocarbon streams in certain types of bed reactor systems that interstage quenching is required between multi-catalyst bed reaction zones for temperature control. Typically, the temperature of a first reaction zone in multi-catalyst bed reaction zones is controlled by the feed heater outlet/reactor inlet temperature, and the temperature of each succeeding reaction zone is controlled by an injection of a quench medium at the exit of a preceding zone.

Quench gas has historically been the cooling medium of choice for most fixed bed or packed bed reactor systems that are presently operating onstream or are in preliminary engineering stages. The genesis of quench gas for utilization as a cooling medium in a hydroprocessing system is normally from a discharge of a hydroprocessing system's recycle hydrogen compressor, except in a few special applications where fresh high-purity make-up hydrogen may be selected. While quenching with gas performs the necessary function of reactor temperature profile control and also serves to replenish hydrogen chemically consumed by the process, in some applications it is not always the most suitable quenching medium available. In the case for the substantially packed bed of hydroprocessing catalyst of the present invention, one major process objective would be to minimize random movement and/or prevent ebullation of the catalyst pellets.

U.S. Pat. No. 5,076,908 to Stangeland et al. teaches the injection of quench gas to control the temperature profile of the reaction zones within the reactor. By carefully selecting an appropriate and essentially the same size, shape, and density of catalyst, and setting up appropriate process conditions regarding oil feed and hydrogen velocity, viscosity and density, predictable "subsequently packed catalyst bed" conditions can be achieved and assured in the lower reaction zone of an upflow substantially packed bed reactor with associated countercurrent plug flow (also referred to as piston flow) catalyst movement. Those skilled in the art of design and/or operational behavior of upflow-type reactor systems, of either packed bed type or ebullated bed type, will recognize that the three major influences to catalyst movement behavior within a hydroprocessing reactor are as follows: (1) catalyst pellet size, shape, and density; (2) liquid velocity, viscosity, and density; and (3) gas velocity and density.

One factor which disturbs process operating balances within a hydroprocessing reactor and causes gas to "channel" the catalyst, or causes catalyst to be ebullated into random motion, is gas velocity increase in reaction zones above each gas quench injection point within the catalyst bed of a hydroprocessing reactor. A hydroprocessing reactor containing four reaction zones, for example, would probably have three quench gas injection points or levels. If the hydroprocessing process is set up to accomplish substantial hydrogen upgrading, exothermal heat rise across each reaction zone will dictate that substantial quench gas flows or quantities be injected in excess of any hydrogen gas being consumed by the hydroprocessing process in order to control the desired reactor temperature profile. As the quench gas injected combines with the original hydrogen feed gas and any gas produced by hydrogenation reactions within the catalyst bed of the reactor, the gas superficial velocity increases in each succeeding reaction zone approaching the top of the hydroprocessing reactor. Stated alternatively, the velocity of gas flowing upwardly through the hydroprocessing reactor and along the axial length of the catalyst bed accelerates as quench gas is injected into the catalyst bed at desired levels therein to satisfy cooling requirements for reactor temperature profile control.

When fresh catalyst is first loaded into the top reaction zone of an upflow packed bed reactor (with countercurrent catalyst movement) such as that disclosed in U.S. Pat. No. 5,076,908 to Stangeland et al, the catalyst is at its lowest density level and most vulnerable to radical or unpredictable movement at higher gas velocities. The catalyst in the lower reaction zones are spent catalyst with a higher density level and possesses a more predictable catalytic movement. For example, assuming all other process variables are more or less the same except for gas velocity, appropriately sized and shaped spent catalyst pellets at their highest density at the bottom of a hydroprocessing reactor might be able to tolerate superficial gas velocities in the range of about 0.16 foot per second and still remain in a substantially packed, non-ebullated condition. This same catalyst pellets in their freshest, least dense condition at the top of the reactor might only be able to tolerate gas superficial velocity in the range of about 0.11 foot per second without being ebullated or otherwise expanded into random motion or experiencing "channeling".

In an upflow packed bed type reactor, ebullation or expansion of the catalyst into random motion is known by those skilled in the art to cause higher than desirable attrition rates of the catalyst and could adversely affect distribution. "Channeling" is an undesirable phenomenon that creates serious maldistribution problems, resulting in localized hot or cold zones, effecting reactor performance and, in extreme cases, reactor safety. Extremely high catalyst attrition rates are also experienced when conditions of catalyst bed channeling exist in an upflow hydroprocessing reactor. Continuing to assume that the previously stated above superficial gas velocity tolerable limits of about 0.16 foot per second for spent catalyst at the bottom of a hydroprocessing reactor and about 0.11 foot per second for fresh catalyst at the top of the reactor are viable for exemplary purposes only, the design criteria of an upflow substantially packed catalyst bed hydroprocessing reactor accomplishing substantial hydrogen upgrading, must consider the influence of upwardly pyramiding (or accelerating) superficial gas velocity through the reaction zones and along the axial length of the catalyst bed. For example, if the design basis hydrogen feed rate is set to maintain superficial gas velocity of about 0.10 foot per second at the inlet to the first reaction zone in the bottom of the hydroprocessing reactor, the accumulative effect of quench gas, manufactured gas, and vaporization can increase the superficial gas velocity in the final reaction zone in the top of the hydroprocessing reactor to a velocity in excess of tolerable limits and "substantially packed bed" conditions will be substantially disturbed. If protective counteractions are taken by reducing the design basis hydrogen feed rate into the first reaction zone, capacity and economics of design would be compromised.

A more acceptable design protective counteraction, and a method normally selected, is to reduce the quench gas flow as low as possible and operate with a maximum tolerable temperature rise between the feed inlet to the first reaction zone and the temperature of the effluent from the final reaction zone. While this type of design protective counteraction is a viable solution, there is an economical price to be paid in terms of catalyst replacement rate.

It is a known phenomenon to those skilled in the art that fresh hydrogenation catalyst will experience abnormally high carbon deposition fouling rates during its early life in a hydroprocessing reactor. The rate of fouling during this period of high activity level is greatly influenced by temperatures that the catalyst is subjected to and the period of time the catalyst is in residence in high temperature zones. By lowering the temperature in reaction zones where fresh highly active catalyst is in residence, the useful life of the catalyst will be enhanced or extended. Therefore, while minimizing quench gas injection and operating with a steep reactor temperature profile is considered to be a viable solution, it is not the optimum solution regarding catalyst usage and life because of the high temperature exposure to the fresh catalyst.

It has now been discovered that a major potential bottleneck to economical design can be overcome, operability enhanced, and catalyst attrition (a direct influence to catalyst life) minimized by shifting part of, or in some cases all of the interstage quench fluid cooling load from recycle gas to process liquid that has been recovered and preferably cooled. By selecting quench liquids not subject to excessive vaporization at reactor conditions, overall gas velocity upwards through the reactor can be substantially reduced. Instead of a gas profile of increasing gas velocity through the upper reaction zones of a substantially packed bed reactor, the gas velocity can be regulated within a narrow range which would be more compatible to maintaining "substantially packed bed" conditions by maintaining the appropriate balance of gas and liquid quench flows. In other words, starting with an assumed gas superficial velocity of about 0.10 foot per second into the first reaction zone, the hydrogen chemically consumed might reduce the gas superficial velocity at the outlet of the final reaction zone to about 0.08 foot per second, were it not influenced or replenished by gas produced within the reactor vessel by the hydrogenating process, and additional recycle hydrogen injected for interstage quenching. Depending on the severity of the application and other process condition factors, the gas produced within the reactor might replenish about 0.015 to 0.025 foot per second superficial gas velocity, or more or less maintain the original gas velocity of about 0.10 foot per second through all reaction zones. Total quench gas requirements for "heat sink" to remove the heat of reaction and control the desired reactor temperature profile, might add about 0.02 foot per second, increasing the superficial gas velocity in the final reaction zone to about 0.12 foot per second. If only enough gas quench is injected into the catalyst bed to maintain optimum hydrogen partial pressure conditions, the overall superficial gas velocity could be regulated to less than about 0.107 foot per second. The balance of quench fluid required for temperature control would be from a liquid quench supply. Because the quenching liquid selected should not be subject to significant vaporization at reactor conditions, the ability to control the reactor temperature profile at optimum conditions regarding catalyst fouling rates is not restricted by gas velocity criterion. By operating at higher temperatures in the lower sections of an upflow packed bed reactor, more work that creates exothermic temperature rise is accomplished in these lower sections with catalyst suitably aged or conditioned so as not to experience high carbon deposition rates as that for fresh catalyst. A "flatter reactor temperature profile" can be achieved that will extend catalyst life.

Those skilled in the art of hydroprocessing in upflow type reactors, will also recognize the benefits of reducing superficial gas velocity as it relates to bubble size and gas holdup, yielding an increased liquid residence time and lower liquid space velocity. Oil penetration to the internal surface area of catalyst pellets will be enhance by the overall decrease in oil viscosity in the upflow reaction zones, influenced by the lighter, less viscous quench liquid. The lighter, less viscous liquid will also affect fluidization coefficients in a favorable manner, minimizing the potential of ebullating the catalyst into random motion, thereby minimizing the attrition rate. In the case of two or more upflow packed-bed type reactors in series performing substantial hydrogen upgrading, the benefits of minimizing gas velocity through the reaction zones becomes more pronounced.

The prior art does not teach or suggest any of the particular methods and/or systems of the present invention for quenching in hydroprocessing of a hydrocarbon feed stream, and for extending a life of hydroprocessing catalyst in a hydroconversion reactor, especially a life of a substantially packed bed of hydroprocessing catalyst which is plug-flowing downwardly (or otherwise moving downwardly) in a hydroconversion reaction zone during hydroprocessing by contacting the hydroprocessing catalyst in the hydroconversion reaction zone with an upflowing hydrocarbon feed stream having a liquid component and a hydrogen-containing gas component.

Principal objectives and direction of development of catalyst for hydrocarbon processing ebullated bed reactors have been toward very small high surface area catalyst that can be easily expanded (i.e. lifted into random motion) within the reactors with minimum recycle oil requirements. Basic teachings and practice of technologies implementing expanded or ebullated bed reactors, emphasize achieving a "backmixed" reaction zone by the motion of the various size, shape and density catalyst, to promote isothermal temperature conditions. The following prior art patents regarding quenching, especially liquid quenching, as related to hydrogen upgrading in general confirms the unique and novel features and advantages of the present invention:

U.S. Pat. No. 3,425,810 to Scott discloses various schemes for introducing or withdrawing different feed liquids between reaction zones internal to a fixed bed reactor for upgrading consideration.

U.S. Pat. No. 3,489,674 to Borst Jr. discloses a method for hydrodesulfurizing hydrocarbons preferably boiling up to about 1100° F. by subjecting feed hydrocarbons to reaction with hydrogen over hydrogenation catalyst so that the feed hydrocarbons are at least mildly hydrocracked and substantially desulfurized. The reactor effluent is quenched with a specific liquid hydrocarbon stream which had been previously separated from the reaction zone effluent product. The amount of quench is responsive to the measurement of the temperature of the vapor stream out of the high pressure separator immediately following the reaction zone such that a predetermined temperature thereof (below about 800° F.) is maintained in this vapor stream. Hydrocarbon products of reduced content are subsequently recovered.

U.S. Pat. No. 3,728,249 to Antezana et al discloses a scheme to inject various feed oils between reaction zones of a fixed bed reactor as a quenching fluid with the combined objective of introducing additional feed on a selective basis within the reactor.

U.S. Pat. No. 3,841,981 to Layng discloses a process for refining a tar sand derived material selected from the group consisting of a natural tar and bitumen. The refining process includes the steps of passing the feed substantially in the liquid phase through a reaction zone in the presence of particulate contact material and a hydrogen containing gas under temperature in the range of 700° to 850° F. and hydrogen partial pressure in the range of 400 to 2000 p.s.i. wherein the contact material is maintained in an ebullated state by the passage of fluids through the reaction zone and an effluent is removed from the reaction zone and passed to a separation zone and wherein the effluent is separated into at least a light oil fraction and a heavy oil fraction. The improvement in the refining process comprises quenching the effluent with a compatible oil fraction to a temperature below coking at a point prior to the separation of the effluent into its fractional components.

U.S. Pat. No. 4,324,642 to Duraiswamy teaches a process for the production of condensed, stabilized hydrocarbons by the flash pyrolysis of carbonaceous materials (e.g. coals, gilsonite, tar sands, oil shale, organic wastes, etc.). The material is subjected to pyrolysis in the presence of a carbonaceous solid heat carrier and a beneficially reactive transport gas for inhibiting the reactivity of the heat carrier and the char product. A produced gaseous pyrolysis product is quenched by a fluid containing a 'capping agent' which stabilizes and terminates newly formed volatilized hydrocarbon free radicals. Hydrocarbons of at least four carbon atoms are condensed and the stabilized liquid product is fractionated.

U.S. Pat. No. 4,356,077 to Che discloses a production method of light aromatics, intermediate coal liquids, tar acids and heavy hydrocarbons is effected by the pyrolysis of coal. The characteristic features of the production method comprise (i) effecting the pyrolysis in the presence of a particulate carbonaceous heat carrier and a beneficially reactive gas active to reduce polymerization and cracking of the pyrolysis vapors by inhibiting the reactivity of the particulate solids remaining after the pyrolysis, including char, and (ii) quenching the pyrolysis vapors with a quench liquid comprising an H-donor solvent.

U.S. Pat. No. 4,357,228 to Che also teaches a process for the production of light aromatics, intermediate coal liquids, tar acids and heavy hydrocarbons by the pyrolysis of coal. The characteristic feature of this process comprises (i) quenching the pyrolysis vapors with a quench fluid comprising an H-donor solvent to form a liquid mixture containing a condensate, (ii) vacuum flashing the mixture to recover various components including a condensate remainder, (iii) hydrogenating the mixture by heating to transfer H from the quench liquid to the condensate remainder, and (iv) separating the hydrogenated mixture into various components. The quenching method used eliminates secondary reactions in the pyrolysis products and hydrogenates the pyrolysis products using relatively mild operating conditions to economically enhance the yield of low-molecule wt. liquids from the process.

U.S. Pat. No. 4,446,003 to Burton et al discloses recovery of heat from the gas leaving a unit for thermal hydrogenation of an oil feedstock is effected by (a) quenching the gas with a liquid in a quench zone in which all the thermal surfaces are irrigated by the quench liquid, and (b) passing the cooled gas and quench liquid to a heat-recovery unit in which all surfaces in contact with the gas are irrigated by the quench liquid. The process prevents fouling of the heat recovery system by heavy aromatic compounds.

U.S. Pat. No. 4,536,278 to Tatterson teaches a process for producing shale oil comprising the steps of: (a) feeding raw oil shale to a retort including a screw conveyor retort with a surge bin, a rotating pyrolysis drum with an accumulator, a rotating trommel screen, a fluid bed retort, a static mixer retort with a surge bin, and a gravity flow retort; (b) feeding combusted oil shale at 1000°–1400° F. into the retort; (c) retorting to produce a dust laden effluent comprising hydrocarbons and particles of 1–1000 microns in size; (d) withdrawing the product stream; and (e) enhancing dedusting of the stream by injecting a normally liquid hydrogen donor quench to stabilize and limit polymerization, and enhance agglomeration. Shale oil is produced and stabilized effectively a polymerization, aging an polymerization, aging and decreptitation.

U.S. Pat. No. 4,832,831 assigned to Carbon Fuels Corp. discloses refining coal to produce a slate of hydrocarbon containing co-products by short residence time hydrodisproportionation having a thermal efficiency greater than 75%.

The refining process comprises contacting the coal at a volatilization temperature of 900°–1600° F. and 100–1200 psig for 0.2–2 seconds, with a hydrogen-donor rich atmosphere to yield char and hydrocarbon-containing vapor which is cooled by direct quench with a recycle heavy oil stream to a temperature 100° F. less than the volatilization temperature and to a final temperature of 850° F. with recycle water and oil. Oil-type transportable fuel systems are produced without use of hydrogen from external source.

None of the foregoing prior art patents teach or suggest the present invention wherein a process is broadly provided for: forming a plurality of annular mixture zones under a hydroconversion reaction zone having a substantially packed bed of hydroprocessing catalyst such that each of the annular mixture zones contains a hydrocarbon feed stream having a liquid component and a hydrogen-containing gas component and wherein the annular mixture zones are concentric with respect to each other and are coaxial with respect to the hydroconversion reaction zone; introducing the hydrocarbon feed stream from each of the annular mixture zones into the substantially packed bed of hydroprocessing catalyst to commence upflowing of the hydrocarbon feed stream from each of the annular mixture zones through the substantially packed bed of hydroprocessing catalyst; injecting a flow of a quenching matter (i.e. quenching liquid and/or gas) into the substantially packed bed of hydroprocessing catalyst; withdrawing a volume of particulate catalyst from the hydroconversion reaction zone to commence essentially plug-flowing downwardly the substantially packed bed of hydroprocessing catalyst within the hydroconversion reaction zone; and adding a volume of catalyst to the hydroconversion reaction zone to replace the withdrawn volume of particulate catalyst. None of the foregoing prior art patents teach or suggest the particular present invention which broadly comprises a quench system or assembly which is intended to be utilized in hydroprocessing a hydrocarbon feed stream that is flowing through a catalytic bed in a hydroconversion reaction zone.

SUMMARY OF THE INVENTION

In accordance with one aspect of the present invention there is provided a method of periodically or semi-continuously transferring catalyst into and out of a substantially packed bed of catalyst which is flowing downwardly at a desired rate through a reactor vessel during hydroprocessing over a wide range of counterflow rates of a hydrocarbon feed stream that comprises a liquid hydrocarbon and a hydrogen-containing gas component which are flowing upwardly through the vessel. Such plug-like flow of the packed catalyst bed is achieved by selecting the average density, size, and shape of the catalyst particles forming the catalyst bed so that the catalyst bed expands by less than 10% by length at the maximum anticipated fluid flow velocities of the gaseous and liquid components therethrough. Desirably, such movement and bed level of such catalyst is continuously monitored to prevent overfilling and to assure minimum ebullation and attendant wastage of reactor space and particle size segregation. Uniformity of gas flow is maintained across the cross-sectional area of the vessel and the full volume of the bed so as to avoid ebullation of the bed, including eddy currents or localized recirculation, of catalyst particles moving downwardly in plug-like flow through the vessel. Preferably, the gaseous component of the feed stream is uniformly distributed through a plurality of annular concentric rings, or polygons, formed by axially extending annular and radially spaced apart concentric supports under a truncated conical or pyramidal support screen. Such supports are axially elongated sufficiently to form a plurality of pairs of connected annular gas pockets and adjacent concentric liquid annular feed rings between each adjacent pairs of annular supports. Thus, the catalyst bed is provided with uniformly concentric annular and alternate feed rings of both liquid and gas across the full cross-sectional area of the downwardly flowing catalyst bed.

In accordance with another aspect of the invention, the system for introduction of quench gas at an intermediate level in the vessel maintains the plug-like flow of catalyst downwardly through the vessel. Quench gas is introduced by a plurality of transversely extending pipe members covered or shrouded by inverted V-shaped sheds. Each shed overlies a quench gas supply pipe and acts to deflect catalyst outwardly and downwardly over the apices. Each of the distributor sheds preferably includes a plurality of elongated slots along the lower edges of the transverse sides. These slots form lateral gas redistribution channels for both upwardly flowing process gases and quench gas introduced through the transverse pipes.

Additionally the invention relates to methods and apparatus for on-stream replacement of catalyst without local levitation or ebullation of catalyst particles around the withdrawal point within the catalyst bed by laminarly flowing a liquid hydrocarbon stream either into, or out of, the reactor vessel through a pair of flow paths. Each of the flow paths has a substantially constant cross-sectional area throughout its length and a diameter at least five times the average diameter of the catalyst particles flowing between said vessel and at least one and preferably two, pressurizable catalyst lock-hoppers or receptacles, serving respectively to supply fresh catalyst to the top of the bed and to remove spent catalyst from the bottom. Further, each flow path includes at least one in-line control valve having a throughbore of substantially the same diameter as the flow path and at least one auxiliary fluid flow path for introducing fluid flow into the slurry path for flushing catalyst particles from the path. Preferably, the flush fluid is a liquid, and selectively, by reverse hydrogen flow through the line when catalyst is not being moved, particles are blocked from entering the flow path and coking is prevented at the entry to the flow tube. The catalyst vessels are selectively pressurizable as required to induce such laminar flow of liquid-entrained catalyst to feed replacement catalyst into the upper end of the reactor vessel and to withdraw spent catalyst from the lower end of the vessel. Desirably, each of the flow paths is characterized by an inverted J-tube, which includes an inlet portion for the liquid stream and entrained catalyst having a reverse upward flow section substantially shorter than the downward flow path. Preferably, in the reactor vessel the inlet portion for withdrawing catalyst is disposed above an unperforated central portion of the conical bed support screen so that such catalyst withdrawal position is adjacent the bed bottom, but substantially out of a plurality of concentric feed paths for upwardly flowing liquid hydrocarbon feed and gas streams. This avoids gas entrainment with the catalyst slurry, as by ebullation of the bed around the intake point.

The catalyst employed in the present invention has a uniform or substantially the same size, shape and density over the axial length of the reactor vessel. The surface area (such as measured by the B.E.T. method) is typically from about 50 sq. meters per gram to about 300 sq. meters per gram; more typically from about 75 sq. meters per gram to about 150 sq. meters per gram. Preferably, the catalyst is for producing a plug-flowing substantially packed bed of hydroprocessing catalyst during hydroprocessing by contacting a substantially packed bed of hydroprocessing catalyst with an upflowing hydrocarbon feed stream. More particularly, when the catalytic particulates are disposed in a hydrocarbon reaction zone, a substantially packed bed of hydroprocessing catalyst is produced; and when a hydrocarbon feed stream flows upwardly through the substantially packed bed of hydroprocessing catalyst and a quenching matter is injected into the substantially packed bed of hydroprocessing catalyst, plug-flowing commences when a volume of the catalytic particulates is withdrawn from a bottom of the hydrocarbon reaction zone. As used herein "catalyst" includes other particles which interact with a feed stream, such as sorbents, or other fluid contact bodies. The catalyst is disposed in a reaction zone and a hydrocarbon feed stream is flowed upwardly through the catalyst for hydroprocessing the hydrocarbon feed stream.

The present invention accomplishes its desired objects by broadly providing a method for reducing the gas velocity of a hydrogen-containing gas component which is contained within a hydrocarbon feed stream that includes a liquid component and is upflowing through a hydroconversion reaction zone having a substantially packed bed of hydroprocessing catalyst, while simultaneously increasing the residence time and reducing the liquid velocity of the liquid component within the substantially packed bed of catalyst. The method comprises the steps of:

(a) disposing a substantially packed bed of hydroprocessing catalyst in a hydroconversion reaction zone;

(b) introducing into the substantially packed bed of hydroprocessing catalyst of step (a), a hydrocarbon feed stream comprising a hydrogen-containing gas component and a liquid component having a liquid viscosity;

(c) upflowing the hydrocarbon feed stream of step (b) through the substantially packed bed of hydroprocessing catalyst such that the hydrogen-containing gas component has a gas velocity and the liquid component has a liquid velocity; and (d) injecting at least once into the substantially packed bed of hydroprocessing catalyst a liquid quench having a quench viscosity that is less than the liquid viscosity, said injecting causing the gas velocity and the liquid velocity to be reduced and further causing a residence time of the liquid component within the substantially packed bed of hydroprocessing catalyst to be increased.

The present invention further accomplishes its desired objects by further broadly providing a method for increasing penetration and contact of a liquid component into and on the surface area of a plurality of catalytic particulates that are contained within a substantially packed bed of hydroprocessing catalyst having a hydrocarbon feed stream upflowing therethrough. The hydrocarbon feed stream contains the liquid component, and simultaneously with increasing penetration and contact of the liquid component into and on the surface area of the plurality of catalytic particulates, the viscosity of the liquid component is decreased. The method comprises the steps of:

(a) disposing in a hydroconversion reaction zone a substantially packed bed of hydroprocessing catalyst having a plurality of catalytic particulates that include a surface area;

(b) upflowing through the substantially packed bed of hydroprocessing catalyst a hydrocarbon feed stream having a liquid component with a liquid viscosity such that the liquid component penetrates into and contacts a first portion of the surface area; and (c) injecting at least once into the substantially packed bed of hydroprocessing catalyst a liquid quench having a quench viscosity that is less than the liquid viscosity such that a mixture of liquid quench and liquid component is formed having a mixture viscosity that is less than the liquid viscosity, said injecting causing the liquid component within the mixture to penetrate into and contact a second portion of the surface area wherein the second portion includes the first portion and an additional portion of surface area beyond the first portion.

The present invention also accomplishes its desired objects by broadly providing a method for hydroprocessing a hydrocarbon feed stream that is upflowing through a hydroconversion reaction zone having a substantially packed bed of catalyst (which preferably have a uniform or substantially the same size, shape and density) comprising the steps of:

(a) forming a plurality of annular mixture zones under a hydroconversion reaction zone having a substantially packed bed of hydroprocessing catalyst such that each of the annular mixture zones contains a hydrocarbon feed stream having a liquid component and a hydrogen-containing gas component and wherein the annular mixture zones are concentric with respect to each other and are coaxial with respect to the hydroconversion reaction zone;

(b) introducing the hydrocarbon feed stream from each of the annular mixture zones of step (a) into the substantially packed bed of hydroprocessing catalyst to commence upflowing of the hydrocarbon feed stream from each of the annular mixture zones through the substantially packed bed of the catalyst; and (c) injecting a quenching matter into the substantially packed bed of hydroprocessing catalyst.

The present invention also accomplishes its desired objects by broadly providing a method for hydroprocessing a hydrocarbon feed stream that is upflowing through a hydroconversion reaction zone having a substantially packed bed of catalyst comprising the steps of:

(a) disposing catalyst in a reaction zone, said catalyst comprising a plurality of catalytic particulates having a uniform size or substantially the same, shape and density;

(b) upflowing through the catalyst of step (a) a hydrocarbon feed stream for hydroprocessing the hydrocarbon feed stream; and (c) injecting a quenching matter into the plurality of catalytic particulates.

In another aspect of the invention, the present invention also accomplishes its desired objects by broadly providing a method for producing an essentially downwardly plug-flowing substantially packed bed of hydroprocessing catalyst within a hydroconversion reaction zone comprising the steps of:

(a) forming a plurality of annular mixture zones under a hydroconversion reaction zone having a substantially packed bed of hydroprocessing catalyst such that each of the annular mixture zones contains a hydrocarbon feed stream having a liquid component and a hydrogen-containing gas component and wherein the annular mixture zones are concentric with respect to each other and are coaxial with respect to the hydroconversion reaction zone;

(b) introducing the hydrocarbon feed stream from each of the annular mixture zones of step (a) into the substantially packed bed of hydroprocessing catalyst to commence upflowing of the hydrocarbon feed stream from each of the annular mixture zones through the substantially packed bed of the catalyst;

(c) injecting a quenching matter into the substantially packed bed of hydroprocessing catalyst; and (d) withdrawing a volume of particulate catalyst from the hydroconversion reaction zone to produce an essentially downwardly plug-flowing substantially packed bed of hydroprocessing catalyst within the hydroconversion reaction zone.

In another broader aspect of the invention, the present invention also accomplishes its desired objects by broadly providing a method for maximally occupying a reactor volume with a substantially packed bed of hydroprocessing catalyst during hydroprocessing by contacting the substantially packed bed of hydroprocessing catalyst with an upflowing hydrocarbon feed stream having a liquid component and a hydrogen-containing gas component. The method for maximally occupying a reactor volume with a substantially packed bed of hydroprocessing catalyst preferably comprises the steps of:

(a) disposing a substantially packed bed of hydroprocessing catalyst in a reactor zone (or reaction zone or zone for reaction) contained within a reactor volume such that the substantially packed bed of hydroprocessing catalyst occupies at least about 75% by volume of the reactor volume;

(b) upflowing into the substantially packed bed of hydroprocessing catalyst a hydroprocessing feed stream including a liquid component and a hydrogen-containing gas component and having a rate of flow such that the expansion of the substantially packed bed of hydroprocessing catalyst is limited to less than 10% by length beyond a substantially full axial length of the substantially packed bed of hydroprocessing catalyst in a packed bed state;

(c) injecting a quenching matter into the substantially packed bed of hydroprocessing catalyst;

(d) withdrawing a volume of the hydroprocessing catalyst from the reactor zone to commence essentially plug-flowing downwardly of the substantially packed bed of hydroprocessing catalyst within the reactor zone; and (e) adding hydroprocessing replacement catalyst to the essentially plug-flowing downwardly, substantially packed bed of hydroprocessing catalyst at a volume and/or rate to substantially replace the volume of the withdrawn hydroprocessing catalyst.

The quenching matter or quench medium is injected by an apparatus for quenching. The apparatus is particularly suitable to be employed in hydroprocessing of a hydrocarbon feed stream. In one embodiment of the invention, the apparatus broadly comprises a primary quench assembly for transporting a quench medium from a quench medium supply source; a secondary quench assembly secured to and communicating with the primary quench assembly for receiving the transported quench medium from the primary quench assembly and for distributing the received transported quench medium into a catalyst bed. The apparatus further broadly comprises a support means, coupled to the primary quench assembly and to the secondary quench assembly and to a reactor vessel containing the catalyst bed, for maintaining the primary quench assembly and the secondary quench assembly in a generally stationary posture with respect to the reactor vessel. The primary quench assembly comprises a generally hollow primary member including at least one generally hollow transverse member extending outwardly therefrom. The secondary quench assembly includes at least one quench conduit lateral secured to the at least one generally hollow transverse member and to the support means. At least one lateral support is secured to the at least one quench conduit lateral and to the support means for coupling the at least one conduit lateral to the support means. At least one primary support is provided as being secured to the generally hollow primary member for coupling the primary quench assembly to the support means. At least one nozzle assembly is also provided for communicating with and being supported by the secondary quench assembly and for receiving and passing or injecting the received transported quench medium into the catalyst bed. The apparatus also further broadly comprises at least one coupling means for coupling; and the at least one coupling means for coupling is secured to the support means and to the reactor vessel for coupling the support means to the reactor vessel.

In another embodiment of the present invention, the apparatus is for distributing a quench medium and comprises a primary quench assembly for transporting a quench medium; a secondary quench assembly coupled to and communicating with the primary quench assembly for receiving and distributing the quench medium being transported by the primary quench assembly; and a support member coupled to the primary quench assembly and to the secondary quench assembly. The primary quench assembly includes a primary inlet conduit member having a primary inlet conduit diameter; and a conduit header including a secondary inlet conduit and at least one transverse header conduit. The secondary inlet conduit and the at least one transverse header conduit are both secured to and communicate with the conduit header; and the secondary inlet conduit member is coupled to the primary inlet conduit member and has a secondary inlet conduit diameter that is essentially equal to the primary inlet conduit diameter. The conduit header includes a conduit header diameter that is greater than the secondary inlet conduit diameter; and the transverse header conduit comprises a transverse header conduit diameter which is greater than the secondary inlet conduit diameter. The apparatus for distributing a quench medium in this other embodiment of the present invention further comprises a primary coupling disconnect clamp means, engaged to the primary inlet conduit member and to the secondary inlet conduit member, for coupling the primary inlet conduit member to the secondary inlet conduit member and for facilitating the disconnection of the primary inlet conduit member from the secondary inlet conduit member. At least one header coupling member is provided as being engaged to the conduit header and to the support member for coupling the conduit header to the support member. The secondary quench assembly comprises at least one quench conduit lateral coupled to the at least one transverse header conduit and communicating therewith and having a conduit lateral diameter that is essentially equal to the transverse header conduit diameter. The lateral coupling member is engaged to the at least one quench conduit lateral and to the support member for coupling the at least one quench conduit lateral to the support member. A support coupling member is connected to the support member. At least one nozzle assembly communicates with and is supported by the at least one quench conduit lateral. The at least one nozzle assembly consists of a lower nozzle section, that is secured to and communicates with the at least one quench conduit lateral, and an upper nozzle section that is coupled to the lower nozzle section. The apparatus for distributing a quench medium also includes a secondary coupling disconnect clamp means, engaged to the at least one quench conduit lateral and to the at least one transverse header conduit, for coupling the at least one quench conduit lateral to the at least one transverse header conduit and for facilitating the disconnection of the at least one quench conduit lateral from the at least one transverse header conduit.

Also included is a nozzle coupling disconnect clamp means, engaged to the lower nozzle section and to the upper nozzle section, for coupling the lower nozzle section to the upper nozzle section and for facilitating the disconnection of the upper nozzle section from the lower nozzle section.

The present invention accomplishes its desired objects in other aspects by broadly providing a method for quenching in hydroprocessing a hydrocarbon feed stream that is flowing through a hydroconversion reaction zone having a bed of catalyst, the method comprising the steps of:

(a) passing a quenching matter (or quench medium, which is preferably a liquid and/or gas quench) through a first conduit zone having a first conduit diameter;

(b) flowing the quenching matter from the first conduit zone into a second conduit zone having a second conduit zone diameter that is larger than the first conduit diameter;

(c) flowing the quenching matter from the second conduit zone into a third conduit zone having a third conduit diameter that is smaller than the second conduit zone diameter;

(d) injecting the quenching matter from the third conduit zone into a bed of catalyst disposed in a hydroconversion reaction zone which is having a hydrocarbon feed stream flowing therethrough.

From the foregoing summary it will be apparent that several significant factors contribute directly to the present invention accomplishing its desired objects, and to the efficient use of a given process reactor vessel to assure non-ebullating, plug-like flow of a body of catalyst particles therethrough while being contacted by a counter-flowing hydrocarbon fluid stream of gas and liquid at maximum space-velocity. Among such significant factors are: (i) the size, such catalyst pay characteristics of such catalyst particles at preselectable flow velocities and pressures of the hydrocarbon fluid stream; (ii) control of catalyst bed ebullation and/or levitation during hydrocarbon fluid and hydrogen flows; (iii) laminar flow of the catalyst particles during movement into and out of the catalyst moving bed for replacement (or regeneration or rejuvenation) without bed ebullation or levitation; (iv) concentric annular feed of alternate rings of the gas and liquid components of the hydrocarbon feed uniformly into the full moving catalyst bed, which is capable of recovering promptly from upset or pressure changes in the reactor vessel to restore such alternate rings of gas and liquid over process runs of extended length (e.g. several thousand hours); and (v) quenching along an axial length of the catalyst bed, which is preferably a moving catalyst bed.

It is therefore an object of the present invention to broadly provide a method for quenching in hydroprocessing a hydrocarbon feed stream that is flowing through a hydroconversion reaction zone.

It is another object of the present invention to broadly provide an apparatus for quenching in hydroprocessing of a hydrocarbon feed stream.

It is yet another object of the present invention to provide an apparatus for distributing a quench medium.

These, together with the various ancillary objects and features which will become apparent to those skilled in the art as the following description proceeds, are attained by this invention, a preferred embodiment as shown with reference to the accompanying drawings, by way of example only, wherein:

Figure 1:
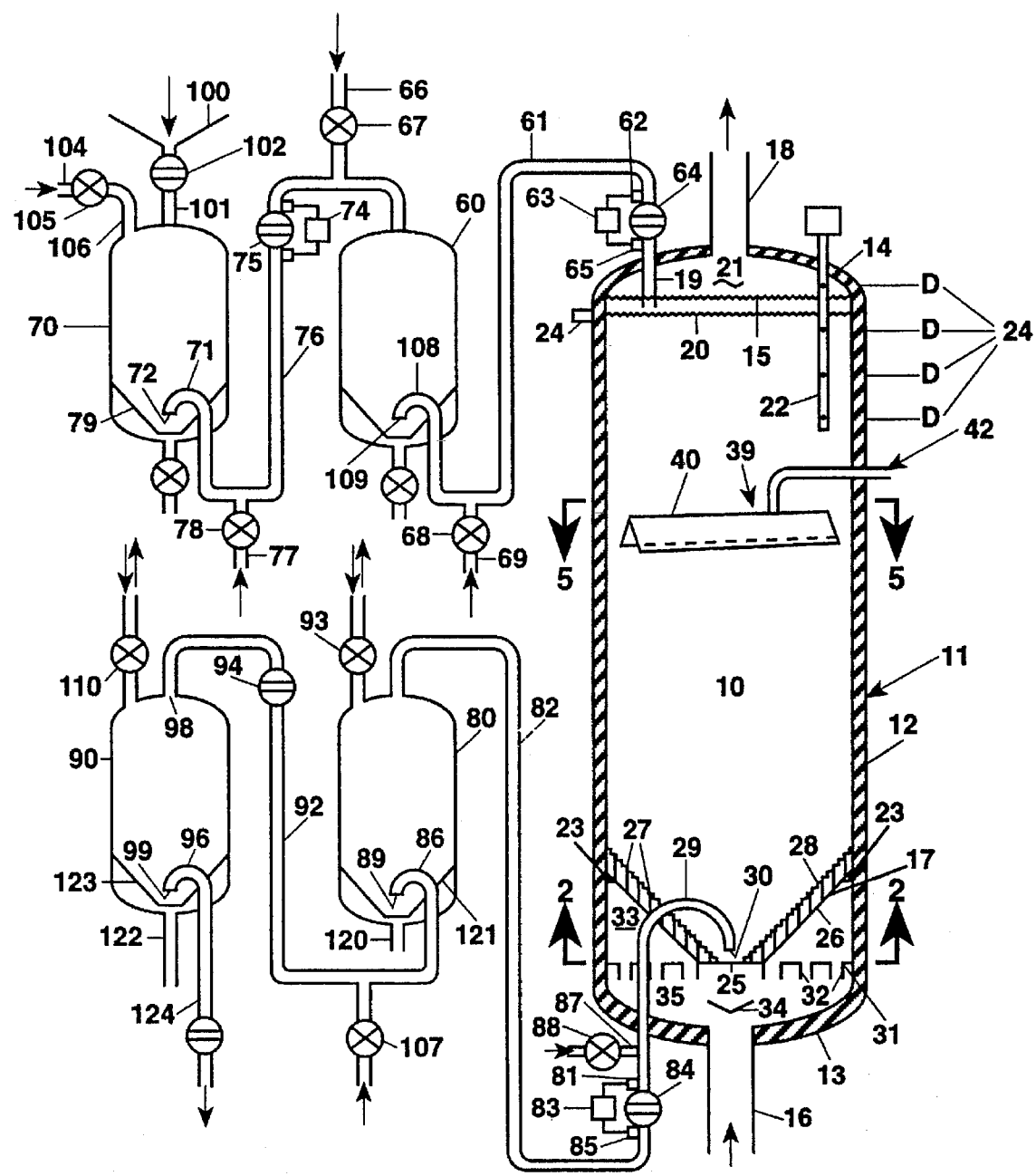
FIG. 1 is a schematic view of a typical hydroprocessing vessel to which the present invention is particularly directed for on-stream catalyst replacement during continuous plug-like flow of catalyst through up-flowing liquid hydrocarbon feed and gas streams.

DETAILED DESCRIPTION OF THE INVENTION Including Preferred Embodiments of the Invention Referring in detail now to the drawings, and initially more particularly to FIG. 1, a hydroprocessing system is shown embodying the method of the present invention to increase substantially both the continued catalytic activity of a volume or bed of catalyst 10 and the efficient use of a single reactor vessel of a given reactor volume, such as reactor vessel 11. Vessel 11, as indicated by the thickness of its cylindrical side wall 12 and domed closure heads, or ends, 13 and 14, is designed to react a hydrogen containing gas mixed with a liquid hydrocarbon stream at a pressure of up to about 300 atmospheres (about 4500 lbs per square inch) and up to about 650° C. (about 1200° F.). Such reaction gas and a feed stream of hydrocarbon liquids are preferably premixed and introduced as a single stream through bottom head 13 by line 16.

To assure maximum catalytic benefit during the hydroprocessing of the hydrocarbon feed stream and the hydrogen-containing gas, it is essential that vessel 11 contain as much catalyst as possible within the design volume of vessel 11. Accordingly as indicated, support means 17 for catalyst bed 10 is placed as low as possible in vessel 11 while assuring full and adequate dispersion of the hydrogen phase within the liquid hydrocarbon stream. At the same time, the upper limit of bed 10 is near the top of domed head 14, while providing an adequate space 21 for disengaging any entrained catalyst from the resulting products withdrawn through center pipe 18. To insure that catalyst is not entrained into product fluids exiting through center pipe 18, a screen 15 may be installed in space 21 above a bed surface 20 defining the top of the catalyst bed 10. Fresh catalyst is then added to bed surface 20 through pipe 19 extending through screen 15. Desirably, the upper level or top of the catalyst bed 10, designated as the bed surface 20, is preferably controlled on a continuous basis by gamma ray absorption measurement made possible by a gamma ray source 22 and gamma ray detector 24 positioned in close proximity to the bed surface 20 of catalyst bed 10. Such a gamma ray source may be in the form of radioactive isotopes, such as Cesium 137, disposed inside the reactor in a specially designed well. Alternatively the source can be an electrically controllable source, such as a thermal neutron activated gamma ray generator. Detector 24 may be in the form of an ionization tube, Geiger-Mueller tube or a scintillation detector. Suitable sources and detectors are manufactured by Ronan Engineering Co., Texas Nuclear and other vendors. By detecting the level of surface 10, it is possible, in accordance with the invention, to insure that the catalyst inventory is maintained at the optimum level and that the reactor is never overfilled.

Figure 8:
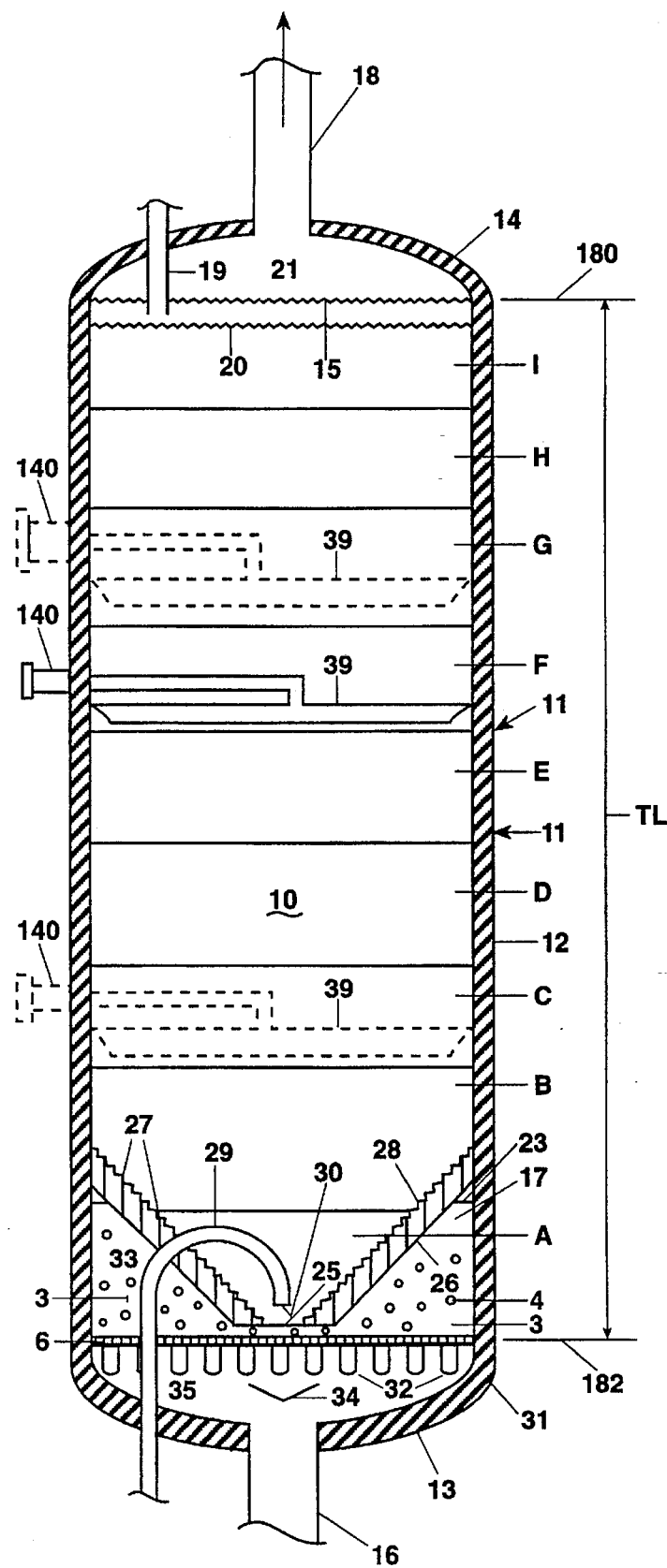
FIG. 8 is a partial cross-sectional view illustrating a catalytic bed with a plurality of superimposed layers with respect to each other before commencement of a plug-flow.
Figure 9:
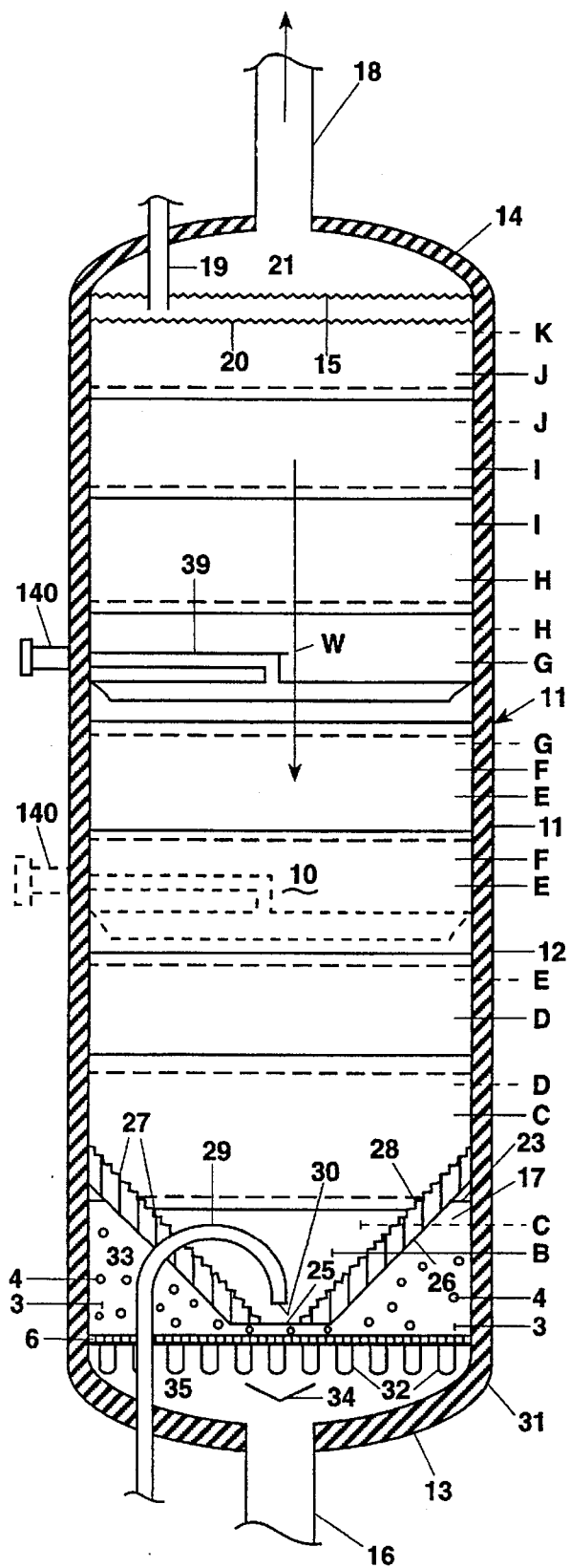
FIG. 9 is a partial cross-sectional view illustrating a catalytic bed which is moving downwardly in a plug-flow fashion.

Overfilling the reactor increases the chance that catalyst particles will be crushed in the isolation valves in the transfer lines when they are closed, at the end of each transfer. Bed level control is also needed to confirm that ebullation of the bed is minimized and that undesirable excursions from the design flow rate for hydrogen and hydrocarbon feed flowing upwardly through bed 10 are avoided for the selected catalyst. To this end, the size, shape, and density of catalyst particles supplied to the bed are selected in accordance with the designed maximum rate of flow of the feed streams to prevent such ebullation. Such control assures that bed 10 progressively moves down through vessel 11 in layers as by a plug flow. A "plug flow" of the catalyst bed 10 is illustrated in FIGS. 8 and 9 and may be best described as when a lowermost volumetric layer A is removed, the next volumetric layer B flows downwardly to replace the lowermost volumetric layer B and assumes a new position as a lowermost volumetric layer B. The removed lowermost volumetric layer A is replaced with an upper volumetric layer J. The procedure is again repeated (as best shown by the dotted line representations in FIG. 9) by removing the lowermost volumetric layer B and causing the next volumetric layer C to flow downwardly in a plug-like fashion to replace the lowermost volumetric layer B and assume a new position as a lowermost volumetric layer C. The removed lowermost volumetric layer B is replaced with an upper volumetric layer K. The procedure may be continually repeated to define a downwardly plug-flowing catalyst bed 10 which is moving in direction of arrow W in FIG. 9.

The procedure to determine whether or not a catalyst bed 10 is plug-flowing may be by any suitable procedure. For example, in a preferred embodiment of the present invention wherein metals (e.g. vanadium) are being removed from a hydrocarbon feed stream, the catalyst bed 10 is plug-flowing if a catalytic sample (e.g. 15 catalytic particulates) from withdrawn catalyst is analyzed and it is found that through elemental metal analyses that the catalytic sample has a uniform high metal load, preferably at least about 1.5 times more than the average metal load of the catalyst bed 10, and more preferably at least about 2.0 times more than the average metal load of the catalyst bed 10. Those possessing the ordinary skill in the art can determine the average load of the catalyst bed 10 from the total amount of metals removed from the hydrocarbon feed stream, the weight of the catalytic bed 10, etc.

It is to be understood that whenever the specification or the claims states or mentions any type of catalyst movement or catalyst bed 10 movement (e.g. "removing", "moving", "supplying", "replacing", "delivering", "flow", "flowing", "transfer", "transferring", "addition", "adding", "admixing", etc.) for any type or mixture of catalyst without stating or mentioning the basis, the basis for such type of catalyst or catalyst bed movement may be on any type of basis, such as "intermittent basis", "periodic basis", "continuous basis", "semi-continuous basis", etc. Thus, by way of example only, removal of lowermost volumetric catalytic layers and addition of upper volumetric catalytic layers may be on a "periodic basis", "a continuous basis", or even "a one time basis", all without affecting the spirit and scope of the present invention(s). It is to be also understood that the "removal" or "withdrawal" of catalyst and the "addition" or "replacement" of catalyst are mutually exclusive of each other and may be performed simultaneously or at different times without affecting the spirit and scope and of the present invention(s). Preferably, the "addition" or "replacement" of catalyst is performed after the "removal" or "withdrawal" of catalyst and after the catalyst bed 10 has moved downwardly into a non-moving state or non-moving posture.

Catalysts are selected utilizing data acquired by measuring bed expansion, such as in a large pilot plant run, with hydrocarbon, hydrogen and catalyst as described below and illustrated in Example 2.

To further assure that plug flow continues throughout the full length of the bed, and particularly at the bottom portion, bed support means 17 is particularly characterized by the truncated polygonal or conical configuration of support means 17.

Figure 2:
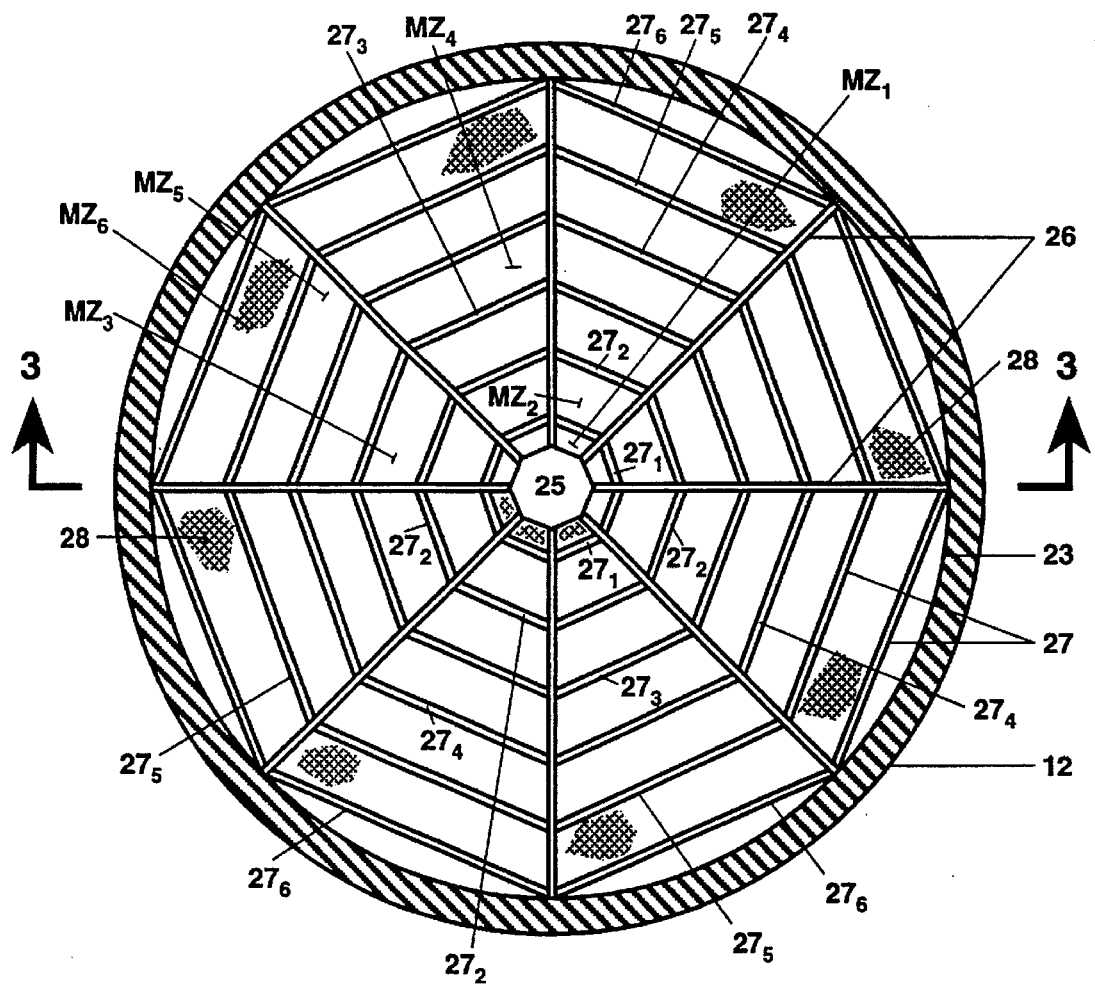
FIG. 2 is a bottom plan view of the concentric and radial catalyst bed support means for a truncated conical or pyramidal screen, taken in the direction of arrows and along the plane of line 2—2 in FIG. 1.
Figure 3:
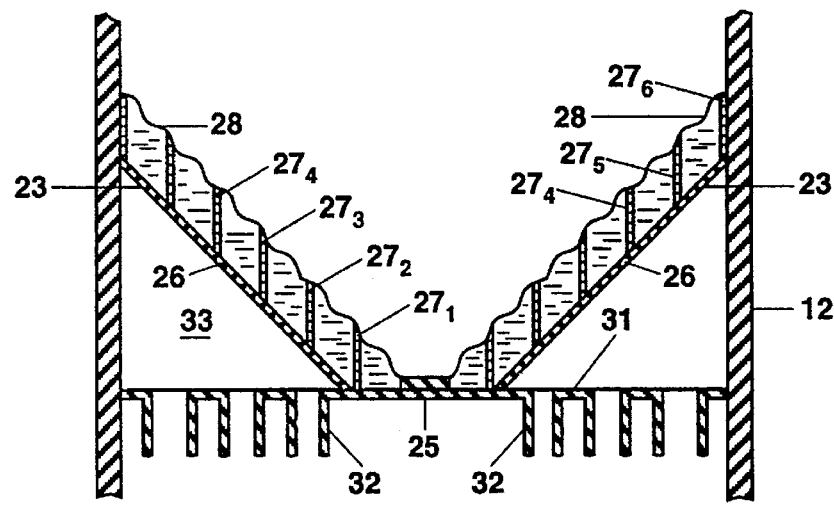
FIG. 3 is an elevational cross-sectional view of the support means and screen taken in the direction of arrows and along the plane of line 3—3 in FIG. 2.

As shown in the preferred embodiment of FIGS. 2 and 3, and as best seen in FIG. 2, support 17 includes a series of annular polygons, approaching the form of annular rings, formed by a plurality of segment plates 27 between radial ribs or spokes 26 extending from imperforate center plate 25 to sidewall 12 of vessel 11. As shown in FIG. 3, spokes 26 may be any suitable geometric shape, such as rod-like (see FIG. 3) or substantially flat plates (see FIG. 10), which divide the circumference of the vessel into many segments (eight in this case) and similarly support the ends of outer octagonal ring 23 of support means 17 formed by annular or circumferential plates 27. In each case, radial ribs or spokes 26, and annular segment plates 27 form a plurality of concentric rings, or annular polygons which support conical, or pyramidal, perforated plate or screen 28. Thus screen 28 is permeable to both gas and liquid rising from the lower portion of vessel 11.

In one preferred embodiment of the particular merit of the concentric annular polygons as illustrated in FIG. 3, the interconnected plates 27 form a plurality of ring-like structures extending generally axially parallel to the sidewall 12 with the radial ribs or spokes 26 radially extending towards the sidewall 12 of reactor vessel 11. The mixture of the hydrocarbon liquid feed and hydrogen gas that is to enter the catalyst bed 10 separates by gravity into radially alternate gas and liquid rings, made up of adjacent segments between each pair or radial spokes 26. Thus, both phases flow upwardly through alternate concentric annular passages under screen 28. The preferential separation of gas from liquid in each ring includes an annular cap segment of gas overlying an adjacent lower annular segment filled with liquid. Hence, both fluids have equal, and angularly adjacent, access to the bed through screen 28. The plurality of alternate annular rings of hydrogen gas and hydrocarbon liquid assure even and equal feed of both phases across the full cross-sectional area of screen 28 into bed 10. Among other factors, we have particularly found that this configuration insures even and equal distribution across the full cross-sectional area of the catalyst bed. Such equal distribution across the full diameter of the bed 10, permits a quiescent flow section to form directly above center plate 25 which truncates conical bed support means 17. This decreases substantially potential local ebullation or eddy currents from being induced in the catalyst bed at the point of catalyst withdrawal through inlet 30 of inverted J-tube 29 to assure localized laminar flow of catalyst and liquid from within bed Uniform feed of the mixture of the hydrocarbon feed stream and hydrogen is particularly facilitated to the inlet side of plates 27 of support means 17 through plenum or inlet chamber 33 enclosed between support 17 and circular plate member 31, which extends across the full cross-sectional area of vessel 11.

Figure 11:
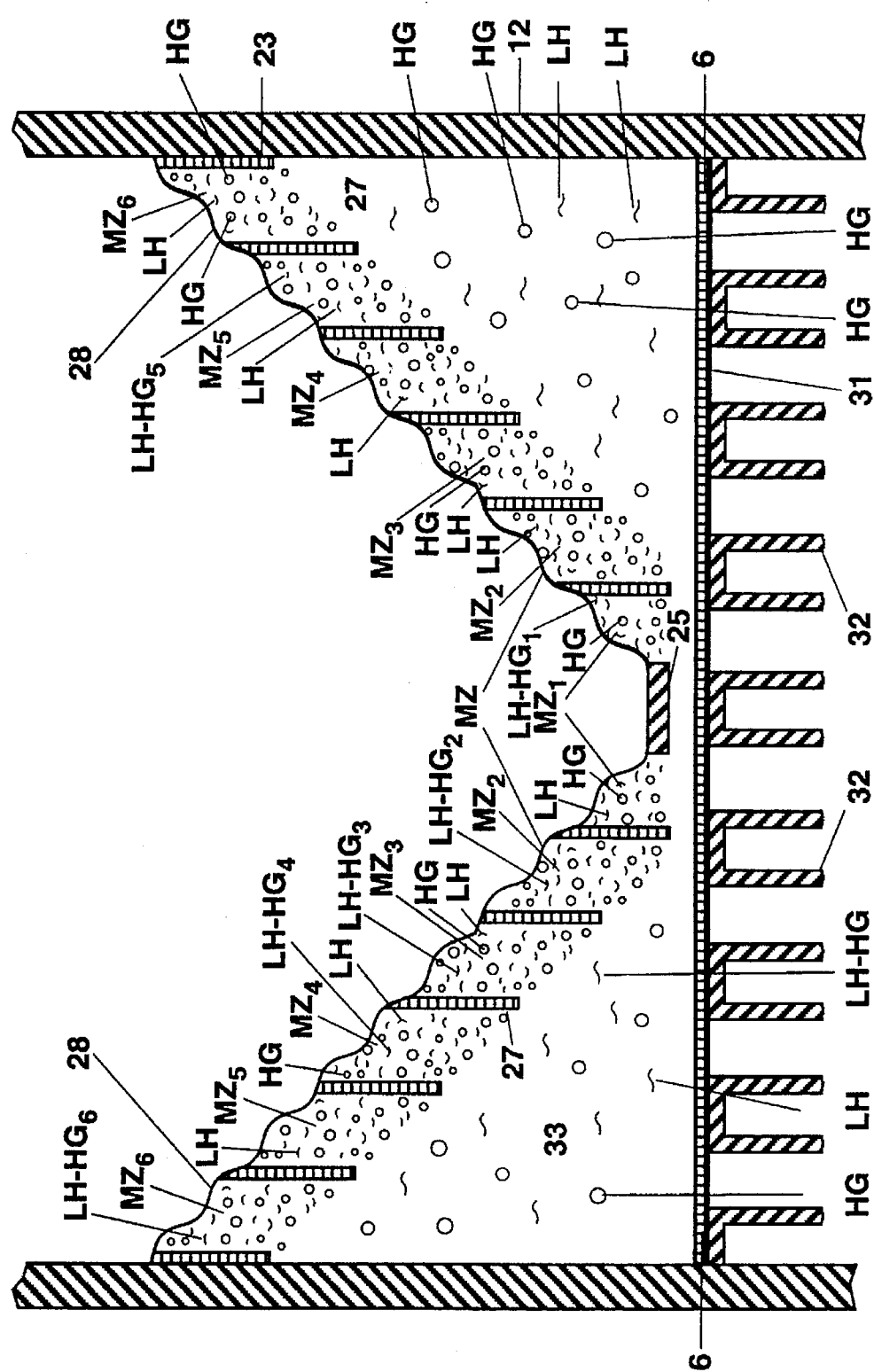
FIG. 11 is a partial cross-sectional view of the reactor and the catalytic support means of FIG. 10 which includes a plurality of annular mixture zones under the substantially packed bed of hydroprocessing catalyst with each annular mixture zone containing a liquid hydrocarbon component and hydrogen-containing gas component and wherein the annular mixture zones are concentric with respect to each other and are coaxial with respect to the reactor and the substantially packed bed of hydroprocessing catalyst.
Figure 12:
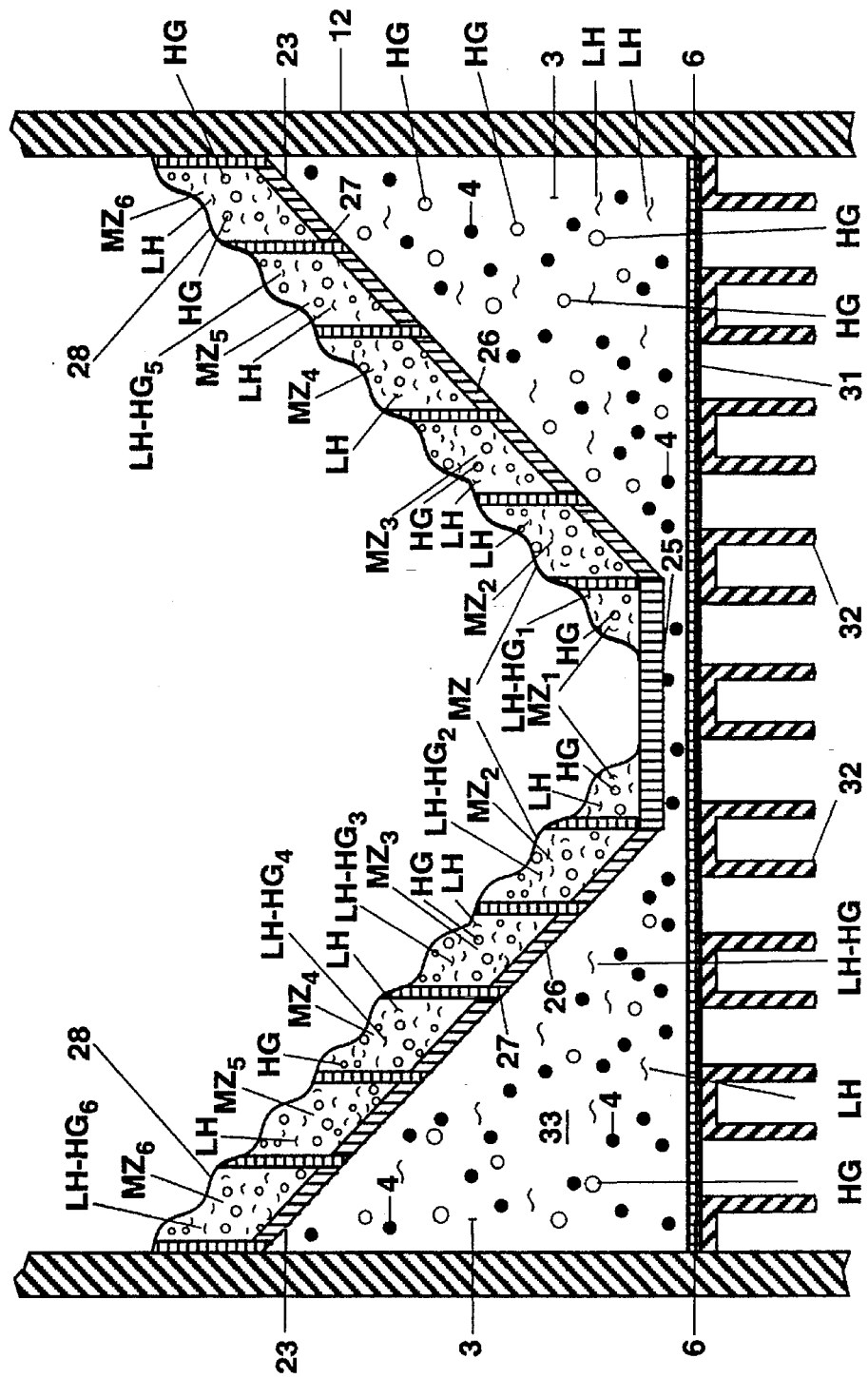
FIG. 12 is the partial cross-sectional view of the reactor and support means in FIG. 11 with the inert pellets, and illustrating ribs or spokes secured to an imperforate center plate and supporting a plurality of segmented plates.
Figure 13:
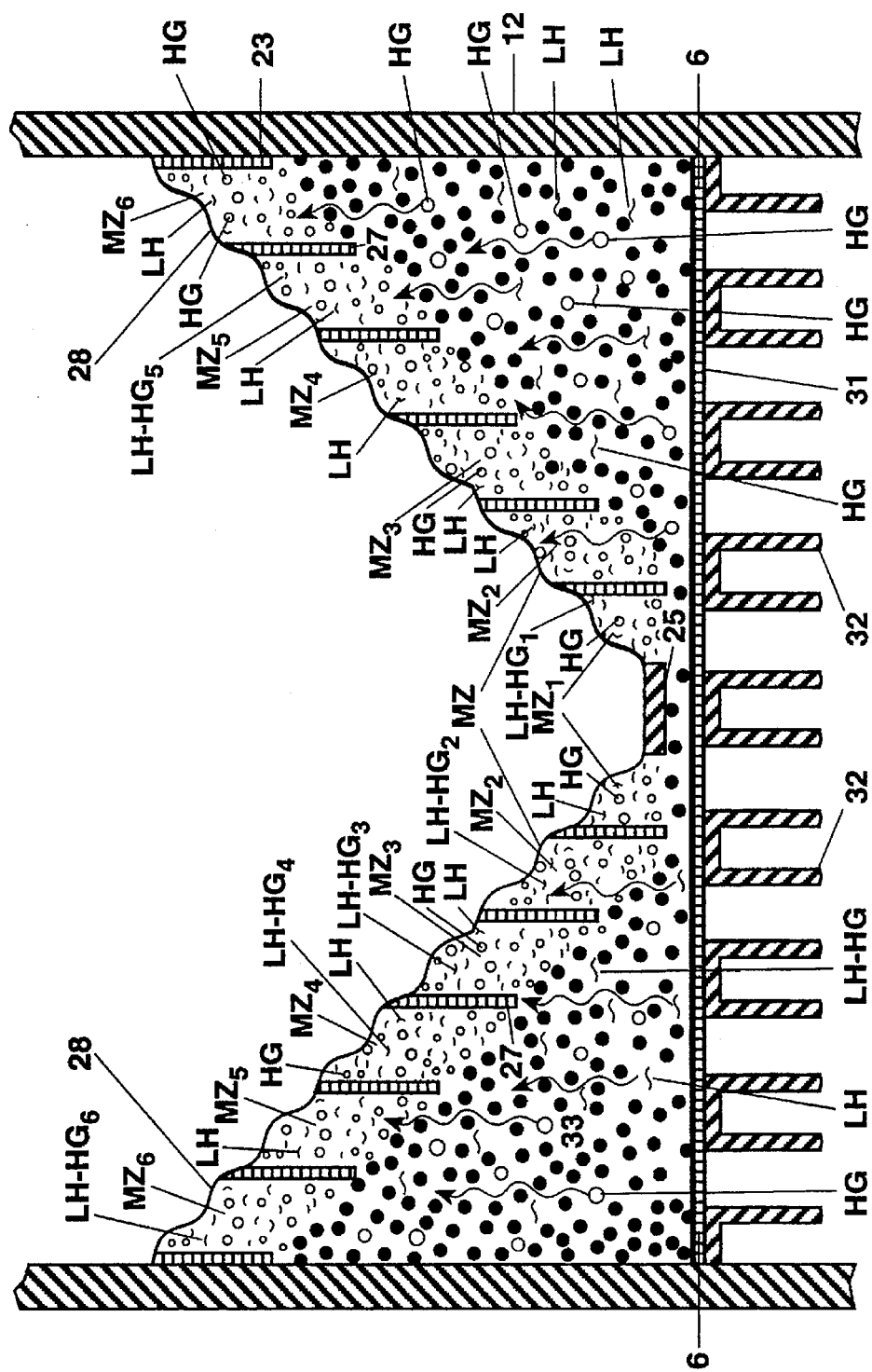
FIG. 13 is another cross-sectional view of the reactor and support means as similarly illustrated in FIG. 12 with a bed of inert pellets having a liquid hydrocarbon component and a hydrogen-containing gas component flowing around the inert pellets for entering the annular mixture zones.

The circular plate member 33 defines a grid-like structure for supporting a permeable screen 6 having one or more openings, as best shown in FIGS. 11, 12 and 13. As further best shown in FIGS. 11, 12 and 13, the permeable screen 6 supports a bed 3 of a plurality of inert pellets 4 (e.g. alumina pellets) which are sized not to pass through the openings in the permeable screen 6, to prevent eddy currents in the plenum chamber 33, and to keep bubbles of hydrogen-containing gas diffused within the hydrocarbon feed streams.

Plate 31 includes a multiplicity of similar large diameter tubes 32 forming openings through plate 31. Each tube is several inches in diameter and extends axially to a similar depth, say on the order of 4 to 6 inches, below plate Tubes 32 provide equal access to the mixture of hydrogen and hydrocarbon feed stream into plenum chamber 33. Even distribution of the incoming feed stream into bottom header 35 from feed line 16 may also be assisted by deflector plate 34 to assure that oversized bubbles of hydrogen that may be contained in the feed stream will be equally distributed across the full cross-sectional area of plate 31 and equally distributed to each of tubes 32 for flow into plenum chamber 33. The length of tubes 32 may be selected to form a suitable gas head under plate 31 to suppress surges in the feed streams entering header 35.

As noted above, the vertical, transverse width or axial length of plates 27 which set off each individual annular and radial segment, provide equal access to both hydrogen and liquid feed into catalyst bed 10, and stepped under screen 28 so that they effectively form rings of gas and hydrocarbon feed alternately across the full diameter at the inlet side of catalyst bed be 10. In this way, no single area of the inlet to catalyst bed 10 becomes a segregated or preferential, flow path for either gas or the liquid. Further, if pressure surges result in full wetting of screen 28 by the liquid phase, recovery of gas flow is assisted by the areal breadth of each segment between plates 27 and radial plates 26.

In another preferred embodiment of the particular merit of the concentric annular polygons as illustrated in FIGS. 10, 11, 12, and 13, there is seen a liquid hydrocarbon component LH and a hydrogen-containing gas component HG (hydrogen-containing gas bubbles) entering as an LH-HG mixture into the plenum chamber 33 from tubes 32. The LH-HG mixture is introduced into the plenum chamber 33. In this preferred embodiment of the present invention, the annular or circumferential plates 27 are secured to and are supported by the radial ribs or spokes 26, each of which has a vertical or transverse width that is essentially equal to the vertical or transverse width of the annular or circumferential plates 27. The radial ribs or spokes 26 also function as a means for reducing a size of hydrogen-containing gas bubbles, especially over-size hydrogen-containing gas bubbles from the hydrogen-containing gas component HG. Those skilled in the art will readily recognize that the number of radial ribs or spokes 26 employed will depend on a number of factors, such as the anticipated number of over-size hydrogen-containing gas bubbles in the upwardly flowing hydrocarbon feed stream, the weight of the catalyst bed 10, etc. The interconnected plates 27 and radial ribs or spokes 26 form a web or web-like structure defining a plurality of annular mixture zones, generally illustrated as MZ in FIGS. 10 and 11. The annular mixture zones MZ are essentially continuous or are generally endless annular mixture zones MZ, and may contain or be subdivided into any reasonable desired number of mixture zones (or sub-mixture zones), such as $MZ_1$, $MZ_2$, $MZ_3$, $MZ_4$, $MZ_5$, and $MZ_6$ in FIGS. 10 and 11. Each of the individual mixture zones $MZ_1$, $MZ_2$, $MZ_3$, $MZ_4$, $MZ_5$, and $MZ_6$ is for all practical purposes an annularly continuous or endless mixture zone of uniform thickness, excepting a periodic interruption by radially ribs 26, which are relatively narrow vis-a-vis the spaced distance between any pair of contiguous ribs 26—26. As evident in FIGS. 10, 11, 12 and 13, concentric with mixture zone $MZ_1$ and as a partial bottom to same is imperforate center plate 25, which is preferably spaced from and off of the plate 31 and the screen 6 such that inert pellets 4 may be supported by the screen 6 and the plate 31 immediately underneath the imperforate center plate 25. Mixture zone $MZ_1$ is essentially a cylindrical annular mixture zone with an open top and boundaries defined by the space between a plurality of interengaged and coupled plates $27_1$s and the perimeter of the imperforate center plate 25.

The plurality of annular mixture zones MZ (or the annularly continuous or endless mixture zones $MZ_2$s, $MZ_3$s, $MZ_4$s, $MZ_5$s, and $MZ_6$s) under the catalyst bed 10 are concentric with respect to each other and are coaxial with respect to the reactor vessel 11 and the catalyst bed 10. The plates 27 may be radially spaced from each other at any suitable distance (preferably of uniform distance) to assist in accomplishing the desired objects of the present invention; however, preferably the plates 27 are radially spaced from each other at a generally uniform thickness or distance that ranges from about 1 inch to about 4 feet, more preferably from about 6 inches to about 3 feet, most preferably from about 1 foot to about 2 feet. The radially spaced relationship between and among the plates 27 generally defines a uniform thickness for each of the mixture zones (i.e. $MZ_2$s, $MZ_3$s, etc.). It is to be understood that while the plurality of annular mixture zones MZ is represented in FIGS. 2, 3, 10, 11, 12 and 13 as being a plurality of non-circular geometric-shaped zones (e.g. octagonal in FIGS. 2), the spirit and scope of the present invention includes that the plurality mixture zones MZ may comprise any geometric-shaped zones including not only polygonal-shaped zones, but also a plurality of concentric circular mixture zones, etc., all of which would also be concentric with respect to each other and coaxial with respect to the reactor vessel 11 and/or the catalyst bed 10 (or the hydroconversion reaction zone).

Figure 10:
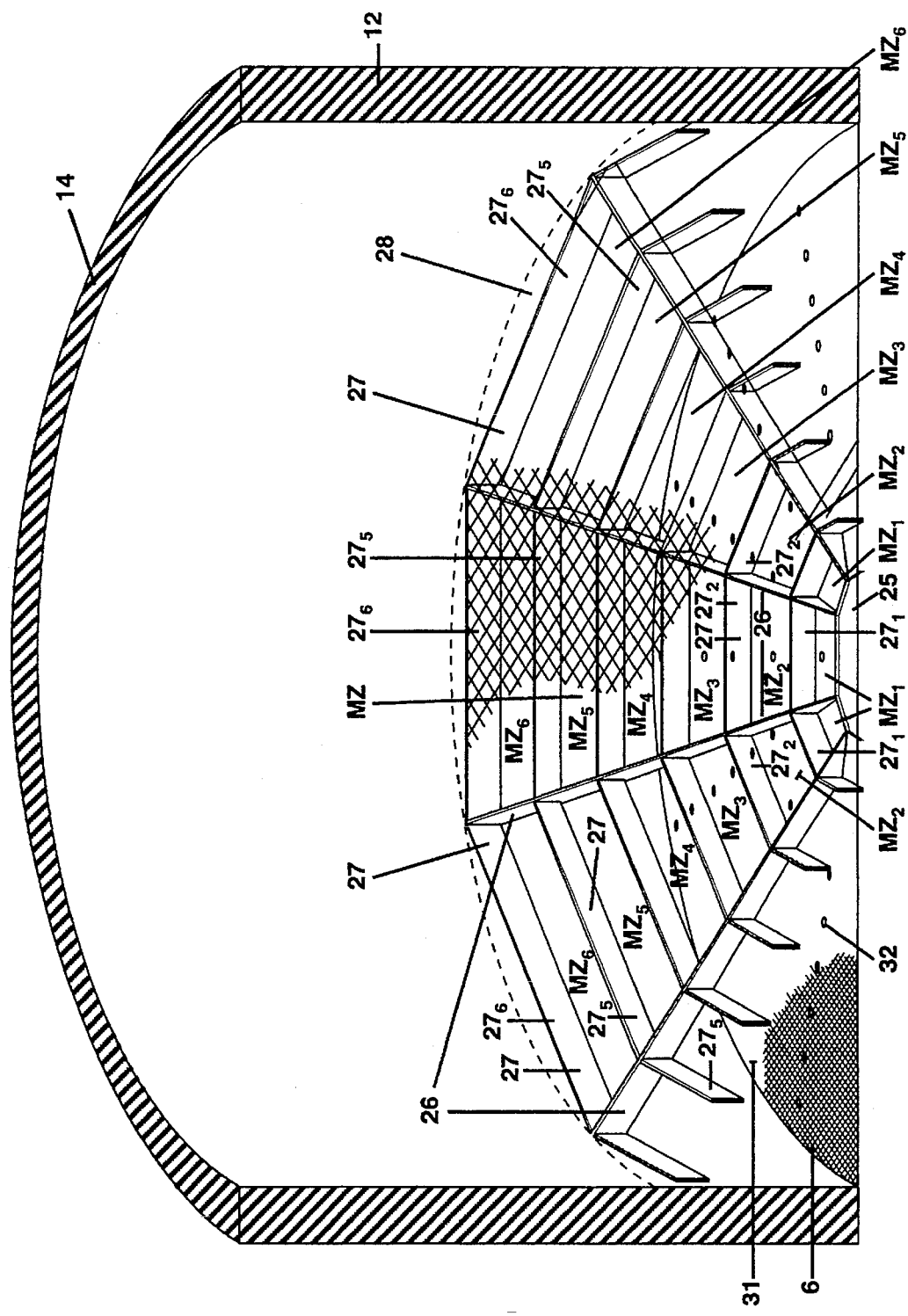
FIG. 10 is a partial cross-sectional view of the reactor and a partial perspective view of another embodiment of the catalytic support means.

Therefore, the plates 27 function to form generally uniform thick and essentially circular bands of concentric hydrocarbon feed streams that are also coaxial with respect to the catalyst bed 10. By way of example only and as best shown in FIGS. 2 and 10, angular mixture zone $MZ_2$ is defined by the eight (8) interengaged or intercoupled plates $27_1$s and the eight (8) interengaged or intercoupled plates $27_2$s. The eight (8) plates $27_1$s and the eight (8) plates $27_2$s each form an annulate boundary for the essentially circular band of hydrocarbon feed stream in mixture zone $MZ_2$. Because the spacing or distance between plates $27_1$s and $27_2$s is generally circumferentially uniform, the thickness or size of the essentially circular band of hydrocarbon feed stream in mixture zone $MZ_2$ is essentially uniform transversely and/or equal in transverse or horizontal cross section. Similarly, mixture zone $MZ_6$ is defined by the eight (8) interengaged or intercoupled plates $27_5$s and the eight (8) interengaged or intercoupled plates $27_6$s, the combination of which form annulate boundaries for the essentially circular band of hydrocarbon feed stream in mixture zone $MZ_6$. As was previously similarly indicated for plates $27_1$s and $27_2$s, because the spacing or distance between plates $27_5$s and $27_6$s is generally circumferentially uniform, the thickness or size of the circular band of hydrocarbon feed stream in mixture zone $MZ_6$ is essentially uniform transversely and/or equal in transverse or horizontal cross section. Plates $27_2$, $27_3$, $27_4$, and $27_5$ similarly functionally interengage and intercouple to define annulate boundaries for mixture zones $MZ_3$, $MZ_4$, and $MZ_5$. As indicated and as best shown in FIG. 2, ribs 26 extend radially from imperforate center plate 25 and planarly represent visually pie-shaped segments. Between any pair of contiguous ribs 26—26, the lengths of the respective plates 27 increase from plate $27_1$ to or towards plate $27_6$ while the widths are essentially the same as best shown in FIG. 3. Thus, plate $27_2$ is longer than plate $27_1$ while possessing the identical approximate width. Likewise: plate $27_3$ is longer than plate $27_2$, plate $27_4$ is longer than $27_3$, plate $27_5$ is longer than plate $27_4$, and plate $27_6$ is longer than plate $27_5$, while all the plates 27 simultaneously have generally the same width or the same longitudinal extension below the screen 28 (see FIG. 3). Thus, the vertical dimensions or the widths of the plates 27 (i.e. the structural extensions of the plates 27 that are generally parallel to the longitudinal axis of the reactor vessel 11 and/or the catalyst bed 10 therein) are generally equal. All plates 27 are preferably spaced such that the hydrocarbon feed stream flows parallel to the longitudinal axis of the catalyst bed 10 before contacting and entering the same. Both the upper edges and lower edges of plates $27_1$s, $27_2$s, $27_3$s, $27_4$s, $27_5$s, and $27_6$s are all at a different level or height, as best shown in FIGS. 3, 11, 12 and 13. The mixture zones MZ differ from a plurality of tubes, conduits, or pipe-like passages for introducing an essentially complete or essentially total cylindrical integral hydrocarbon feed stream into the catalytic bed 10.

As best shown in FIGS. 3 and 11, the upper and lower edges of plates $27_1$s are at a different level or height than the upper and lower edges of plates $27_2$s which are at a different level or height than the upper and lower edges of plates $27_3$s. Similarly, the upper and lower edges of plates $27_3$s are at a different level or height than the upper and lower edges of plates $27_4$s which are at a different level or height than the upper and lower edges of plates $27_5$s. The upper and lower edges of the latter are at a different level or height than the upper and lower edges of plates $27_6$s.

After the LH-HG mixture enters and flows through the screen 6 onto the plenum chamber 33, the flowing LH-HG mixture enters into each of the generally continuous annular mixture zones $MZ_2$s, $MZ_3$s, etc. for dividing or separating the flowing LH-HG mixture into a plurality of flowing generally continuous annular LH-HG mixtures, which have been designated LH-$HG_2$, LH-$HG_3$, LH-$HG_4$, LH-$HG_5$ and LH-$HG_6$ in FIG. 11. As was previously indicated, the bottom of mixture zone $MZ_1$ is also basically an annular or cylindrical shaped mixture zone defined by the space between the perimeter of the imperforate center plate 25 and intercoupled segmented plates $27_1$s and receives hydrocarbon feed stream (i.e. hydrocarbon liquid feed and/or hydrogen gas) in and through the space by which it is being defined. In a preferred embodiment of the present invention and as best shown in FIG. 13, before the flowing LH-HG mixture enters into each of the generally continuous annular mixture zones $MZ_1$s, $MZ_2$s, $MZ_3$s, etc., the LH-HG mixture flows around the plurality of inert pellets 4 in zig-zag fashions for reducing the possibility of eddy currents and for keeping bubbles of hydrogen gas diffused within the liquid hydrocarbon and preventing agglomeration of same into larger size bubbles. The hydrocarbon feed stream entering into mixture zone $MZ_1$ is designated LH-$HG_1$. The plurality of LH-HG mixtures (i.e. LH-$HG_1$, LH-$HG_2$, etc.) pass through the screen 28 and respectively enter into the catalyst bed 10 from each of the mixture zones (i.e. $MZ_1$s, $MZ_2$s, $MZ_3$s, etc.) at a flow rate such as not to ebullate, levitate or expand the catalyst bed 10 upwardly and/or towards the screen 15 and the domed head 14 by more than 10% by length beyond substantially the full axial length of the bed catalyst 10 in a packed bed state, such as the packed bed state reflected in FIG. 8. The plurality of generally continuous annular LH-HG mixtures flow upwardly through screen 28 and into the catalyst bed 10. The catalyst bed 10 in the present invention preferably comprises catalyst particles which are substantially the same and/or uniform size, shape, and density and which are selected in accordance with the average optimum velocity of the hydrocarbon feed stream (i.e. a mixture of a liquid hydrocarbon component LH and a hydrogen-containing gas component HG, or the continuous annular LH-HG mixtures) flowing into the plenum chamber 33 and subsequently into and through the plurality of mixture zones $MZ_2$s, $MZ_3$s, etc. The rates of flow of the plurality of the respective LH-HG mixtures (i.e. LH-$HG_1$, LH-$HG_2$, etc.) from the respective mixture zones $MZ_1$s, $MZ_2$s, etc., and thus also the flow rates of the hydrocarbon feed stream into plenum chamber 33 from and through line 16, are all to be controlled in an amount and to an extent sufficient to maintain expansion or levitation of the catalyst bed 10 to less than 10% by length over or beyond substantially the full axial length of the bed 10 in a packed bed state. More preferably, the expansion of the substantially packed bed of catalyst is limited to less than 5%, most preferably less than 2% or even less than 1%, by length over or beyond substantially the full axial length of the bed 10 in a packed bed state. Ideally the expansion of the substantially packed bed of catalyst is limited to essentially 0% by length.

The flow rate of the hydrocarbon feed stream through line is to be at a rate not substantially greater than the optimum rate of flow. The optimum rate of process fluid flow through the substantially packed bed of catalyst will vary from process unit to process unit based on several factors including oil and hydrogen feed characteristics, catalyst specifications, process objectives, etc. Based on catalyst particles having substantially the same and/or uniform size, shape and density, the flow rate of the hydrocarbon feed stream preferably ranges from about 0.01 ft/sec to about 10.00 ft/sec and more preferably from about 0.01 ft/sec to about 1.00 ft/sec. Similarly and/or likewise and further based on the catalyst particles having substantially the same and/or uniform size, shape, and density, the flow rate of the continuous annular LH-HG mixtures (i.e. the summation of the flow rates for LH-$HG_1$ through LH-$HG_6$ from mixture zones $MZ_1$s through $MZ_2$s respectively in FIG. 11) is to be at a rate not substantially greater than the optimum rate of flow, preferably ranging from about 0.01 ft/sec to about 10.00 ft/sec, and more preferably from about 0.01 ft/sec to about 1.00 ft/sec. The specific flow rate would depend as indicated on a number of variables, such as the particular application (e.g. demetallation or desulfurization etc.) of the hydroprocessing process. The specific flow rates however would be at any suitable rate controlled in an amount and to an extent sufficient to limit expansion of the substantially packed bed of catalyst to less than 10% by length over or beyond a substantially packed bed of hydroprocessing catalyst in a packed bed state.

In a preferred embodiment of the invention and for such a flow rate for the hydrocarbon feed stream and for such a flow rate for the continuous annular LH-HG mixtures, the catalyst particles preferably have the substantially same and/or uniform size, shape and density in order to obtain over the desired demetallation and/or desulfurization of the liquid hydrocarbon component LH in the hydrocarbon feed stream (i.e. LH-HC mixture) into produced hydrogen upgraded product fluids that are being withdrawn from the reactor vessel 11 through the center pipe 18. At the above indicated flow rates for the hydrocarbon feed stream flowing through line 16, and for the flow rates for the generally continuous annular LH-HG mixtures (i.e. LH-HG$_1$, LH-HG$_2$, etc.), the produced upgraded product fluids are being preferably withdrawn through the center pipe 18 from the reactor vessel 11 at a rate ranging from about 0.01 ft/sec to about 10.00 ft/sec and more preferably from about 0.01 ft/sec to about 1.00 ft/sec. The withdrawal rate(s) of the produced upgraded product fluids is not to be greater than the optimum rate of flow and will also vary from process unit to process unit based on several factors including oil and hydrogen feed characteristics, catalyst specifications, process objectives, etc. The specific withdrawal rate(s) would be any suitable withdrawal rate, controlled in an amount and to an extent sufficient to prevent and/or limit expansion of the substantially packed bed of catalyst to less than 10% (more preferably less than 5%, most preferably less than 2% or even less than 1%) by length over or beyond substantially the full axial length of the bed 10 in a packed bed state.

The arrangement in inlet distributor 31 for uniformly distributing hydrogen gas and liquid hydrocarbon feed as shown in FIG. 3 may be modified by lengthening or shortening tubes 32, forming uniformly distributed cylindrical passageways into plenum chamber 33. A particular advantage of using tubes 32, as compared to merely perforations or holes of adequate diameter, lies in the formation of a gas pocket under plate 31 in the areas around the individual tubes 32. We have found that this is desirable because such a gas pocket trapped beneath tray or plate 31 provides pressure surge dampening, which may result from flow changes of the mixture of hydrogen and liquid being supplied to the reactor vessel. However, the length of the tubes 32 is maintained as short as reasonably possible to so function. Again, this is because of the desirability of utilizing as little as possible of all processing space available in vessel 11 for anything but contacting the feed streams with conversion catalyst. A particular advantage to using tubes 32, as compared to a combination of tubes and perforations, is that the designed flow distribution pattern is maintained over a wider range of flow rates. With tubes and perforations, gas normally flows up the perforations and liquid flows up the tubes. However, gas will find new flow paths through the tubes if the gas flow increases or the perforations become plugged, resulting in undesigned and potentially undesirable flow patterns.

Figure 6:
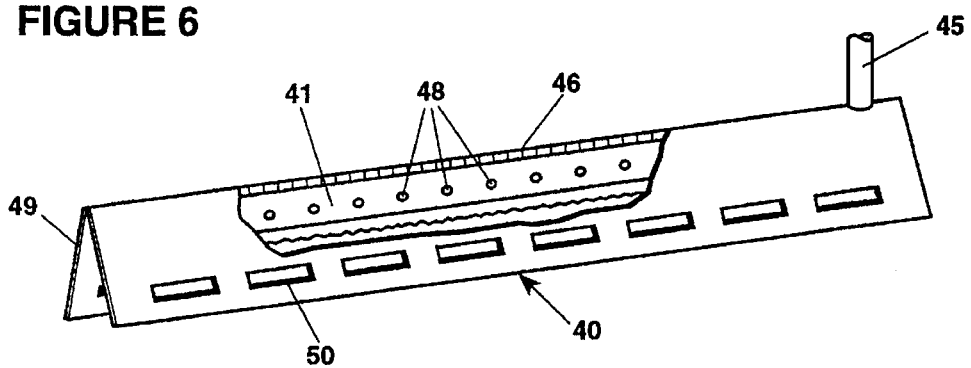
FIG. 6 is a perspective view, partially in cross-section, of one of the quench or redistribution shed units shown in FIG. 5.
Figure 5:
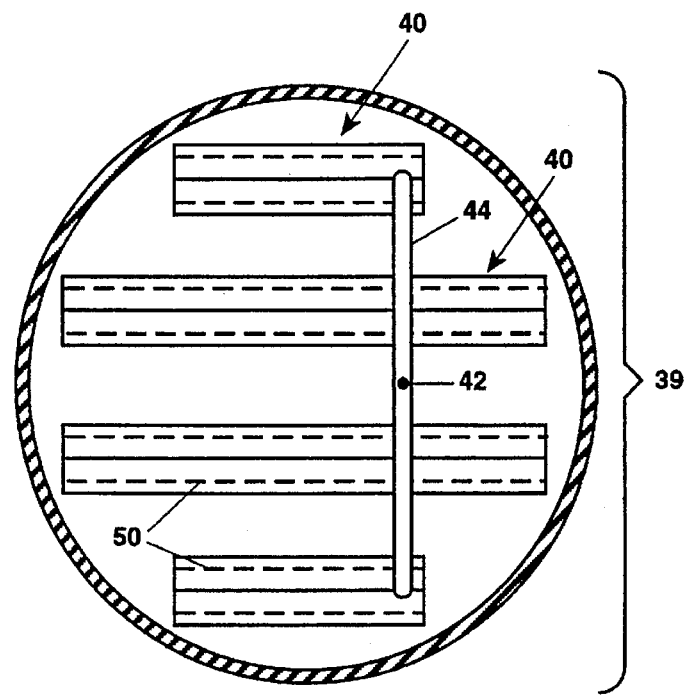
FIG. 5 is a cross-sectional plan view of the catalyst vessel taken in direction of the arrows and along the plane of line 5—5 in FIG. 1 showing a preferred form of gas redistribution and quench system over a central portion of the catalyst bed.
Figure 7:
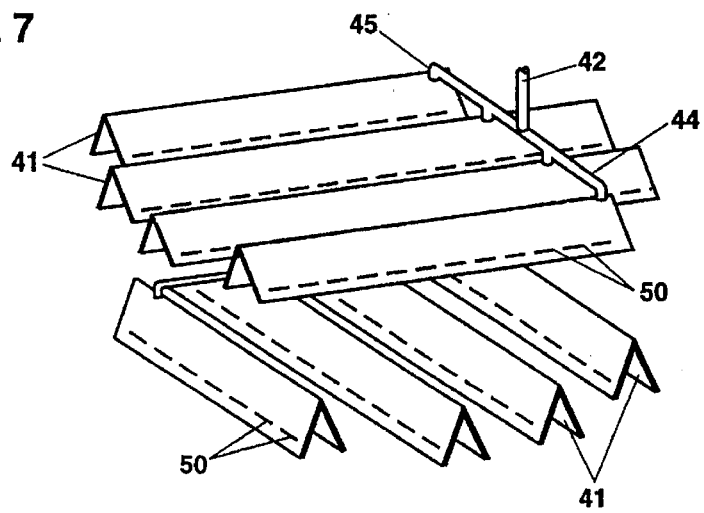
FIG. 7 is a perspective view of a preferred arrangement of two tiers of shed units of FIG. 5 at a given level in the catalyst bed.

To further assist in maintenance of plug-like flow of catalyst bed 10 throughout its axial length, there is additionally provided in a preferred form or embodiment of the invention a plurality of axially spaced apart hydrogen gas redistribution or hydrogen gas-quenching stages 39 within bed 10. In the arrangement of FIG. 1, the location of one of the gas redistribution stages 39 is illustrated by the single inverted angle member 40 extending transverse to the axis of bed 10. The details of quench system 39 are best seen in FIGS. 5 to 7 where a plurality of inverted V-shaped sheds 40 (i.e. inverted angle members 40) are equally distributed over at least one transverse row extending generally across the cross-sectional area of vessel 11. As shown in FIG. 6 and in FIG. 7, a gas injection line 42 feeds an elongated tube 41 extending through each individual shed 40 from a header 44 and branch lines 45 supplying the individual tubes 41.

Desirably, but not necessarily, a second tier of sheds 40 is axially spaced above the first tier, with the sheds 40 in each tier being positioned at 90 degree(s) to the other tier, as shown in FIG. 7. Construction of an individual shed 40 is best seen in FIG. 6, wherein distribution pipe 41 includes a plurality of discharge holes 48, desirably proportioned to give equal distribution of hydrogen gas along the full length of tube 41. Desirably, holes 48 are on the top side of tube 41 so that gas leaving the tube is forced to flow downwardly within shed 40 to join gas rising from bed 10 under the area enclosed by the V-sides 49 of shed 40. Preferably, the full length of each skirt formed by sides 49 includes equally spaced slots 50 to exhaust both rising gas from bed 10 and quench gas entering from line 42. A particular value of the present arrangement is that gas which may have become channeled in a portion of the bed below the quench system can be redistributed across the full cross-sectional area of the bed to further avoid generation of local hot spots, eddy currents, or ebullation, within the upper portion of bed In accordance with another significant aspect of the present invention, FIG. 1 shows a catalyst replacement system, which in general comprises a series of lock chambers for transferring fresh catalyst into bed 10 through a pair of pressure lock chambers, including charging vessel 60 and supply vessel 70. A similar series of lock chambers, including discharge vessel 80 and disposal vessel 90, transfer catalyst out of bed 10. If necessary, a single pair of vessels could be used to charge and discharge the catalyst, although the piping and sequencing procedure would be more complex. In both cases, transfer flow is specifically designed to be as a liquid slurry and laminar to avoid undue abrasion of catalyst particles going into reactor vessel 11 and to avoid abrupt agitation of the overlying bed of particles, with consequent ebullation and eddying of catalyst or fines in bed 10, when catalyst is withdrawn through inlet 30 of J-tube 29 at the bottom of reactor vessel 11.

To achieve laminar flow for supply of catalyst from charging vessel 60 to the top of reactor vessel 11 or for catalyst removal from the bottom of bed 10 to discharge vessel 80, it is essential that the pressure differential between reactor vessel 11 and vessels 60 or 80, be accurately controlled as by detecting the pressure differences between supply line 61 or discharge line 82 and reactor vessel 11. The pressure difference is best zero when shut-off valves 64 or 84 are first opened or closed. The pressure differences between vessel 11 and line 61 is measured by gage 63 and pressure detectors 62 and 65. Differential pressure gage 83 and detectors 81 and 85 serve a similar function to control transfer of catalyst through valve 84 from the bottom of reactor vessel 11 to discharge vessel 80.

With reference particularly to supply of catalyst from vessel 60, it will be understood, of course, that the vessel 60 is capable of being brought to a slightly higher pressure than the operating pressure of reactor vessel 11, and closely controlled to assure that catalyst supplied to vessel 60 from supply vessel 70 is by laminar flow. For this purpose, as indicated, vessels 70 and 60 are at atmospheric pressure, catalyst is first introduced into supply vessel 70 by way of funnel 100 through line 101 and valve 102, and nitrogen is preferably flushed through supply vessel 70 through line 106 and/or line 71 to eliminate air and moisture that may be present on the catalyst. Either before or after catalyst is introduced, vessel 70 is charged with a distillate hydrocarbon stream, preferably gas oil, to provide the necessary slurrying liquid for mixing and transporting catalyst. This may either be through funnel 100, valve 102, and line 101, or through line 104, valve 105 and line 106. Valve 102 is then closed and the catalyst is then preferably heated to dehydrate and eliminate water from the catalyst. It is to be understood that whenever the specification or the claims states, mentions, or implies "mixing" or "admixing" or "commingling", or any of the like, including of any type(s) of catalyst, such stated, mentioned, or implied verbiage means within the spirit and scope of the present invention any type of "mixing" or "admixing" or "commingling", or any of the like, including any incidental mixing or any otherwise non-thorough/non-homogeneous mixing. Preferably, however, any type of "mixing" or "admixing" or commingling", or any of the like, will be essentially thorough and/or essentially homogeneous.

An important requirement is that before transferring liquid to the charging vessel 60, the pressure in supply vessel 70 must be equalized to that in charging vessel 60, assuming, of course, that isolation valve 64 between vessel 60 and the reactor vessel 11 is closed, and also that valves 67, 68 and 78 are closed. With valves 64, 67, 68, 78 and 102 closed and pressure equalized between the vessels 60 and 70, transfer valve 75 may be opened to provide the same diameter path for the catalyst slurry to flow throughout the path from J-tube 71 to vessel 60. The transfer is closely controlled by regulating the nitrogen gas flow rate and pressure introduced from line 104 through valve 105. The pressure and flow rate are just sufficient to assure the desired laminar flow of catalyst into inlet 72 of J-tube 71 and thus upwardly through line 76 and into charging vessel 60, which forms a catalyst charging vessel. Laminar flow to transfer catalyst through J-tube 71 is entirely in the liquid phase, with the catalyst as a slurry in the gas oil. Transfer of all catalyst is assisted by the funnel shape of bottom 79 of vessel 70, and the position of intake 72 to J-tube 71 at the apex of bottom 79. If all the catalyst in vessel 70 is transferred to vessel 60, flush oil from vessel 70 will naturally clear all the catalyst out of line 76. However, to assure that all such catalyst has passed through valve 75 (so that valve 75 need not close on hard, abrasive catalyst with potential danger of scoring the valve 75 or the valve seat therein) additional flush fluid is preferably introduced from line 77 through valve 78 to clear line 76, either back into vessel 70, or forward into vessel 60.

With catalyst thus loaded into vessel 60, a similar procedure is used for transferring catalyst under laminar flow conditions as a liquid slurry into reactor vessel 11 through supply pipe 61 for distribution to the top 20 of bed 10. If desired, of course, a deflector plate (not shown) may be used to distribute catalyst evenly across the top of catalyst bed 20. However, we have found that such a distribution aid is not required. In the transfer of catalyst from the charging vessel 60 to reactor vessel 11, it will be understood that the pressure in vessel 60 is brought to the pressure of reactor vessel 11. This is done by injecting process hydrogen through valve 67. The oil should be heated to a temperature as close as possible to the temperature of reactants in vessel 11, without vaporizing the oil. We have found this to be particularly important to minimize any disturbance of the hydroprocessing process when fresh catalyst is added to an onstream reactor vessel, such as reactor vessel 11. Once these requirements are met, valve 64 should be opened for transfer. The actual laminar transfer of the liquid slurry is controlled by valve 67 throttling the flow and pressure of hydrogen admitted from line 66. After transfer of the catalyst, valve 68 in flush line 69 is opened briefly to assure that any catalyst left in lines 61 and 19 is cleared before valve 64 is closed, for the reasons noted before. Excess hydrogen pressure in vessel 60 may be relieved in a controlled manner via a suitable bleed line running back to the common hydrogen source (not shown) of the hydroprocessing system.

Substantially continuous or intermittent transfer of deactivated catalyst for regeneration or disposal from the bottom of catalyst bed 10 in reactor vessel 11 to discharge vessel 80 is controlled in the same manner. As in all transfer of catalyst throughout the system of the present invention depicted in FIG. 1, the flow path from inlet 30 of J-tube 29, through line 82, including the bore of valve 84, is uniform in cross-sectional area and diameter. Similarly, transfer from discharge vessel 80 to disposal vessel 90 is through inlet 89 of J-tube 86 to discharge outlet 98 of line 92, including valve 94, into vessel 90. Deactivated catalyst is transferred laminarly from the bottom of the catalyst bed 10 as a slurry in the hydrocarbon feed stream which, as previously mentioned, comprises the liquid hydrocarbon feed stream or a mixture of hydrocarbon liquid feed and hydrogen-containing gas. Typically, the catalyst is transferred essentially in the liquid hydrocarbon feed stream (i.e. the liquid component of the hydrocarbon feed stream).

In general the diameter of these laminar flow passageways are at least five times, and may be as high as fifty or more times, the diameter of the individual particles to be passed therethrough. In this connection to avoid jamming or obstruction, the inlets 72, 109, 30, 89 and 99 into their respective tubes 71, 108, 29, 86 and 96 are not flared or otherwise restricted, or perforated, so that all flow is solely and directly through the full and equal bore of such inlets. In the case of catalyst removal from reactor vessel 11, inlet 30 of tube 29 is positioned at and over unperforated center plate 25 of catalyst support screen means 17, so that it is out of the direct flow of any hydrogen gas stream rising through the innermost annular passageway formed by walls 27 and radial ribs or spokes 26. This assures that flow into entry 30 is substantially a liquid only slurry mixture with catalyst particles. Such a mixture at laminar flow conditions produces maximum carrying capacity of the fluid. Additionally, the external dimensions of the circular bend or arc portion of the J-section of the tube 29 is several times the diameter of inlet 30 and the connected flow path, including the downwardly directed portion. The portion of tube 29 above inlet 30 is many times shorter and smaller in volume than the remainder of J-tube 29, down to, and including, control valve 84. A particular advantage of keeping this portion of tube 29 small is to avoid the necessity of forcing substantial amounts of catalyst back into the bed 11 against the gravity head of catalyst bed 10 when that portion of the line is cleared at the end of each transfer.

Desirably, during periods when the catalyst is not being transferred, a small amount of hydrogen may be continually bled through valve 88 into bed 10 through J-tube 29 to assure that catalyst particles do not clog entry 30. This avoids potential build up of coke at entry 30 of pipe 29. Such an arrangement assures that catalyst can be withdrawn by laminar flow without artificially fluidizing or levitating bed 10 directly adjacent to J-tube entry 30.

Because gravity drainage of catalyst by an opening through the center of the catalyst support screen means 17 is not required in the present arrangement, as in the prior art, it is possible to operate the entire system without use of solids handling valves. Accordingly, each of the transfer valves in the present arrangement are preferably conventional ball valves formed with a single through bore in a rotatable ball. Specifically, we have found that conventional valves used to feed and control flow of hydrocarbons, catalyst and hydrogen, into and out of the vessel 11, must seal against high pressure differentials between the vessel and the transfer vessels. For this service, a solid satellite, spherical-ball valve having a through bore of the same diameter as the inlet and outlet lines to the valve and metal-to-metal seals, provides superior service when used in the catalyst transfer lines for carrying out the method of the present invention. Further, their commercial cost and ready availability for such severity of service makes them most useful economically, both for initial installation and for service replacement. Valves manufactured by The Kaymr and Mogas Companies, called full-port valves are particularly useful in the present embodiment. Further, the arrangement permits transfer of catalyst almost exclusively in a liquid phase which substantially reduces abrasion or comminution of catalyst particles during transfer. Additionally, exclusion of entrained gas substantially improves the efficiency of liquid transfer of catalyst particles and further reduces potential damage to the catalyst.

Figure 4:
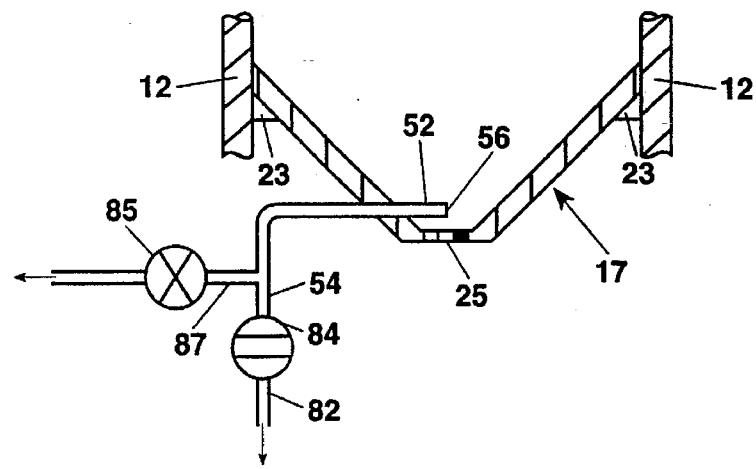
FIG. 4 is a partial elevational view of an alternate form of a laminar flow arrangement for withdrawing deactivated catalyst particles from the reactor bed.

FIG. 4 illustrates a partial view of the bottom of pyramidal catalyst bed support means 17 showing an alternate system for transferring catalyst in a laminarly flowing liquid. In this embodiment, an L-valve is formed by vertical tube 54 and horizontal tube 52 for withdrawing catalyst particles from the bottom of bed 10. As shown, intake 56 is preferably directly above the central, non-perforated, section 25 of the truncated pyramid formed by support means 17. While such an arrangement is less preferred than that shown in the embodiment of FIG. 1, such an arrangement is made suitable by the fact that the slurry of liquid and catalyst can be made to flow only under laminar flow conditions. With either the J-tube of FIG. 1, or the L-valve of FIG. 4, arrangements, the pressure in discharge vessel 80 is brought up to equal that in reactor vessel 11. Valve 84 is opened and catalyst flow is controlled, as seen in FIG. 1, by regulating flow through valve 93. Such flow decreases the gas-pressure in discharge vessel 80 and line 82 sufficiently to induce a laminar flow of catalyst particles from vessel 11 when transfer valve 84 is opened. After valve 84 has been flushed with vacuum gas oil through valve 88 and line 87 and then closed. The pressure in vessel 80 is then reduced to a lower pressure (about 50 psig or less). The residuum is drained from discharge vessel 80 through drain line 120, below J-tube 86 and conical screen 121. Flush oil is then sent in through valve 93 to wash residuum off the catalyst and to cool the catalyst. The discharge vessel 80 can be drained and filled as many times as needed. The pressure in disposal vessel 90 is made equal to that in vessel 80 and valve 94 is opened. The flow and pressure are then controlled through valve 110 to induce laminar flow of catalyst through J-tube 86 and into disposal vessel 90. Valve 94 is flushed with flush oil through valve 107 and closed. The contents of the disposal vessel 90 is preferably washed and cooled with flush oil which is then drained through drain line 122 below conical screen 123. The spent catalyst contents of the disposal vessel 90 is then washed with water if desired through valve 110. The disposal vessel 90 should be purged of any hydrogen by sending in nitrogen gas also through valve 110. Finally, disposal vessel 90 is nearly depressurized and the catalyst is dumped using water as the carrier fluid through J-tube 96 by nitrogen flow through valve 110 to control the rate of catalyst flow in discharge pipe 124.

Continuing to refer to the drawings for other preferred embodiments of the present invention, a method is provided for maximally occupying a reactor volume with a substantially packed bed of hydroprocessing catalyst (e.g. catalyst bed 10) during hydroprocessing by contacting the substantially packed bed of hydroprocessing catalyst with an upflowing hydrocarbon feed stream having a liquid component and a hydrogen-containing gas component. As previously indicated, a "substantially packed bed" of hydroprocessing catalyst may be defined as a bed of hydroprocessing catalyst in a state of posture where a hydrocarbon feed stream is upflowing therethrough, but in a controlled amount and to an extent that the catalyst bed 10 expands to less than 10% by length over or beyond substantially the full axial length of the catalyst bed 10 in a packed bed state. The substantially packed bed of hydroprocessing catalyst is disposed in the reactor zone within the reactor volume such that the substantially packed bed of hydroprocessing catalyst maximally occupies the reactor volume. The substantially packed bed of hydroprocessing catalyst occupies at least about 50% by volume of the reactor volume; preferably at least about 60% by volume; and more preferably at least about 65% or 70% by volume of the reactor volume. In a broader aspect of the present invention, the substantially packed bed of hydroprocessing catalyst, preferably comprising a plurality of catalytic particulates having substantially the same and/or uniform size, shape and density, is disposed in a reactor zone (or reaction zone or zone for reaction) contained within a reactor volume (e.g. the entire internal volumetric space available within the reactor vessel 11) such that the substantially packed bed of hydroprocessing catalyst occupies from about 75% by volume to about 98% by volume of the reactor volume; more preferably from about 80% by volume to about 98% by volume; most preferably at least about 90% by volume or from about 90% by volume to about 95% by volume of the reactor volume. Stated alternatively for the broader aspect of the present invention, hydroprocessing catalyst is disposed or otherwise positioned within a reactor volume such that hydroprocessing catalyst occupies from about 75% by volume to about 98% by volume of the reactor volume; more preferably from about 80% by volume to about 98% by volume; most preferably at least about 90% by volume or from about 90% by. volume to about 95% by volume of the reactor volume. "Reactor volume" (or the entire internal volumetric space available within the reactor vessel 11) means or may be generally defined as the volumetric space within the reactor vessel 11 (or any similar hydroprocessing reactor vessel), including the summation or addition of the following internal volumes: (i) an internal volume within the reactor vessel 11 represented by a volume (or internal cylindrical volume or main body volume of the reactor vessel 11) spanning or extending from an upper tangent line 180 (see FIG. 8) to a lower tangent line 182 and generally illustrated as arrow TL in FIG. 8; and (ii) an internal volume within the upper dome closure end 14 (or hemispherical head) of the reactor vessel 11; and (iii) an internal volume within the lower dome closure end 13 (or hemispherical bottom) of the reactor vessel 11. A "tangent line" is known to those skilled in the art as a plane (i.e. horizontal plane) taken generally along the junctures of the sidewall 12 (which is essentially a straight upright wall) of the reactor vessel 11 with the upper and lower dome closure ends 14 and 13 respectively.

A hydroprocessing feed stream including a liquid component and a hydrogen-containing gas component upflows into the substantially packed bed of hydroprocessing catalyst at a rate of flow such that expansion of the substantially packed bed of hydroprocessing catalyst is limited to less than 10% by length beyond a substantially full axial length of the substantially packed bed of hydroprocessing catalyst in a packed bed state. A volume of the hydroprocessing catalyst is withdrawn from the reactor zone to commence essentially plug-flowing downwardly of the substantially packed bed of hydroprocessing catalyst within the reactor zone; and hydroprocessing replacement catalyst is added to the essentially plug-flowing downwardly, substantially packed bed of hydroprocessing catalyst at a rate to substantially replace the volume of the withdrawn hydroprocessing catalyst. The procedure may be repeated as many times as desired, even continuously repeated during continual hydroprocessing.

Another method is provided for hydroprocessing a hydrocarbon feed stream that is upflowing through a hydroconversion reaction zone having a substantially packed bed of catalyst which comprises forming a plurality of annular mixture zones under a hydroconversion reaction zone having a substantially packed bed of hydroprocessing catalyst such that each of the annular mixture zones contains a hydrocarbon feed stream having a liquid component and a hydrogen-containing gas component and wherein the annular mixture zones are concentric with respect to each other and are coaxial with respect to the hydroconversion reaction zone. The hydrocarbon feed stream from each of the annular mixture zones is introduced into the substantially packed bed of hydroprocessing catalyst to commence upflowing of the hydrocarbon feed stream from each of the annular mixture zones through the substantially packed bed of the catalyst.

Considering the range of hydroconversion systems and/or hydroconversion reaction zones which could benefit from the preferred embodiments of the present invention, one skilled in the art will appreciate the variety of catalysts, having a variety of physical properties and elemental compositions, which could be used in such a range of systems. It is within the spirit and scope of the present invention to encompass these systems employing catalysts having a size, shape and density which vary widely from system to system. However, it is preferable for the present preferred embodiment of the invention, and as taught in U.S. Pat. No. 5,076,908 to Stangeland et al, that the catalyst particles be of uniform and/or same size, and shape (same density when in fresh catalyst state) within a single hydroconversion reaction zone of a hydroconversion system, in order to achieve the desired catalyst and hydrocarbon flow patterns within the hydroconversion reaction zone. Stangeland et al more specifically teaches packing reactor vessel 11 with at least one bed of catalyst particles having substantially the same size, shape and density over the axial length of the reactor vessel. The catalyst particles are to be selected in accordance with the average optimum velocity of the hydrocarbon feed stream (including any gas components) flowing through the catalyst bed 10. Plug-like flow of the substantially packed bed of catalyst is achieved in accordance with Stangeland et al's teachings by selecting the average density, size and shape of the catalyst particles forming the catalyst bed 10 so that the bed expands by less than 10% by axial length at the maximum anticipated fluid flow velocities of the gaseous and liquid components therethrough. To this end, the size, shape, and density of fresh catalyst particles supplied to the bed are to be substantially the same size, shape, and density, and selected in accordance with the designed maximum rate of flow of the feed streams to prevent ebullation. It is to be understood that whenever the specification or the claims states, mentions, or implies "fresh catalyst", such stated, mentioned, or implied "fresh catalyst" means within the spirit and scope of the present invention any type of catalyst having any usable catalyst life or activity (e.g. regenerated catalyst, rejuvenated catalyst, partially fouled catalyst obtained from any source, etc.). Preferably, "fresh catalyst" means a type of catalyst that has never been used before and is obtained directly from a manufacturer with the lowest desired density and the highest desired catalyst life or activity.

A hydroconversion system and/or a hydroconversion reaction zone of a present preferred embodiment of the present invention contains as indicated the preferred catalyst having substantially the same and/or uniform size, shape, and density, and may also be operated as a fixed bed (i.e. a catalyst bed which does not expand), a moving bed, an ebullated bed, an expanded bed or a fluidized bed configuration. A moving bed system is preferred. By "moving bed", as used herein, is meant a reaction zone configuration in which a catalyst is added at one end of a catalyst bed in an intermittent or substantially continuous manner and is withdrawn at the other end in an intermittent or substantially continuous manner. A "moving bed" also includes a "plug-flow" or "plug flowing" catalyst bed 10 or substantially packed bed of catalyst. As previously indicated, when any type of catalyst or catalyst bed 10 movement is mentioned, stated, or implied, the spirit and scope of the present invention includes such type of movement on any type of basis or in any manner. (e.g. "periodic", "fully continuous", "non-continuous" etc.) without the necessity of having to specifically mention the type of basis or manner. Preferably, catalyst is added at the top of the reaction zone and withdrawn at the bottom. In the type of moving bed to which the present preferred embodiment is directed, the catalyst particles in the bed are substantially in contact with one another and plug-flow downwardly. The catalyst bed is not significantly expanded when process fluids (e.g., liquid and gas) passes through it. It has essentially the character of a fixed bed except for maybe a slight expansion upwardly and for the addition and removal of catalyst. As the term is used herein, a "moving bed" is not the same as a "fluidized bed", "ebullating bed" or "expanded bed". In fluidized beds, the flow rate of a single phase fluid, relative to the particles of the catalyst, is fast enough so that the catalyst behaves like a fluid, with particles circulating throughout the bed or even being carried out of the bed with the products. Ebullating or expanded beds are very similar to fluidized beds, except that the relative rate of flow of two phase fluids (e.g., liquid and gas) is regulated to expand the catalyst bed in random motion between 110% and 140% of the height of the catalyst in a "slumped" or packed state. The typical ebullating bed reactor will have a mass of solid particles whose gross volume in the reaction vessel is at least 10 percent larger when feed is flowing through it, as compared to the stationary mass with no feed flowing through it. Although the particles in the bed do not necessarily circulate as if they were fluids, they are separated from one another and go through random motion.

Several advantages ensue from use of a moving bed reactor. By establishing and maintaining appropriate gas and liquid velocities in packed bed type reactors, just below the threshold of inertia that would cause the catalyst bed to fluidize and/or "channel" and/or lift the catalyst into random motion, the uniform catalyst characteristics described above will allow the catalyst to migrate downward through the reactors in a predictable plugflow manner, as catalyst batches are withdrawn from the reactor bottom. And further, by maintaining plug flow catalyst movement downward within the reactors (e.g. reactor 11), the catalyst within the reactors can be maintained in layers having differing activity levels and reaction rates. The number of catalyst layers depend on the frequency of catalyst addition and withdrawal, and the amount added and withdrawn in any given period of time. Typically, however, the number of different aged catalyst layers within the reactor (e.g. reactor 11) will be in the range from 10 to 60.

Intermittent or continuous catalyst additions and withdrawal may be used. Catalyst replacement rates can range from several percent of the charge per day to several percent of the charge per week, depending on the reactor size, catalyst metals loading capacity, feed rate, and feed composition and processing objectives. Fresh catalyst is introduced into the downstream end of the catalyst bed (e.g. catalyst bed 10), and a corresponding volume of deactivated catalyst is removed from the upstream end of the catalyst bed, at a rate which is sufficient to maintain the actual overall average level of catalytic upgrading activity of the bed as a whole at or above the selected minimum average activity level. By "upstream" end of the catalyst bed (e.g. catalyst bed 10), as used herein, is meant the end of the moving bed into which the heavy hydrocarbonaceous feed is introduced. By "downstream" end of the catalyst bed is meant the end of the bed from which the process effluent is recovered. In a normal gravity flow system, the catalyst is added and effluent removed at the top of the vessel (the downstream end). Spent catalyst is withdrawn and feed introduced at the bottom (the upstream end).

In a particularly important application of the present invention, catalyst is continuously added at the top of the reactor (e.g. reactor 11) to the slowly moving bed (e.g. bed 10), and spent (and deactivated catalyst) catalyst is continuously withdrawn from bottom of the slowly moving bed. The deactivated catalyst is removed from the reactor (e.g. reactor 11) after it has been deactivated to a substantially lower level of activity than an acceptable minimum average level of activity of the overall catalyst bed. This allows more efficient and complete use of the catalyst activity, e.g. its metals capacity, for such feed upgrading functions as demetallation. As previously indicated, spent (and deactivated) catalyst is withdrawn from the bottom of a reactor in a hydrocarbon liquid. One of the features of the present invention is that the hydrocarbon liquid that is withdrawing and transporting catalyst is the liquid hydrocarbon component LH which is intended to flow upwardly through the bed of catalyst but has not. Thus, one of the features of the present invention is that the hydrocarbon liquid for transporting spent (and deactivated) catalyst is an unconverted liquid hydrocarbon component LH or a partially converted liquid hydrocarbon component LH or a mixture of both; and the transporting hydrocarbon liquid (i.e. the liquid hydrocarbon component LH) has not passed entirely upwardly through the catalyst bed.

The product from the method of the present invention exits a reactor (e.g. reactor vessel 11) and is normally subjected to further conventional refinery processing. All or part of the product can be passed to a conventional, fixed bed upgrading operation, such as a hydrodesulfurization operation. Part of the product stream can be recycled, either for further catalytic treatment or as a diluent. Treatment of heavy feeds by catalytic demetallation according to the present process followed by fixed bed desulfurization is particularly effective, but all or part of a demetallized product from the countercurrent demetallation reaction zone can also be processed in a countercurrent moving bed desulfurization reaction zone.

The present preferred embodiments of the present invention are applicable to hydroconversion reaction zones for hydrocracking, hydrodemetallation, hydrotreating, hydrodesulfurization, hydrodenitrification, hydrofinishing and the like, all of which catalytically upgrade a heavy hydrocarbonaceous oil that represents the liquid hydrocarbon stream or liquid hydrocarbon feed stream (i.e. the liquid hydrocarbon component LH). By "heavy" liquid hydrocarbon stream, as used herein and as previously indicated, is meant liquid hydrocarbon stream at least 50 volume percent of which boils above about 204° C. and which preferably contains a substantial fraction boiling above about 343° C. and particularly preferably above about 510° C. Preferred liquid hydrocarbon streams are residual fractions and synthetic crudes. They can be derived from crude petroleum, from coal, from oil shale, from tar sand bitumen, from heavy tar oils, and from other synthetic sources. The present invention is advantageously employed to refine highly refractory and contaminated liquid hydrocarbon streams. The liquid hydrocarbon stream may be substantially free from finely divided solids such as shale fines, sand or the like. Alternatively, the liquid hydrocarbon stream may contain a substantial concentration (e.g. about 1 weight percent or more) of finely divided solids. As previously indicated, the liquid hydrocarbon stream (i.e. the liquid hydrocarbon component LH) is preferably premixed with any type of hydrogen-containing gas (i.e. the liquid hydrocarbon component HG) which is preferably hydrogen, before being introduced into the reactor vessel 11 as a single stream or hydrocarbon stream. The mixing ratios of the liquid hydrocarbon stream to the hydrocarbon containing gas may be any suitable ratio, well known to those artisans possessing the ordinary skill in the art.

Typically, a heavy hydrocarbonaceous oil employed as a hydrocarbon feed stream in the present invention contains undesirable metals. Undesirable metals which are often present in hydrocarbonaceous feeds notably include nickel, vanadium, arsenic, and iron. These metals deactivate conventional, fixed bed catalysts (such as fixed bed hydroprocessing catalysts) and also rapidly and irreversibly deactivate catalysts when high metals level feed are charged directly to conventional units. These metals are often present as organo-metallic compounds. Thus, the use of the terminology "iron, nickel, arsenic or vanadium compounds" means, those metals in any state in which they may be present in the hydrocarbon feed stream in the process of the present invention, either as metal particles, inorganic metal compounds, or an organo-metallic compounds. Where amounts of metals are referred to herein, the amounts are given by weight based on the metal itself. For maximum efficiency in such a countercurrent demetallation process, the hydrocarbon feed stream should have levels of undesirable metals greater than about 150 ppm by weight of the hydrocarbon feed stream, preferably greater than about 200 ppm by weight of the hydrocarbon feed stream, and more preferably greater than about 400 ppm by weight. Although nickel, vanadium, arsenic, and iron are the usual metal contaminants, other undesired metals, such as sodium and calcium, may also contribute to the metals content Of the hydrocarbon feed stream for purposes of catalytic demetallation upgrading processing.

Catalytic upgrading conditions (e.g. catalytic desulfurization conditions, catalytic hydrogenation conditions such as designed for asphaltenes saturation, catalytic denitrification conditions and catalytic hydrocracking conditions, etc.) employed in the hydroconversions reaction zones within the reactor vessel 11 for preferred embodiments of the present invention all include a reaction temperature generally in the range of from about 230° C. to about 480° C., a pressure generally in the range of from about 30 to about 300 atmospheres, a hydrogen rate ranging from about 1000 to about 10,000 standard cubic feet per barrel of feed, and a liquid hourly space velocity (LHSV) in the range of from about 0.20 h$^{-1}$ to about 10 h$^{-1}$. For feed demetallation upgrading, the temperatures and pressures within the reaction zone can be those typical for conventional demetallation processing. The pressure is typically above about 500 psig (514.7 psia; 35.5 bar). The temperature is typically greater than about 315° C., and preferably above 371° C. Generally, the higher the temperature, the faster the metals are removed; but the higher the temperature, the less efficiently the metals loading capacity of the demetallation catalyst is used. While demetallation reaction can be conducted in the absence of added hydrogen, hydrogen is generally used and therefore requires full and equal distribution into the moving bed along with any gases evolving from the feed.

In carrying out a process of the preferred embodiments of the present invention, a minimum average level of catalytic feed upgrading activity for the countercurrently moving catalyst bed (e.g. catalyst bed 10) as a whole is selected for the particular catalytic upgrading reaction. For a moving bed (e.g. catalyst bed 10) in a demetallation reaction system, for example, the minimum average upgrading activity level for the catalyst bed is one which removes the necessary amount of metals from the hydrocarbon feed stream when it passes through the moving bed at demetallation conditions. Similarly, for a desulfurization reaction system, the moving catalyst bed (e.g. catalyst bed 10) removes the necessary amount of sulfur from the hydrocarbon feed stream when it passes through the moving bed at desulfurization conditions. Thus, as will be apparent to those skilled artisans, the minimum average upgrading activity level for a particular reaction system will depend on the desired degree of a contaminant, such as metals, sulfur, nitrogen, asphaltenes, etc., which the refiner desires to remove from the heavy oil feed. The degree of demetallation or desulfurization (or etc.) will typically be set by economics and the downstream processing that the heavy feed will undergo. Further, according to preferred embodiments of the present invention, the actual average level of catalytic upgrading activity for the catalyst bed (e.g. catalyst bed 10) as a whole is measured. Measurement of the actual average level of upgrading is made by determining the extent to which the hydrocarbon feed stream is being upgraded in the countercurrent moving bed system. For example, when upgrading involves demetallation, demetallation activity is measured by a determination of the residual concentration of metals remaining in the liquid effluent stream from the moving bed system. When upgrading involves desulfurization, desulfurization activity is, analogously, measured by a determination of the residual concentration of sulfur remaining in the liquid effluent from the reaction system. Overall catalyst bed upgrading activity for other upgrading reactions is measured in a similar manner by determining the residual amount of the containment which is to be removed by the process. In the present preferred embodiments, the rate at which catalyst is removed from the reaction zone, and the rate of catalyst replacement to the reaction zone, is established by a number of economic and operating factors, which include maintaining a desired average level of catalytic upgrading activity.

Referring in detail now to FIGS. 14-25 for another preferred embodiment of the present invention, there is seen another embodiment of the quench system 39 for not only further assisting in maintenance of plug-like flow of catalyst bed 10 throughout its axial length, but to also assist in: (i) reducing hydrogen-containing gas traffic (i.e. hydrogen-containing gas component velocity) in the upper reaction zones of the catalyst bed 10 to thereby maintain and assure predictable non-ebullated, substantially packed (catalytic) bed conditions; (ii) transferring reactor interstage cooling or quench load responsibility from an all process quench gas medium to a quench medium selected from the group consisting of quench gas, quench liquid, and mixtures thereof, or in some instances to a quench medium consisting entirely of process quench liquid; and (iii) controlling the quench gas portion of any combined liquid/gas quench medium to maintain hydrogen-containing gas balance based on hydroprocessing process chemical requirements, and not necessarily the complete cooling and/or quenching requirements, and (iv) switching primary control of reactor interstage cooling and/or quenching to a quench liquid matter or quench liquid stream that is backed up automatically by a quench gas matter or quench gas stream in the event that flow of the quench liquid matter or quench liquid stream is interrupted for some reason. The quench system 39 in this preferred embodiment of the present invention may be employed with and/or within any type of hydroprocessing process including but not limited to fixed bed hydroprocessing, ebullated or expanded bed hydroprocessing, etc.

The quench system 39 for the embodiment of the invention depicted in FIGS. 14-25 comprises a primary quench medium furnishing assembly, generally illustrated as 130; and a secondary quench medium furnishing assembly, generally illustrated as 132 and secured to and/or coupled to and communicating with the primary quench medium furnishing assembly 130 for receiving a quench medium or matter (i.e. a liquid quench and/or a gas quench) and for distributing the same into the catalyst bed 10 in accordance with a procedure to be further explained in detail hereafter. A support means, generally illustrated as 134, is secured to and/or coupled to reactor vessel 11 (i.e. an internal circumferential surface of the reactor vessel 11) and to the primary and secondary quench medium furnishing assemblies 130 and 132 for maintaining the primary and secondary quench medium furnishing assemblies 130 and 132 in a suspended relationship within and with respect to the catalyst bed 10 and for keeping the two assemblies 130 and 132 in a generally stationary posture with respect to the reactor vessel 11.

Figure 24:
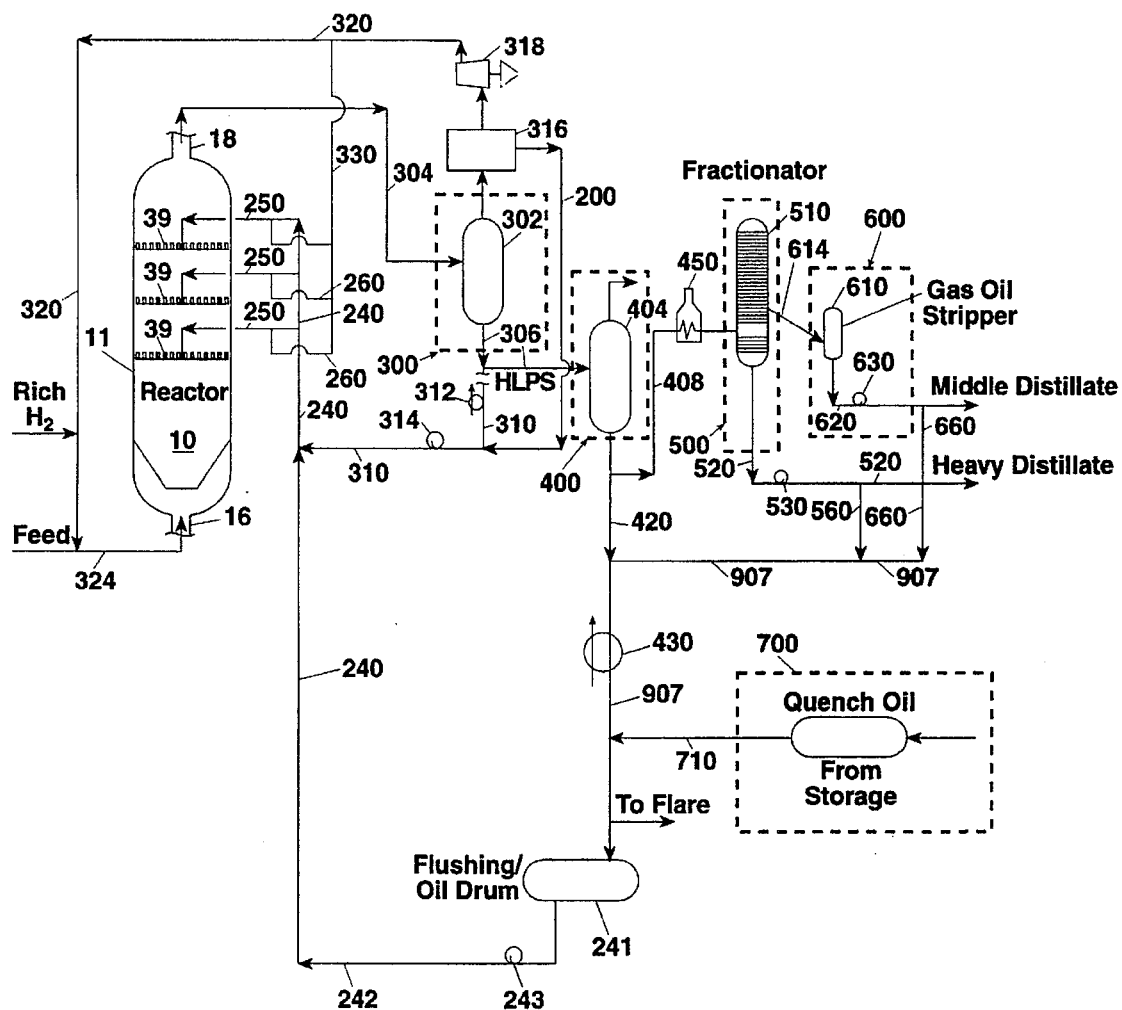
FIG. 24 is a schematic and/or flow diagram of a hydroprocessing vessel or reactor identifying and communicating with various possible sources for a quench matter for the quench system(s) or assembly(ies) of the present invention.

The primary quench medium furnishing assembly 130 preferably comprises a primary hollow quench medium receiving member 138, which is preferably a quench conduit header 142, for receiving a quench or quenching medium or matter that has been or is being transported thereto from a source for quenching external to the reactor vessel 11. FIG. 24 illustrates and identifies a variety of candidates for sources of a quenching medium or matter. The candidates for quench sources in FIG. 24 will be described in detail below.

Figure 17:
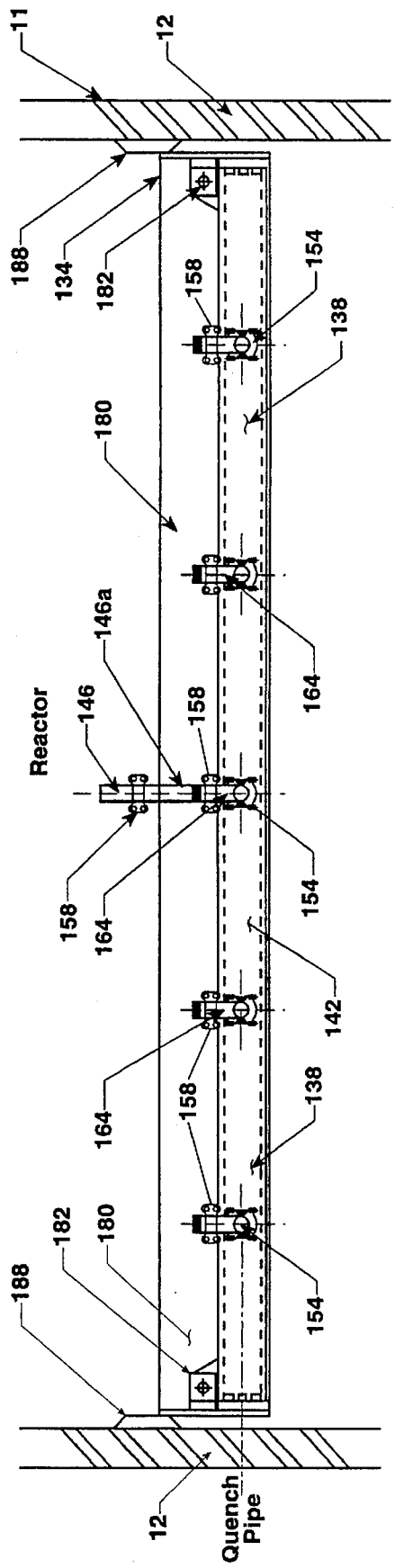
FIG. 17 is an enlarged, partial sectional, side elevational view of the quench system(s) or assembly(ies) of the present invention.
Figure 18:
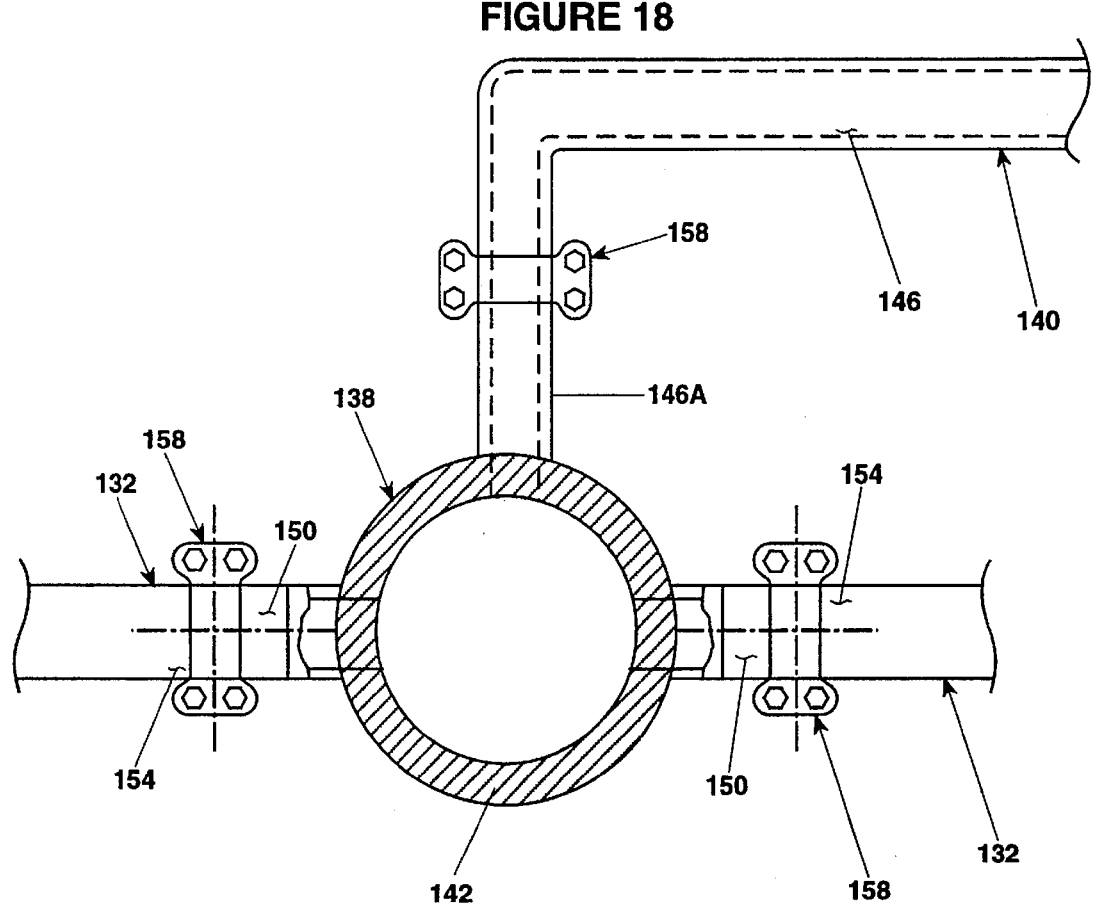
FIG. 18 is a partial vertical sectional view taken in direction of the arrows and along the plane of line 18—18 in FIG. 15.
Figure 19:
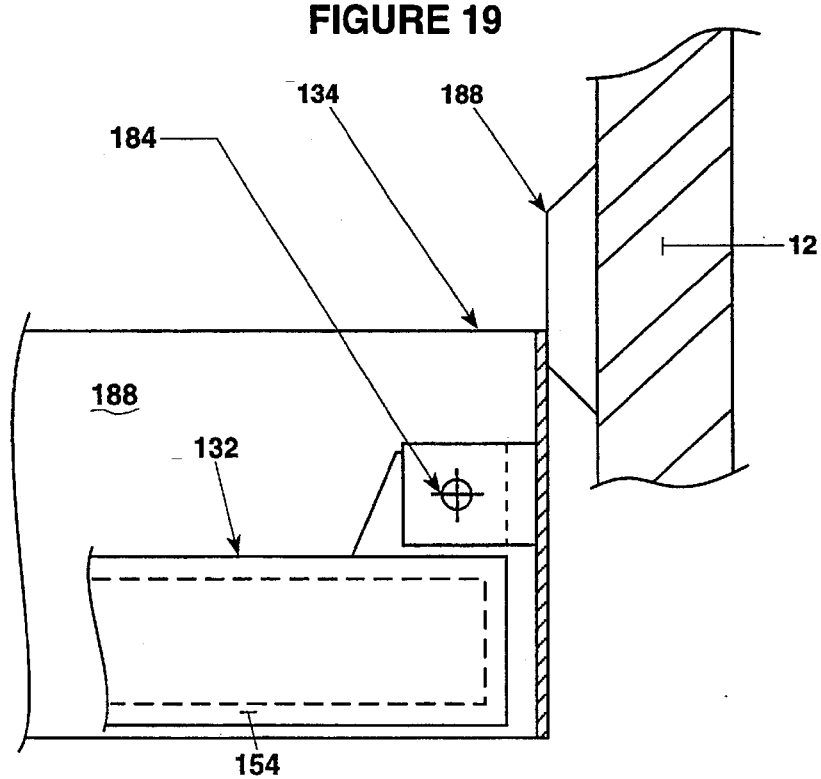
FIG. 19 is a partial vertical sectional view taken in direction of the arrows and along the plane of line 19—19 in FIG. 15.
Figure 22:
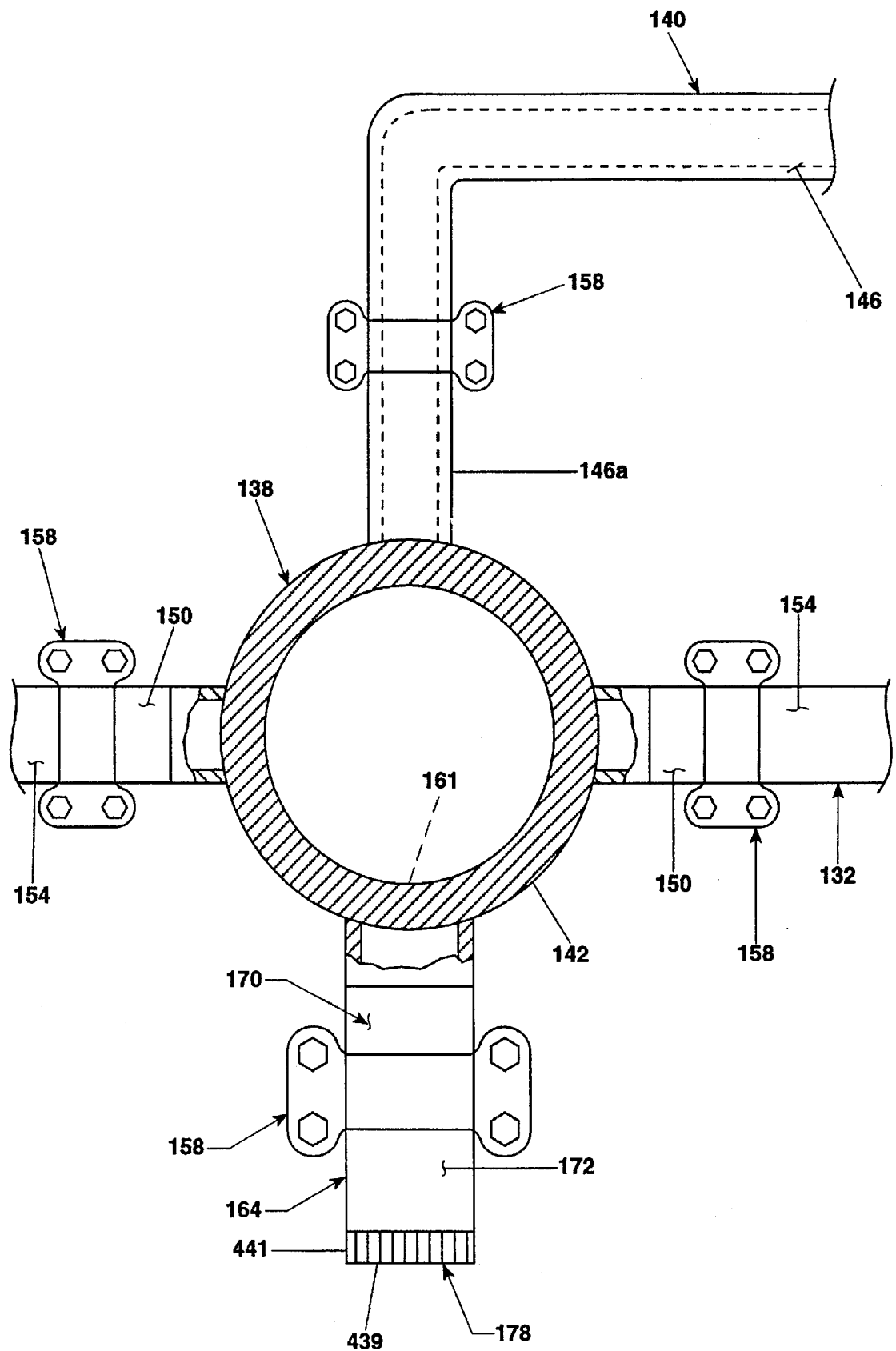
FIG. 22 is a partial enlarged segmented side elevational sectional view of another embodiment of a quench conduit header (or primary hollow quench medium furnishing assembly) having a nozzle assembly or member bound thereto and communicating therewith through an orifice contained in the quench conduit header for injecting and dispensing a quench matter into a catalytic bed in a direction opposite (e.g. countercurrent to the flow of a hydrocarbon feed stream through the catalytic bed) to the direction that the nozzle assembly or member is injecting quench matter from the quench conduit header in FIG. 20.

The primary hollow quench medium receiving member 138 or quench conduit header 142 is formed with one or more or a plurality of generally hollow transverse members or transverse header conduits 150 that extend generally normally therefrom and communicate with the primary hollow quench medium receiving member 138 or quench conduit header 142. The plurality of transverse header conduits 150 possess a diameter (i.e. an internal diameter) that is less than or smaller than the diameter of the quench conduit header 142. As best shown in FIGS. 18 and 22, the primary hollow quench medium receiving member 138 (or quench conduit header 142) is also formed with a header inlet conduit (or secondary inlet conduit) 146a which communicates with the primary hollow quench medium receiving member 138 (or quench conduit header 142) for receiving and passing a quench medium or matter into the latter. The header inlet conduit 146a has a diameter (i.e. an internal diameter) that is less than or smaller than a diameter (i.e. an internal diameter) of the quench conduit header 142. The diameter of the latter is larger than that of the quenching medium inlet conduit 146 in order to be able to obtain, or otherwise receive, and store a large or sufficient volume of quenching medium for immediate and/or uninterrupted dispensing to the secondary quench medium furnishing assembly Longitudinal extremities or opposed ends of the primary hollow quench medium receiving member 138 or quench conduit header 142 have a pair of guided type header supports (or primary supports), generally illustrated as 182–182 (see FIGS. 15 and 17), respectively secured thereto and to the support means 134 (more specifically to a skirt member identified as 180 below). The header (or primary) supports 182–182 operate to couple the primary hollow quench medium receiving member 138 (or quench conduit header 142) to the support means 132. The header (or primary) supports 182–182 may be manufactured from any suitable material, preferably from any thermal expansive material that would be compatible with metallurgical requirements to support the primary hollow quench medium receiving member 138 or quench conduit header 142 in a depending relationship with respect to the support means 132 while allowing for some freedom of movement due to thermal expansion.

Figure 14:
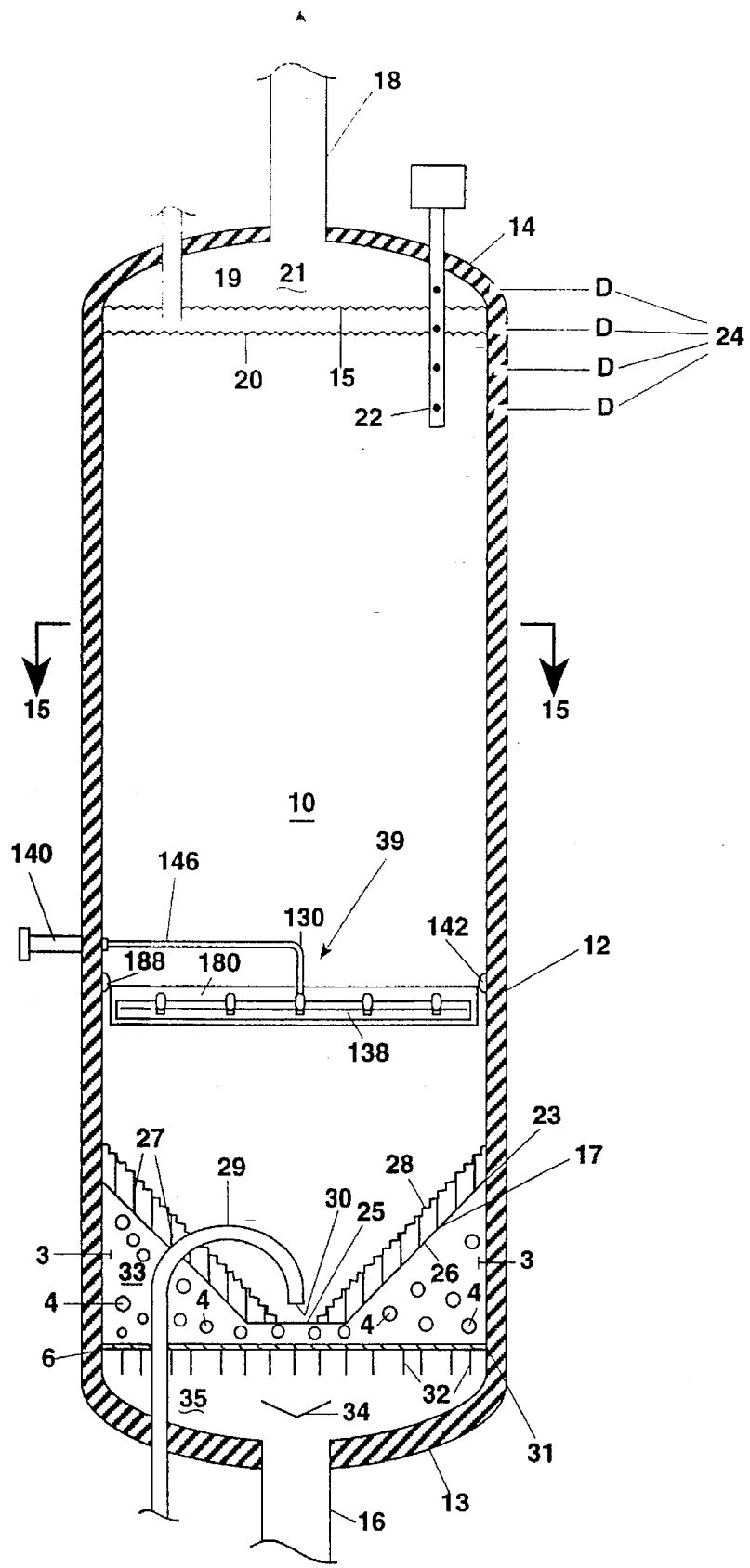
FIG. 14 is an enlarged partial sectional view of a hydroprocessing vessel or reactor containing at least one of the other preferred embodiments of the quench systems or assemblies for distributing a quench matter (i.e. a liquid quench and/or a gas quench) into a catalytic bed at a desired level therein.
Figure 15:
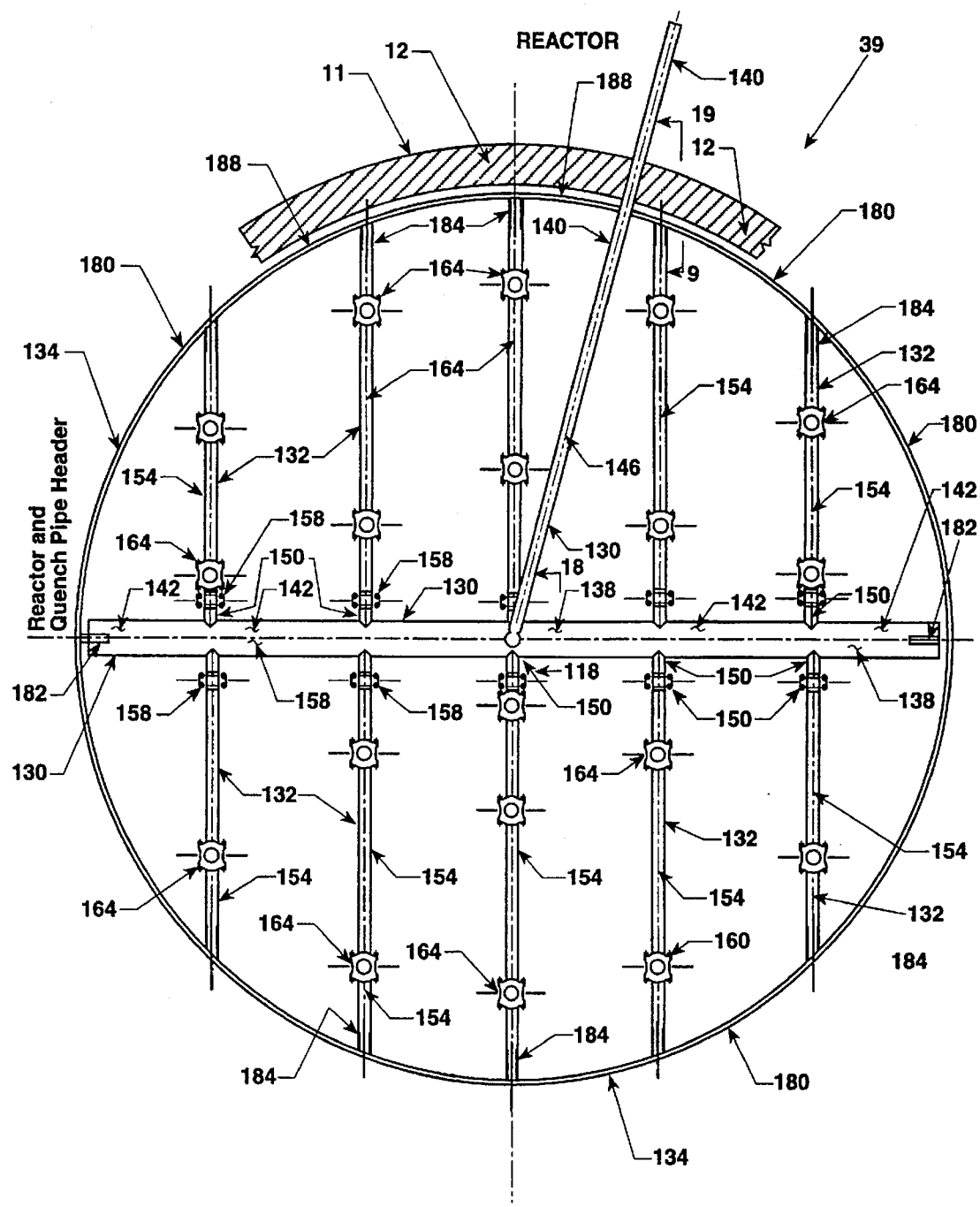
FIG. 15 is a cross-sectional view of the hydroprocessing vessel or reactor taken in direction of the arrows and along the plane of line 15—15 in FIG. 14 and showing in top planar form the quench system(s) or assembly(ies) of FIG. 14 for distributing a quench matter into a catalytic bed at a desired level therein.

The primary quench medium furnishing assembly 130 also includes a quenching medium inlet member 140 that passes through the cylindrical side wall 12 of the reactor vessel 11 and secures and/or couples to the header inlet conduit 146a for transmitting or conducting a quenching medium or matter into the header inlet conduit 146a, which in turn transmits or conducts the same for subsequent flow into the primary hollow quench medium receiving member 138 (or the quench conduit header 142). As previously indicated, the quenching medium or matter originates from a quenching source (see FIG. 24 which identifies possible candidates for suitable quench sources) that has been previously obtained and disposed outside of the reactor vessel 11. The quenching medium inlet member 140 is preferably a quenching medium inlet conduit 146 having a diameter (i.e. an internal diameter) that is essentially equal to the diameter (i.e. an internal diameter) of the header inlet conduit 146a. In a preferred embodiment of the present invention and as best shown in FIGS. 17, 18 and 22, the quenching medium inlet conduit 146 is coupled to the header inlet conduit 146a by a coupling clamp (or a means for coupling), generally illustrated as 158, which functions as a connecting and disconnect vehicle or member to permit the quenching medium inlet conduit 146 to be easily connected or secured to the header inlet conduit 146a and to facilitate the disconnection of the two inlet conduits 146 and 146a for any desired reason, such as for the cleaning and/or unplugging of inlet conduit 146 and/or 146a, etc. The coupling clamp 158 may be any suitable coupling means or assembly that is capable of coupling, connecting and disconnecting any pair of members or conduit members to accomplish the purpose of the quench system 39 for this preferred embodiment of the invention. A suitable coupling clamp 158 is one sold under the registered trademark GRAYLOC® by ABB VETCO GRAY of Houston, Tex. As best illustrated in FIGS. 14 and 15, the quenching medium inlet conduit 146 feeds the primary hollow quench medium receiving member 138 (i.e. the quench conduit header 142 and its associated header inlet conduit 146a) at a situs that is generally coaxial with respect to a longitudinal axis of the reactor vessel 11 and/or the catalyst bed 10.

The secondary quench medium furnishing assembly 132 comprises one or more or a plurality of quench conduit laterals 154 which have a diameter (i.e. an internal diameter) that approximate the diameter of the transverse header conduits 150. Each of the quench conduit laterals 154 is secured and/or coupled to a respective transverse header conduit 150 via the coupling clamp 158 which as previously indicated may be any suitable connection assembly 158, especially or more particularly one that is capable of interconnecting and disconnecting the transverse header conduits 150 and the quench conduit laterals 154 for any desired reasons, such as for cleaning purposes or for any other purpose. The extreme end of each of the quench conduit laterals 154 has a guided lateral support, generally illustrated as 184 (see FIGS. 15, 19 and 21), secured thereto and to the support means 134 (more specifically to a skirt member identified hereinafter as 180). The lateral supports 184 operate to couple a quench conduit lateral 154 to the support means 134. The lateral supports 184 may be manufactured from any suitable material, preferably from any thermal expansive material that would be compatible with metallurgical requirements to support the secondary quench medium furnish assembly 132 or the quench conduit laterals 154 in a depending relationship with respect to the support means 132 while allowing for some freedom of movement due to thermal expansion.

Figure 20:
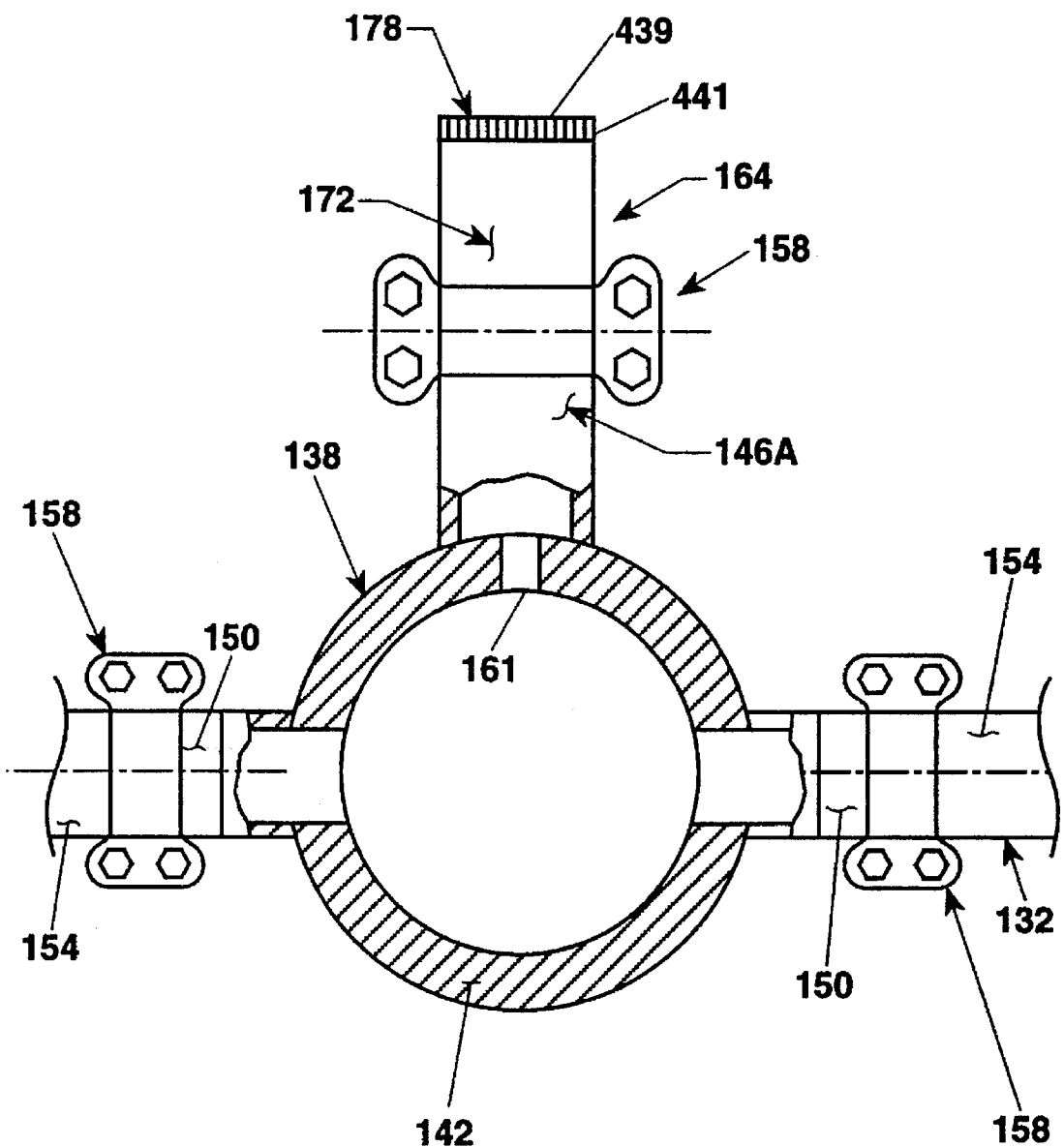
FIG. 20 is a partial enlarged side elevational sectional view illustrating another embodiment of the quench conduit header (or primary hollow quench medium receiving member) having a nozzle assembly or member mounted thereto for dispensing a quench matter into a catalytic bed at a desired level therein.
Figure 21:
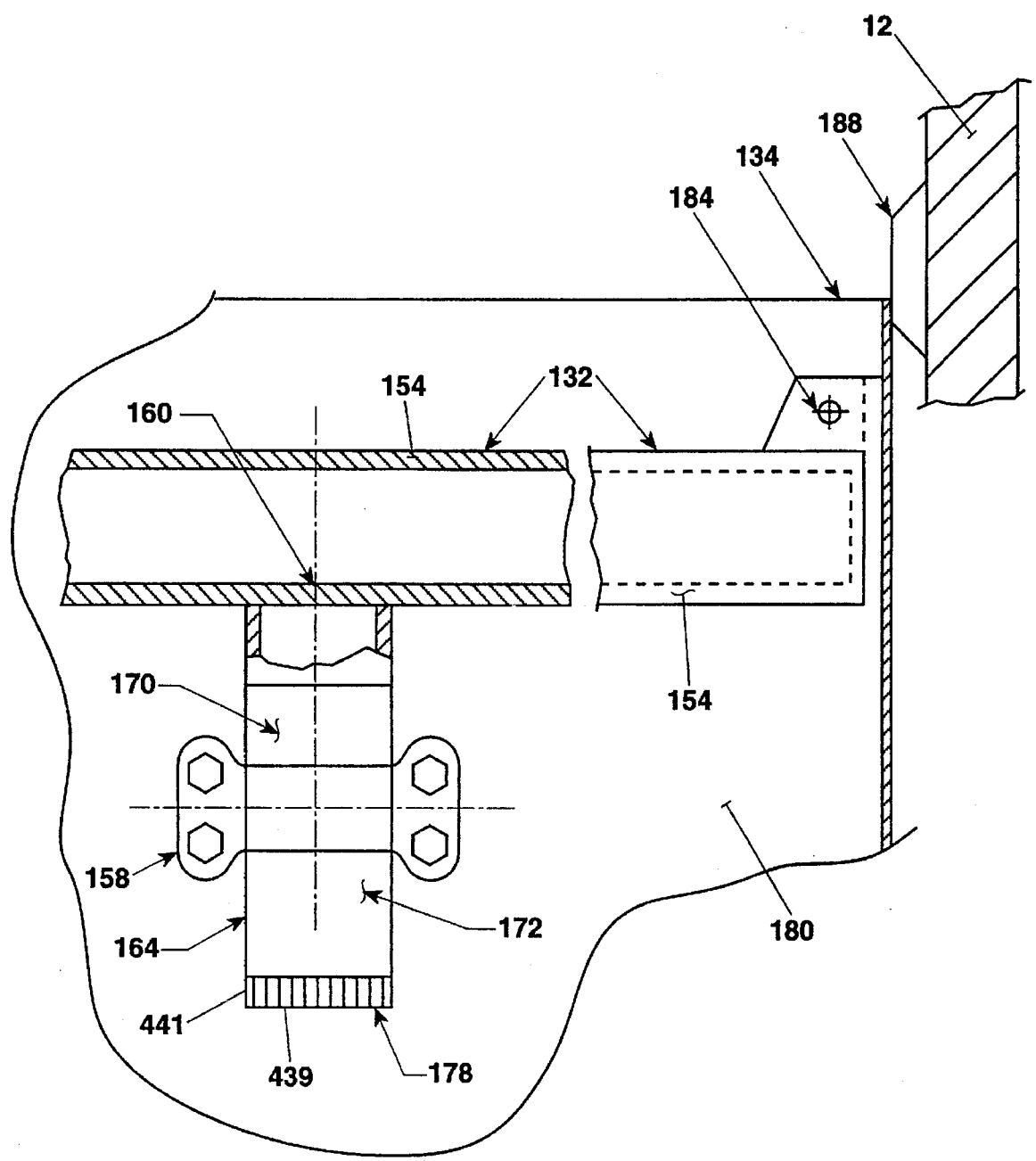
FIG. 21 is a partial enlarged segmented side elevational sectional view of another embodiment of a quench conduit lateral (or a secondary quench medium furnishing assembly) having a nozzle assembly or member bound thereto and communicating therewith through an orifice contained in the quench conduit lateral for injecting and dispensing a quench matter into a catalytic bed in a direction opposite (e.g. countercurrent to the flow of a hydrocarbon feed stream through the catalytic bed) to the direction that the nozzle assembly or member is injecting quench matter from the quench conduit lateral in FIG. 16.

Each of the quench conduit laterals 154 (see FIG. 16) is formed with one or more orifices or apertures 160 that communicate(s) with a nozzle assembly, generally illustrated as 164, to permit a quenching medium or matter to pass from the quench conduit lateral(s) 154 into the nozzle assembly 164 for subsequent injection and distribution into the catalyst bed 10. The one or more orifices or apertures 160 are designed to uniformly distribute quenching medium (i.e. quenching liquid and/or quenching gas) into the catalyst bed 10. In another aspect of the present invention and as shown in FIG. 20, the primary hollow quench medium receiving member 138 (or the quench conduit header 142 which includes associated transverse header conduits 150) is formed with one or more orifices or apertures 161 that communicate(s) with the one or more nozzle assemblies 164 mounted to the primary hollow quench medium receiving member 138 (or quench conduit header 142) for injecting the quenching medium or matter directly from the latter into the catalyst bed 10. The one or more orifices or apertures 161 function similarly to apertures 160 and they would also be designed to uniformly distribute the quenching medium into the catalyst bed 10. This aspect of the invention would furnish an operator with the ability to inject and distribute the quenching medium or matter from both the primary hollow quench medium receiving member 138 (or the quench conduit header 142) and the secondary quench medium furnishing assembly 132 (or the one or more quench conduit lateral(s) 154).

Each nozzle assembly 164 is connected to the quench conduit lateral(s) 154 (and/or to the quench conduit header 142) such as to project upwardly towards the dome head 14 of the reactor vessel 11 and generally parallel to the longitudinal axis of the reactor vessel 11. However, and as clearly depicted in FIG. 21, the spirit and scope of the present invention includes securing at least one or more of the nozzle assemblies 164 to the quench conduit lateral(s) 154 (and/or to the quench conduit header 142) such as to project downwardly or towards a bottom of a hydroprocessing reactor vessel, such as towards the bottom of a fixed bed reactor. The direction of projection of the (one or more) nozzle assembly 164 would depend on the desired direction of injection and/or distribution of the quenching medium or matter, such as either concurrent or countercurrent with the flow of a hydrocarbon feed passing through a bed of catalyst. Thus, for example, in the preferred embodiment of the present invention depicted in FIG. 1–15, the one or more nozzle assemblies 164 project generally perpendicularly upwardly towards the dome head 14 of the reactor vessel 11 for injecting the quenching medium or matter into the catalyst bed 10 such that the quenching medium or matter is distributed within the catalyst bed 10 to flow concurrent with the upwardly flowing hydrocarbon feed stream (see FIGS. 15, 16, 17 and 20). Similarly, if the direction of flow of a hydrocarbon feed stream is from top to bottom of a reactor vessel, such as in a fixed bed reactor, and it is desired to inject and/or distribute the quenching medium or matter concurrent with the hydrocarbon feed stream flowing downwardly (or from top to bottom) through such reactor vessel, then the embodiments of the nozzle assemblies 164 depicted in FIGS. 21 and/or 22 would be employed.

Figure 25:
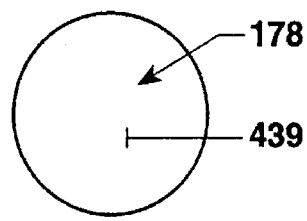
FIG. 25 is a horizontal plane view taken in the direction of the arrows and along the plane of line 25—25 in FIG. 16.
Figure 16:
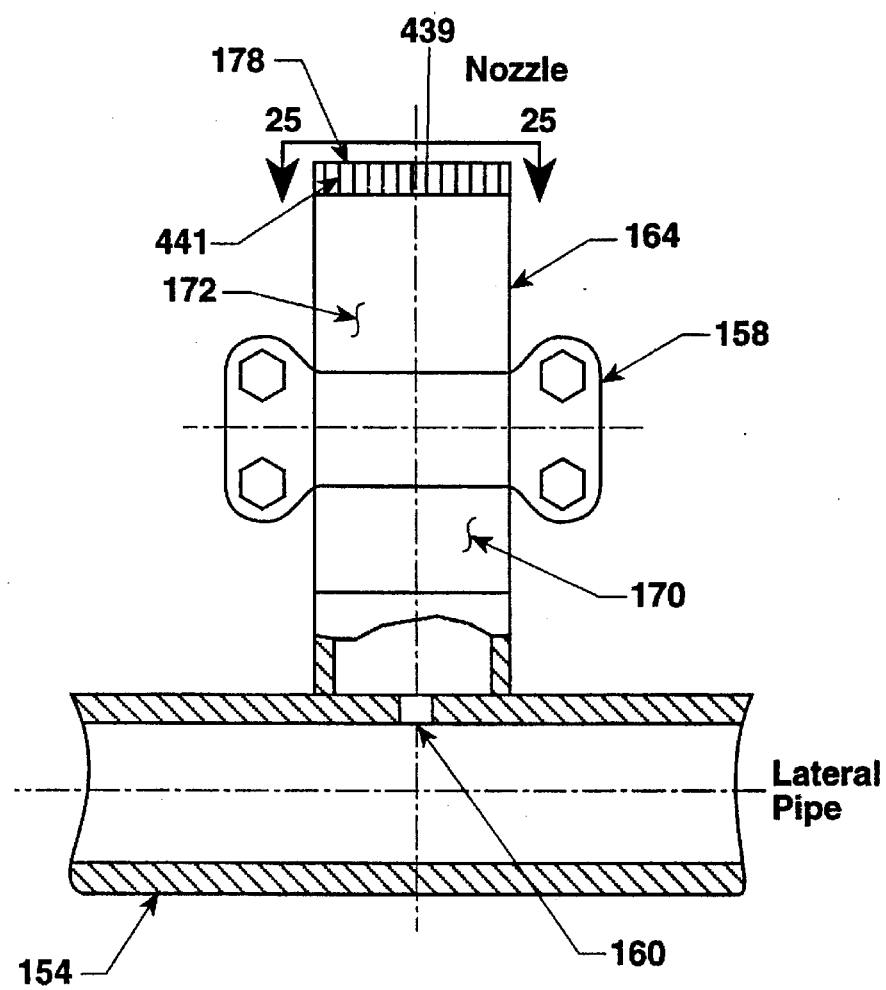
FIG. 16 is an enlarged partial sectional view of a nozzle assembly or member generally bound normally to and communicating with a quench conduit lateral (or a secondary quench medium furnishing assembly) through an orifice contained in the quench conduit lateral.

Each nozzle assembly 164 includes a lower hollow nozzle section 170 and an upper hollow nozzle section 172 that communicates directly with and may be removably secured to the lower hollow nozzle section 170 by the coupling clamp 158. The coupling clamp 158 (as previously similarly indicated for the previously mentioned members or elements of the quench system 39) functions as a disconnect vehicle for permitting the upper hollow nozzle section 172 to be removed from the lower hollow nozzle section 170 to clean out any debris (e.g. catalyst) that may be contained in the latter. The upper hollow nozzle section 172 is fitted and/or capped with a screen member 178 (e.g. a Johnson screen or the like) that prevents catalyst from migrating from the catalyst bed 10 into the upper hollow nozzle section 172 (and thus into the lower hollow nozzle section 170) while permitting a quenching medium or matter to pass therethrough. FIGS. 16 and 25 illustrate a Johnson screen member 178 having an imperforate cap or plate 439 having secured thereto a perforate screen wall 441 wherethrough the quenching medium or matter passes. If the embodiments of the nozzle assemblies 164 depicted in FIGS. 14, 15, 16 and 17 (and/or FIG. 21) have been employed, a quenching medium or matter passes from the quench conduit lateral(s) 154, through the orifice or aperture 160 and into the lower hollow nozzle section 170, through the lower hollow nozzle section 170 and into the upper hollow nozzle section 172, and through the upper hollow nozzle section 172 and the screen member 178 (i.e. the perforate screen wall 441) into a bed of catalyst, such as catalyst bed 10. If the embodiment of the nozzle assemblies 164 depicted in FIGS. 20 and/or 21 have been employed, a quenching medium or matter passes from the primary hollow quench medium receiving member 138 (or quench conduit header 142), through the orifice or aperture 161 and into the lower hollow nozzle section 170, through the lower hollow nozzle section 170 and into the upper hollow nozzle section 172, and through the upper hollow nozzle section 172, and the screen member 178 into a bed of catalyst, such as catalyst bed 10.

The support means 134 may be any suitable support means for supporting the quench medium furnishing assemblies 130 and 132 in a desired position within the catalyst bed 10 of the reactor vessel 11, but preferably comprises a skirt member 180, and a support coupling member 188 fastened to the skirt member 180. The skirt support member 180 is preferably configured or designed to be cylindrically ring-like and the support coupling member 188 connects to an outer circumferential surface thereof and to the insides of the cylindrical side wall 12. As was previously indicated, the pair of header (or primary) supports 182—182 also connect to the skirt support member 180 (more specifically to an inside circumferential surface of the skirt support member 180) for coupling and/or interconnecting the primary hollow quench medium receiving member 138 or quench conduit header 142 to the skirt support member 180. As was also previously indicated, the lateral supports 184 also connect to the skirt support member 180 (more specifically to an inside circumferential surface of the skirt support member 180) for coupling and/or interconnecting the secondary quench medium furnishing assembly 132, more specifically the quench conduit lateral(s) 154, to the skirt support member 180. The support coupling member 188 supports the present preferred embodiment of the quench system 39 within and away from the reactor vessel 11 (i.e. within and away from the cylindrical side wall 12 of the reactor vessel 11); and is preferably manufactured from any suitable material that would be compatible with the metallurgical requirements and would allow some freedom of expansive movement from thermal expansion.

Continuing to refer to the drawings for operation of the preferred embodiment of the quench system 39 of FIGS. 14–25 and to the method(s) for quenching in hydroprocessing a hydrocarbon feed stream that is flowing through a hydroconversion reaction zone (e.g. a fixed bed, etc.) having a bed of catalyst, a quenching medium or matter is controllably and regulatively introduced, passed or flowed into the quench medium inlet member 140 from a suitable source for injection and distribution by the nozzle assemblies 164 into the catalyst bed 10. As indicated, a suitable source for the quenching medium or matter may be any suitable source within the processing scheme or from storage, such as by way of example only, one or more of the sources identified in FIG. 24 and described hereinafter. The rate of flow and the type or mixture of quenching matter or medium (i.e. quench liquid(s) and/or quench gas(es)) are regulated, controlled, and metered by a control and/or regulatory system, generally illustrated and identified in FIG. 23 as 800. A detailed description of the control and/or regulatory system 800 has been submitted below for describing or explaining how the quenching medium is metered within and through a quench line (identified as 250 below) for introduction into the quenching medium inlet member 140.

The quenching medium or matter flows from the quenching medium inlet member 140, through the header inlet conduit 146a and into the primary hollow quench medium receiving member 138 (i.e. the quench conduit header 142). The quenching medium enters the quench conduit header 142 at a location which is essentially concentric with respect to the quench system 39 and coaxial with respect to the catalyst bed 10 and/or the reactor vessel 11. As the hollow quench medium receiving member 138 (i.e. the quench conduit header 142) fills with quenching medium, the latter commences to flow into the plurality of transverse header conduits 150 for subsequent passage into and through the quench conduit laterals 154 from where the quenching medium flows through orifice or aperture 160 and into the nozzle assemblies 164 for subsequent injection and distribution into the catalyst bed 10.

Stated alternatively and more specifically, as the quenching medium flows through the transverse conduits 150 and into the quench conduit laterals 154, the latter commence to fill. When sufficiently filled, quenching medium begins to pass through each of the orifice or apertures 160 and into the nozzle assemblies 164. From the nozzle assemblies 164, the quench medium passes through the screen 178 (i.e. the perforate screen wall 441) and is injected and distributed into the catalyst bed 10. The screen 178 has screen openings (i.e. the perforate screen wall 441) which have been sized to be small enough to prevent catalytic particulates from entering the nozzle assemblies 164, but large enough to allow the quenching medium or matter to pass therethrough. As the quenching medium is being injected by each of the nozzle assemblies 164, the path of injection through lower and upper nozzle sections 170 and 172 is generally normal to the path of flow of the quenching medium through the quench conduit laterals 154, but in a direction or flow path that is diametrically opposite to the flow path of quenching medium through the header inlet conduit 146a. The path of injection through the perforate screen wall 441 is generally parallel to the path of flow of the quenching medium through the quench conduit laterals 154. In the event that some catalytic particulates become misplaced and pass through the screen 178 and lodge in the lower hollow nozzle section 170, which could affect the flow of quenching medium through the orifice or aperture 160, then the coupling clamp 158 (see FIG. 25) may operatively release the upper hollow nozzle section 172 from the lower hollow nozzle section 170 such that the misplaced catalytic particulates may be removed from the lower hollow nozzle section 170.

Thus, the quenching medium flows or travels initially in a first conduit path (or zone) which is generally transverse to the catalyst bed 10 and/or the reactor vessel 11 (or generally perpendicular to the longitudinal axis of the catalyst bed 10 and/or the reactor vessel 11), and subsequently in a second conduit path (or zone) that is generally perpendicular to the first conduit path (or zone) and essentially coaxial with respect to the longitudinal axis of the catalyst bed 10 and/or the reactor vessel 11. From the second conduit path (or zone) the quench medium enters and flows into and through a third conduit path (or zone) which, like the first conduit path (or zone), is transverse to the catalyst bed 10 and/or the reactor vessel 11. A plurality of fourth conduit paths (or zones) receive the quenching medium from the third conduit path (or zone) for dispensing the quenching medium into a plurality of injection zones for injection into the catalyst bed 10. The plurality of the fourth conduit paths (or zones) extend generally perpendicular or normal from the third conduit paths (or zones); and the plurality of injection zones also extend generally perpendicular or normal from the plurality of fourth conduit paths (or zones), preferably extending and projecting upwardly to inject quenching medium into the catalyst bed 10 in an initial direction (i.e. the direction of protrusion of lower and upper nozzle sections 170 and 172) opposite to the direction that the quenching medium is flowing through the second conduit path (or zone) and in a subsequent direction (i.e. the direction of openings in performate screen wall 441) generally parallel to the third conduit paths (or zones). The first conduit path (or zone) is at a different elevation from the third conduit path (or zone), preferably at a higher elevation. The first conduit path (or zone), as well as the second conduit path (or zone), has a diameter that is less than a diameter of the third conduit path (or zone). The fourth conduit paths (or zones) each essentially possess a diameter that is also less than the diameter of the third conduit path (or zone).

Recapitulating, the quenching medium or matter initially flows along a first path and through a first zone, and then along a second path and through a second zone, and subsequently along a third path and through a third zone, and finally along and through a plurality of fourth paths and fourth zones, respectively, all of which emanate from the third path or third zone. In another embodiment of the present invention, the first and second path (or zone) are a common essentially straight path (or zone) which could join the third path (or zone) at any desired angle; thus, the quenching medium or matter for this embodiment of the invention would initially flow along the common path and through the common zone, and subsequently along a second path and through a second zone, and finally along a plurality of third paths and through a plurality of third zones, all of which would emanate from the second path or zone.

The flow rate of the quenching medium or matter through the various conduit members of the quench system 39 may be any suitable rate that would accomplish the desired objects of the invention. The flow rate of the quenching medium from the primary quench medium receiving member 138 (i.e. the quench conduit header 142) and into the plurality of transverse header conduits 150 would depend on the rate of flow of the quenching medium through the quenching medium inlet member 146 and the header inlet conduit 146a. Similarly, the rate of flow of quenching medium through the transverse header conduits 150 and the communicative respective quench conduit laterals 154 and into the respective nozzle assemblies 164 would also depend on the flow rate of the quenching medium through the quenching medium inlet member 146 and the header inlet conduit 146a. Preferably, the rate of flow of quenching medium into the primary quench medium receiving member 138 (i.e. the quench conduit header 142) from the quenching medium inlet member 146 and the header inlet conduit 146a would be at a rate sufficient to keep the primary quench medium receiving member 138 or quench conduit header 142 substantially full and/or pressurized such that perpendicular dispensation of quenching medium outwardly therefrom and through the transverse header conduits 150 and into the quench conduit laterals 154 would be essentially at a constant rate. Preferably, the rate of flow of quenching medium is such that the quenching medium flows through the apertures 160 and/or 161 at a rate ranging from about one foot per second to about 50 feet per second or any other suitable rate for which the application of the quench system 39 is being employed and in order to maintain an uniform distribution of quenching medium in the catalyst bed 10 from the nozzle assemblies 164.

As best evidenced in FIG. 15 the quench system 39 provides for a web-like injection of quenching medium into the catalyst bed 10, while the primary hollow quench medium receiving member 138 (or the quench conduit header 142) diametrically traverses the catalyst bed 10 to essentially bisect the catalyst bed 10 at one or more levels where one or more of the quench systems 39 are positioned within the catalyst bed 10. This preferred embodiment of the quench system 39 may be employed with any of the embodiments of the present inventions, or with any hydroconversion process, such as fixed catalytic beds, etc.

Figure 23:
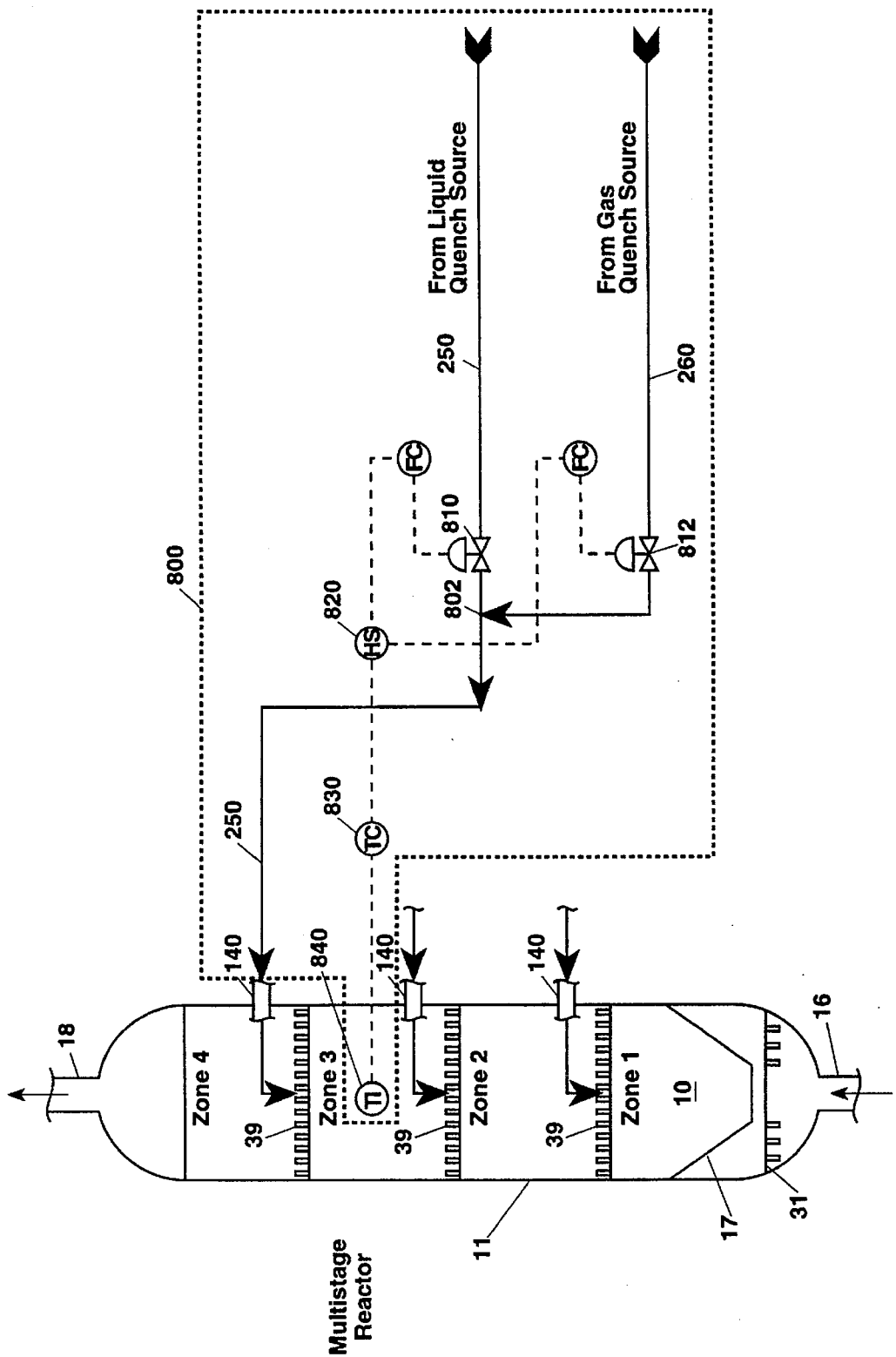
FIG. 23 is a schematic and/or flow diagram of the controls and/or regulators for the liquid and/or gas quench system(s) or assembly(ies) of the present invention.

Referring in detail now to FIG. 23, there is seen the reactor vessel 11 having a catalyst bed 10 with four (4) reaction zones and three (3) quench systems 39 (of the preferred embodiments of FIGS. 14–22) separating a lower reaction zone from an immediately superimposed reaction zone. There is also seen in FIG. 23 a control and/or regulatory system 800 which assist in not only controlling and regulating the rate of flow of the quenching matter or medium (i.e. quench liquid(s) and/or quench gas(es)), but also assist in regulating, controlling, and metering the type or mixture of the quenching matter or medium. The control and/or regulatory system 800 comprises independent flow control devices for quench liquid or oil (primary source) or quench gas (backup source). More specifically as best seen in FIG. 23, a quench line 250 extends from a liquid quench source to the quench medium inlet member 140. A quench line 260 is provided as extending from a gas quench source (e.g. a hydrogen source) to a point 802 in quench line 250 for introducing quench gas into the quench line 250 for passage into the quench medium inlet member 140. As previously indicated, the quench gas may pass into the quench system 39 in a pure form or as a mixture with the liquid quench. The quench lines 250 and 260 respectively contain flow control controllers 810 and 812 for regulating the flow of liquid quench and gas quench respectively. A hand switch 820 communicates with and engages the two flow controllers 810 and 812 for selecting and regulating the flow of liquid quench and gas quench through the respective controllers. A temperature control device 830 communicates with the hand switch 820 and with a temperature indicator 840 which monitors the temperature in a reaction zone of the catalyst bed 10.

The product or effluent exiting the reactor vessel 11 through center pipe 18, exits substantially under reactor conditions (e.g. temperature and pressure reactor conditions), and is typically a liquid hydrocarbon stream wherein at least 50 volume percent of which boils above about 204° C. and which preferably contains a substantial fraction boiling above about 343° C. and particularly preferably above about 510° C. Preferred liquid hydrocarbon streams exiting through center pipe 18 are residual fractions and synthetic crudes, all of which have been denitrified and/or demetallized and/or desulfurized, etc., by catalytically upgrading. As was previously indicated, the product (or liquid hydrocarbon stream effluent) from any of the methods of the present invention exits the reactor vessel 11 and is normally subjected to further conventional refinery processing, and the quench medium or matter may be recovered as a by-product from any further conventional refinery processing of the liquid hydrocarbon stream effluent leaving reactor vessel 11.

The quenching medium or matter of the present invention is selected from the group consisting of quenching liquid(s), quenching gas(es), and mixtures thereof. More preferably, the quenching medium or matter is a liquid quench such as a liquid hydrocarbon quench. Suitable sources for the liquid quench and/or gas quench are provided by way of example only in FIG. 24.

Referring in detail now to FIG. 24, there is seen by way of example only the following six (6) sources of supply for quenching liquid: a hot high pressure separator source, generally illustrated as 300; a cold high pressure separator source 316; a hot low pressure separator source, generally illustrated as 400; a fractionator bottoms source, generally illustrated as 500; a distillate stripper source, generally illustrated as 600; and a storage source, generally illustrated as 700. Any of these six identified candidate locations within a typical reactor processing scheme (which is preferably capable of replacing catalyst onstream) could be selected as a source of supply for quenching liquid, depending on the best choice for the particular application. All six (6) of the candidate locations are capable (after being pumped to reactor pressure) of feeding quenching liquid into a quench liquid conduit 240 which connects to and communicates with the quench line(s) 250 for feeding a quenching medium or matter (i.e. a quenching liquid) into the quench system 39, more specifically into the quenching medium inlet member 140.

The hot high pressure separator source 300 originates from the bottoms of a hot high pressure separator, generally illustrated as 302. Catalytically upgraded product passes via conduit line 304 from the reactor vessel 11 into the hot high temperature separator 302 which is typically operating at pressures and temperatures ranging from 1,000 to 5,000 psig, and 600° to 950° F. respectively. The hot high temperature separator 302 produces bottoms that exit through conduit line 306. The produced bottoms have entrained hydrogen and other light material and are typically a mixture of hydrocarbons consisting mainly of the heaviest fractions being processed. At least part of these produced bottoms, which have a temperature ranging from about 600° F. to about 850° F. and a pressure ranging from 1000 to 5000 psig, may be removed from conduit line 306 and conducted into the quench liquid conduit 240 by conduit line 310. The produced bottoms may (optionally) pass through a heat exchanger 312 for initially being cooled, and then through a low head high pressure pump 314 for subsequently being pumped into the quench liquid conduit 240. The heat exchanger 312, if employed, would have the capabilities of cooling the produced bottoms to a temperature ranging from about 200° F. to about 700° F., depending on process requirements. By cooling the quench liquid at high pressures (e.g. 1000 to 5000 psig) and utilizing the low head high pressure pump 314 to inject the quench liquid through conduit line 310 and into and through the quench liquid conduit 240 and subsequently into the catalyst bed 10 via the quench system 39, horsepower requirements are minimized. "Second pass opportunity" of the treated heaviest fraction and potentially better catalyst penetration by slightly improved viscosity conditions are expected. The hot high pressure separator 302 also produces an overhead effluent which is passed through the cold high pressure separator source 316, yielding a liquid quench source and a gas quench source (mostly hydrogen) which is compressed by compressor 318, and subsequently transported by conduit line 320 to be admixed with a hydrocarbon feed stream flowing through conduit 324 for entering the reactor vessel 11 by line 16. A quench gas conduit 330 interconnects conduit line 320 with quench line(s) 260 to feed a quenching gas (i.e. hydrogen) into the quench line(s) 250. The liquid quench source from the cold high pressure separator 316 is normally a mixture of lighter boiling and heavier boiling fractions (say up to 1000° F.), and this liquid quench source mixture is passed through conduit 200 into conduit line 310 to be reinjected into the quench system 39 by the low head high pressure pump 314 without additional cooling.

The hot low pressure separator source 400 originates from the bottoms of a hot low pressure separator, generally illustrated as 404. The produced bottom from the hot high pressure separator 302 enter the hot low pressure separator 404 via conduit line 306. The hot low pressure separator 404 is typically operating at temperatures ranging from 600° F. to 850° F., and pressures ranging from 100 to 600 psig and produces bottoms that pass from a lower section of the hot low pressure separator 404 into conduit line 408. The product bottoms from the hot low pressure separator 404 is typically a hydrocarbon comprised of the highest boiling range material processed (e.g. even more concentrated in the highest fractions than the bottoms of the hot high pressure separator 300). A portion of the separator 404 produced bottoms may be taken from conduit line 408 by a conduit line 420 that communicates with quench liquid conduit 907. The quench liquid conduit 907 connects to and communicates with a quench (flushing) oil drum 241. The produced bottoms flowing through conduit line 907 pass through a heat exchanger 430 for cooling the produced bottoms to a temperature ranging from about 150° F. to about 500° F. (cooling pressure is typically from 20 to 150 psig), and the cooled produced bottom is introduced into the oil drum 241 from where a pump 243 pumps the produced bottoms into and through the quench liquid conduit 240 via conduit line 242 and then into the catalyst bed 10 via the quench system 39.

A liquid quench from the fractionator source 500 would be a preferred source if a heavy fraction is selected as the liquid quench medium. The fractionator source 500 comes from a fractionator, generally illustrated as 510. Separator 404 produced bottoms flowing through conduit line 408 enter the fractionator after (optionally) passing through a feed heater 450, and typically has a temperature ranging from about 500° F. to about 800° F. The fractionator 510 is operating at pressures and temperatures ranging from 10 psig to 100 psig and 550° F. to 800° F. respectively; and produces fractionator bottoms which exit from the fractionator 510 through a conduit line 520. The fractionator bottoms is typically a hydrocarbon having the very highest fractions of the material being processed. At least part of these fractionator bottoms may be removed from conduit line 520 and flowed through a conduit line 560 for introduction into the quench liquid conduit 907 wherein the fractionator bottoms (i.e. a liquid quench) flow through heat exchanger 430 and into the quench oil drum 241 and subsequently injected (as was previously indicated) by high head pump 243 into the catalyst bed 10 via the quench system 39.

In certain applications a liquid quench from an intermediate section of the fractionator 510 (and after passing through a distillate side cut stripper 610) is desired, especially since performance in the certain applications could be enhanced due to the viscosity characteristics of this liquid quench and its ability to improve oil penetration into the internal surface area of the catalytic particulates. To obtain such a liquid quench from the stripper source 600, a hydrocarbon sidecut is intermediately removed from the fractionator 510 and sent to the distillate said cut stripper 610 through conduit line 614. The gas oil stripper 610 is operating at a temperature ranging from 400° F. to 750° F. and at a pressure ranging from 10 psig to 100 psig. The gas oil stripper 610 produces a hydrocarbon (normally a heaviest gas oil or diesel sidecut from a fractionator) having a boiling range from 450° F. to 1000° F. The produced hydrocarbon stream leaves the distillate side cut stripper 610 through a conduit line 620 which contains a pump 630 for pumping the produced hydrocarbon through a conduit line 660 and into the quench liquid conduit 907 wherein the cooled produced hydrocarbon (i.e. a liquid quench) may be processed in accordance with the previously stated procedures for injection and distribution into the catalyst bed 10.

As was previously indicated, another source for the quench liquid is the storage source 700 which preferably includes quench oil from a storage. A quench liquid is introduced into the quench liquid conduit 907 by line 710; and from the quench liquid conduit 907 the quench liquid flows into the flushing oil drum 241 from where the pump 243 pumps it through conduit line 242 and liquid conduit 240 and into the catalyst bed 10 via the quench system 39.

While it is not presently anticipated that all of the six candidate locations (i.e. sources 300, 316, 400, 500, 600 and 700) would be simultaneously utilized for a particular liquid quenching application of an upflow-type reactor, it is conceivable that any one or more of the six locations could be selected as the source of liquid quench when applying the preferred embodiments of the present invention, depending on the application. For example, depending on the overall process objectives and condition, the best choice for quench liquid supply for a particular application may be from the hot high pressure separator 302 or from the hot low pressure separator 404, thereby not seriously affecting the fractionator design. For another application, the overall benefits of quenching with middle distillate may more seriously affect the fractionator design changes required to accommodate the selection.

The quench liquid of the present invention may be any suitable quench liquid from one or more of the six candidate locations (i.e. sources 300, 316, 400, 500, 600 and 700) or from any other suitable sources. Regardless of the source of the quench liquid, it will typically have a viscosity ranging from about 0.5 cSt to about 200 cSt, measured at 100° C. This viscosity is less than the viscosity of the hydrocarbon feed stream of liquids containing a hydrogen-containing gas and which is introduced into the bed of catalyst 10 via line 16. As was previously mentioned, the reactor vessel 11 is designed for the hydrocarbon feed stream of liquids (including a hydrogen-containing gas) to contact and react in the bed of catalyst 10 at pressures up to about 300 atmospheres and temperatures up to about 650 degrees F. At these pressures and temperatures, the hydrocarbon feed stream of liquids (including a hydrogen-containing gas) typically has a viscosity ranging from about 20 cSt to about 10,000 cSt, measured at 100° C. By injecting a suitable quench liquid into the bed of catalyst 10 while the hydrocarbon feed stream comprising a liquid hydrocarbon component and a hydrogen-containing gas component is upflowing therethrough, the viscosity of the liquid hydrocarbon component and/or the liquid hydrocarbon component including the hydrogen-containing gas component is/are decreased. With a decrease in viscosity, there is provided the benefit of increasing the penetration and contact of the liquid hydrocarbon component and/or the mixture of the liquid hydrocarbon component and the quench liquid into and on the surface area of the plurality of catalytic particulates contained within the substantially packed bed 10 of hydroprocessing catalyst.

By also injecting a suitable quench liquid into the bed of catalyst 10 while the hydrocarbon feed stream is upflowing therethrough, the gas velocity of the hydrogen-containing gas component contained within the hydrocarbon feed stream is reduced while simultaneously increasing the residence time and reducing within the bed of catalyst 10 the liquid velocity of the liquid hydrocarbon component contained within the hydrocarbon feed stream. An increased liquid residence time and/or a lower liquid space velocity would improve the efficiency of upgrading the hydrocarbon feed stream. Reducing the superficial hydrogen-containing gas component improves the reactor temperature profile. The quenching liquid of the present invention would not be subject to significant vaporization at reactor conditions; thus, the ability to control the reactor temperature profile at optimum conditions regarding catalyst fouling rates is not restricted by the gas velocity criterion. By operating at higher temperatures in the lower sections of an upflow packed bed reactor, more work creating exothermic temperature rise is accomplished in these lower sections of the catalyst bed 10 where catalyst has been suitably aged or conditioned so as not to experience high carbon deposition rates as that for fresh catalyst. A flatter reactor temperature profile is achieved which will extend catalyst life. Those artisans possessing the ordinary skill in the art of hydroprocessing in upflow type reactors, will also recognize the additional benefits of reducing the superficial gas velocity as it relates to bubble size and gas holdup, yielding an increased liquid residence time and lower liquid space velocity. As indicated, oil penetration into the internal surface area of catalyst pellets will be enhanced by the overall decrease in oil viscosity in the upflow reaction zones, influenced by the lighter, less viscous quench liquid. The lighter, less viscous quench liquid will also affect fluidization coefficients in a favorable manner, minimizing the potential of ebullating the catalyst bed 10 into random motion, thereby minimizing the attrition rate. In the case of two or more upflow packedbed type reactors 11 in series performing substantial hydrogen upgrading, the benefits of minimizing gas velocity through the reaction zones becomes even more pronounced.

Thus, by the practice of the present invention, there is provided a method for reducing the gas velocity of a hydrogen-containing gas component which is contained within a hydrocarbon feed stream that includes a liquid component and is upflowing through a hydroconversion reaction zone having a substantially packed bed of hydroprocessing catalyst, while simultaneously increasing the residence time and reducing the liquid velocity of the liquid component within the substantially packed bed of catalyst. The method comprises the steps of: disposing a substantially packed bed of hydroprocessing catalyst in a hydroconversion reaction zone; introducing into the substantially packed bed of hydroprocessing catalyst, a hydrocarbon feed stream comprising a hydrogen-containing gas component and a liquid component having a liquid viscosity; upflowing the hydrocarbon feed stream through the substantially packed bed of hydroprocessing catalyst such that the hydrogen-containing gas component has a gas velocity and the liquid component has a liquid velocity; and injecting at least once into the substantially packed bed of hydroprocessing catalyst a liquid quench having a quench viscosity that is less than the liquid viscosity. The injecting causes the gas velocity and the liquid velocity to be reduced and further causes a residence time of the liquid component within the substantially packed bed of hydroprocessing catalyst to be increased. There is also provided by the practice of the present invention a method for increasing penetration and contact of a liquid component into and on the surface area of a plurality of catalytic particulates that are contained within a substantially packed bed of hydroprocessing catalyst having a hydrocarbon feed stream upflowing therethrough. The hydrocarbon feed stream contains the liquid component, and simultaneously with increasing penetration and contact of the liquid component into and on the surface area of the plurality of catalytic particulates, the viscosity of the liquid component is decreased. The method comprises the steps of: disposing in a hydroconversion reaction zone a substantially packed bed of hydroprocessing catalyst having a plurality of catalytic particulates that include a surface area; upflowing through the substantially packed bed of hydroprocessing catalyst a hydrocarbon feed stream having a liquid component with a liquid viscosity such that the liquid component penetrates into and contacts a first portion of the surface area; and injecting at least once into the substantially packed bed of hydroprocessing catalyst a liquid quench having a quench viscosity that is less than the liquid viscosity such that a mixture of liquid quench and liquid component is formed having a mixture viscosity that is less than the liquid viscosity. The injecting causes the liquid component within the mixture to penetrate into and contact a second portion of the surface area wherein the second portion includes the first portion and an additional portion of surface area beyond the first portion.

Thus, by the practice of the embodiments of the present inventions, there are also provided apparatus(es) and methods to improve the operability of upflow packed bed reactor systems processing a variety of feedstocks to meet a variety of product specifications. Actual quenching requirements are influenced by several process variables, such as degree or ratio of hydrodemetallation, hydrodesulfurization, hydrocracking, vaporization of feedstock, etc.

In a conventional multistage substantially packed bed upflow-type reactor system (possibly two or three reactors in series) in which hydrogen chemical consumption (or uptake) is in the range of 1200 SCFB (standard cubic foot per barrel), a total exothermic temperature rise of about 210° F. from the inlet of the first reaction zone to the exit of the final reaction zone might be expected. In order to regulate the reaction rates and temperature profile of the overall multibed reactor system, about 170° F. of the exothermic temperature rise is more or less removed from the process by transferring the heat (or caloric value) generated to the cooler quench fluid injected between reaction zones. To remove or transfer 170° F. process fluid exothermic rise to a quench gas stream that is approximately 180° F. temperature and about 90% hydrogen purity might require about 2300 SCFB quench gas for every barrel processed. In other words, a unit feeding 30,000 barrels per day of heavy oil might have quench gas requirements in the range of 69 million standard cubic feet per day (SCFB) of gas.

On the other hand, if the embodiments of the present inventions are implemented, and only enough quench gas is injected to maintain hydrogen partial pressure conditions at the optimum value, the quench gas requirements can be reduced substantially without significant detrimental effect on catalyst life. Each case must be carefully evaluated as to the overall refinery and reactor system hydrogen purification and recovery scheme, feedstocks, process objectives, etc. However, quench gas requirement based on maintaining appropriate hydrogen pressure conditions will be much less then if quench gas is injected based on heat removal. In other words, a unit feeding 30,000 BPD of heavy oil might only have a quench gas requirement of about 700 SCFB (a reduction of about 1600 SCFB) or a total of about 21 million SCFD if injection is based on maintaining appropriate hydrogen partial pressure conditions. The volume of liquid required to replace the approximately 1600 SCFB of gas quench eliminated could be about 0.55 barrels of quench liquid (at about 390° F.) per barrel of feed or about 16,500 BPD for a unit feeding 30,000 BPD. The volume of quench liquid injected into the reactor might only occupy about 10% of the space occupied by the volume of quench gas it replaced and should not reverse the improvement to liquid space velocity nor is it expected to detrimentally affect reaction rates by dilutions of reactive feed material. Instead, penetration of oil to the internal surface of catalyst pellets will be enhanced, and the lighter less viscous liquid will serve to aid in achieving process conditions that inhibit the potential of ebullating low density catalyst at the reactor top into random motion, thereby, minimizing catalyst attrition rates.

Those skilled in the art will recognize the potential overall economical advantage in capital cost for equipment that could be realized by reducing the overall volume of gas that must be managed by the hydroprocessing system as well as the overall reduction of recycle compressor operating cost. Those skilled in the art will also recognize that when gas holdup (a function of gas flow rate, density, etc.) in an upflow liquid filled reactor is reduced, liquid space velocity is reduced. The increased residence time of the oil allows more work to be performed by the process at any given temperature.

EXAMPLES

The following examples are exemplary examples of process runs, conducted in accordance with various method steps of the present invention and employing the apparatus in accordance with various preferred embodiments of the present invention. The following set-forth examples are given by way of illustration only and not by any limitation, and set-forth a best mode of the invention as presently contemplated. All parameters such as concentrations, flow rates, mixing proportions, temperatures, pressure, rates, compounds, etc., submitted in these examples are not to be construed to unduly limit the scope of the invention.

EXAMPLE I

In a semi-commercial scale residuum conversion pilot plant operating at 100-200 BPD, the catalyst transfer procedure, as described above, was demonstrated more than 50 times. During each transfer, about 2 cubic feet of catalyst was moved into and out of the reactor vessel running continuously at typical residual desulfurization (RDS) conditions. Transfer rates up to 16 cubic feet per hour of catalyst were accomplished through pipes with an inside diameter 8 times larger than the catalyst diameter. Plug flow movement of the catalyst and the absence of bed ebullation were proven using radioactively tagged catalyst particles incorporated in the test bed.

Among the significant features of the invention specifically demonstrated in such runs were that: (1) ball valves, such as those made by the Kaymr and Mogas companies, can be used to isolate the RDS reactor from the catalyst transfer vessels, and to transfer catalyst particles without using solids handling valves, (2) the catalyst bed level and thus ebullation can be adequately monitored using a gamma-ray source and detector, (3) J-tubes (all with upward flow sections substantially shorter than the downward flow paths) will satisfactorily transfer catalyst particles, without local ebullation, by laminar fluid flow, (4) use of fluid feed inlet distributor means with a conical support and concentric annular segment plates prevents ebullation at the base of the catalyst bed and provides adequate radial distribution of gas and liquid, by forming concentric alternate rings of gas and liquid (5) substantial differences were shown where bed ebullation (expansion) occurred with one catalyst as compared to no significant bed ebullation (expansion) with another catalyst using the same size and shape but with a lower density, and (6) transfer of catalyst into, and out of, a bed travelling downwardly by gravity in a reactor vessel while continuously operating a hydroprocessing system to react a gas containing hydrogen and a feed stream of hydrocarbon liquids flowing as a single stream from the bottom of the bed, will permit countercurrent flow without separation during upward passage through and out of the top of the reactor vessel, and (7) as the result of intermittent catalyst discharge, the catalyst bed moves countercurrently down through the reactor in plug-like flow.

EXAMPLE II

From the foregoing tests in an apparatus under flow conditions described in Example I, the effectiveness of the foregoing mechanical and hydraulic factors were validated for performing hydrotreating processing with hydrocarbon and hydrogen streams counterflowing through a moving bed of catalyst particles, as follows:

In a pilot plant operating at up to 4 BPD hydrocarbon feed and hydrogen at 2200 PSI, catalyst bed expansion measurements were made at commercial-scale flow velocities with beds of catalysts of different sizes, shapes, and densities as indicated in Table I. Each type of catalyst was tested separately. Bed ebullation (expansion) was measured using a gamma-ray source and detector means mounted to detect 10% bed expansion. Table I shows flow velocities required to produce 10% bed expansion with several catalysts at a standard hydrogen recirculation rate of 5000 SCFB. These results confirmed the bed expansion results from the semi-commercial scale plant of Example I.

Table II is a similar set of runs using beds of three of the same catalyst particles as those tested under conditions shown in Table I except that the liquid viscosity, liquid density and pressure of the hydrocarbon feed stream and gas were lower in Table II than Table I to match a different set of commercial operating conditions. From Tables I and II the effect of catalyst particle size, density and shape are clearly indicated for different flow conditions for the liquid and gas components of the feed. The design feed rates for a hydrocarbon treating process were calculated by standard scaling procedures to indicate the values in MBPD (thousands of barrels per day) through a reactor vessel containing a catalyst bed 11.5 feet in diameter.

In general catalyst for commercial use would be selected on the basis of levitation or ebullation at a selected rate which is substantially higher than normal design feed rate, say up to 100% greater. Additionally, these tests indicate that some commercial catalysts will not lift at reasonable design feed rates if the particles have a high degree of uniformity and are sufficiently strong to maintain their integrity during movement into and out of the reactor vessel, without attrition or breakage.

TABLE I

CATALYST BED EXPANSION STUDY TEST RESULTS
2200 PSI Hydrogen and Flush oil
Liquid Density 51 lb/ft$^3$ Viscosity 1.1 cp
Gas Density 0.49 lb/ft$^3$ Viscosity 0.016 cp

| | | | | | Flow rates for 10% Bed Expansion @ 5000 SCFB H$_2$ | | | |
|---|---|---|---|---|---|---|---|---|
| Catalyst | Relative Size | Shape | Skeletal Density | Particle Density | Effective Density In Oil (1) | Liquid Velocity Ft/Min | Gas Velocity Ft/Sec | MBPD in 11.5 Ft. ID Reactor |
| A | 1 | Cylinder | 2.69 | 1.05 | 0.55 | 0.46 | 0.11 | 13 |
| B | 1.6 | Quadralobe | 3.55 | 1.03 | 0.56 | 0.60 | 0.14 | 17 |
| C | 2 | Cylinder | 3.61 | 1.60 | 1.05 | 0.46 | 0.11 | 13 |
| D | 3.2 | Sphere | 2.33 | 0.60 | 0.21 | 0.32 | 0.07 | 9 |
| E | 3.2 | Sphere | 3.63 | 0.83 | 0.47 | 1.38 | 0.33 | 40 |
| F | 3.2 | Cylinder | 3.58 | 1.37 | 0.89 | 1.38 | 0.33 | 40 |

(1) Effective Density in Oil = Density of the Particle in Oil with Buoyancy Forces Includes = (Skeletal Density) (vol % Skeleton) + (Oil Density) (vol % Pores) − Oil Density

TABLE II

CATALYST BED EXPANSION STUDY TEST RESULTS
With Hydrogen and Hydrocarbon at 1000 PSI
Liquid Density 48 lb/ft 3 Viscosity 0.56 cp
Gas Density 0.23 lb/ft 3 Viscosity 0.013. cp

| | | | | | | Flow rates for 10% Bed Expansion @ 5000 SCFB $H_2$ | | |
|---|---|---|---|---|---|---|---|---|
| Catalyst | Relative Size | Shape | Skeletal Density | Particle Density | Effective Density In Oil (1) | Liquid Velocity Ft/Min | Gas Velocity Ft/Sec | MBPD in 11.5 Ft. ID Reactor |
| C | 2 | Cylinder | 3.61 | 1.60 | | 0.53 | 0.13 | 15 |
| E | 3.2 | Sphere | 3.63 | 0.83 | | 1.38 | 0.33 | 40 |
| F | 3.2 | Cylinder | 3.58 | 1.37 | | 1.50 | 0.50 | 60 |

EXAMPLE III

In a 4 foot diameter vessel a "cold model" was operated using up to 8000 BPD water and 275 SCFM air. The features of the inlet liquid and gas distributor as well as the hydrogen gas redistribution and quench stages, described above and shown in the drawings were scaled and tested. Flow measurements and underwater photography proved that distribution of the inlet gas and liquid was uniform across the full cross-sectional area of the catalyst support screen in the vessel. Redistribution of the rising gas through the inverted V-shaped sheds was shown to be surprisingly effective even when gas was intentionally maldistributed below the redistributor stages.

SUMMARY OF TEST RESULTS FOR EXAMPLES I, II AND III

Briefly, these test results show that the present invention makes possible substantially continuous flow of uniformly distributed hydrogen and hydrocarbon liquid across a densely packed catalyst bed to fill substantially the entire volume of a reactor vessel by introducing the fluids as alternate annular rings of gas and liquid at a rate insufficient to levitate the bed and with the catalyst selected with a density, shape and size adequate to prevent lifting of the bed at the desired feed rates. (Catalysts are selected by measuring bed expansion in a large pilot plant run with hydrocarbon, hydrogen, and catalyst at the design pressures and flow velocities). At the desired flow rate, such catalyst continually flows in a plug-like manner downwardly through the vessel by introducing fresh catalyst at the top of the bed by laminarly flowing such catalyst in a liquid stream on a periodic or semicontinuous basis. Catalyst is removed by laminarly flowing catalyst particles in a liquid stream out of the bottom of the bed. Intake for such flow is out of direct contact with the stream of gas flowing through the bed and the flow path is substantially constant in cross-sectional area and greater in diameter by several times than the diameter of the catalyst particles.

EXAMPLE IV

A plurality of catalytic particulates were charged into a reaction zone contained within a reactor, such as reactor vessel 11. The plurality of catalytic particulates formed a catalyst bed (such as catalyst bed 10 in FIGS. 1, 8 and 9). The catalyst bed was supported in the reactor by a truncated conical bed support similar to the support that is generally illustrated as 17 in FIGS. 8, 9 and 11–13. An inlet distributor, such as circular plate member 31 in FIGS. 1 and 11 with the multiplicity of tubes 32, extended across a full cross-sectional area of the reactor underneath the truncated conical bed support to form a plenum or inlet chamber between the inlet distributor and the truncated conical bed support, as generally illustrated in FIGS. 8, 9 and 11–13. The truncated conical bed support for the catalyst bed included a series of annular polygons that included a plurality of segmented plates (such as segmented plates 27 in FIGS. 2 and 3) connected to or formed with radial spoke members such as members 26 FIGS. 10–13. The plurality of segmented plates, each having a thickness of about 10 inches and a width of about 1.5 inch, were secured to 8 radial spoke members. The interengaged segmented plates and radial spoke members formed a web-like structure to produce essentially annularly continuous mixture zones for receiving a flow of hydrocarbon feed stream, and were overlayed with a screen having screen openings with a mean diameter that was smaller than the catalytic particulates. Each mixture zone underneath the screen had a generally circumferentially uniform thickness.

The catalytic particulates were packed in the reactor vessel with at least one bed of catalyst particles having substantially the same size, shape and density over the axial length of the reactor vessel. The catalyst particles were selected in accordance with the average optimum velocity of the hydrocarbon feed stream (including any gas components) that flowed through the catalyst bed. Plug-like flow of the substantially packed bed of catalyst was to be achieved by selecting the average density, size, and shape of the catalyst particles forming the catalyst bed such that the catalyst bed was to expand by less than 10% by axial or longitudinal length at the maximum anticipated fluid flow velocities of the gaseous and liquid components that were to flow therethrough. The size, shape, and density of fresh catalyst particles supplied to the catalyst bed were not only substantially the same size, shape, and density, and but were also selected in accordance with the designed maximum rate of flow of the feed streams, all to prevent ebullation.

The liquid component of the hydrocarbon feed stream was a heavy atmospheric residuum wherein at least 95% by volume of which boiled above about 343° C. and wherein a substantial fraction (e.g. 50% by volume) boiled above about 510° C. The "heavy" hydrocarbon feed had an undesirable metal content of about 90 ppm by weight of the "heavy" hydrocarbon feed. The hydrogen-containing gas of the hydrocarbon feed stream was essentially 97% pure hydrogen and was mixed with the heavy atmospheric residuum stream in a mixing ratio of 623 liters of hydrogen-containing gas at standard conditions per liter of heavy atmospheric residuum in order to form the hydrocarbon feed stream.

The hydrocarbon feed stream was passed through the inlet distributor and introduced into the plenum chamber of reactor at a flow rate ranging from about 0.1 ft/sec. to about 1.00 ft/sec. The hydroprocessing pressure and temperature within the reactor were about 2300 psig. and about 400° C. respectively. From the plenum chamber of the reactor the hydrocarbon feed stream entered into the annular continuous mixture zones and was uniformly fed through the screen and into the catalyst bed such as not to induce local ebullation or eddy currents in the catalyst bed, especially in proximity to the conical bed support which was overlayed with the screen.

The catalyst bed in the reactor contained a plurality of axially spaced apart hydrogen gas redistribution (or hydrogen gas-quenching) assemblies (see FIGS. 5 and 7 as illustrative of the hydrogen gas-quenching assemblies). As the hydrocarbon feed stream flowed upwardly through the catalyst bed, hydrogen gas was emitted from the hydrogen gas redistribution assemblies, which redistributed any hydrogen-containing gas that had become channeled in a portion of the catalyst bed below (or in close proximity to) the hydrogen gas redistribution assemblies and further avoided generation of local hot spots, eddy currents or ebullation in the upper part (especially above the hydrogen gas redistribution assemblies) of the catalyst bed.

The liquid hydrocarbon feed stream exited the reactor at a withdrawal flow rate of about 3.6 ft/sec. and had been upgraded such that it contained a metal content of about 3 ppm by wt. of the liquid hydrocarbon feed stream. As the hydrocarbon feed stream flowed upwardly through the catalyst bed, a gamma ray source in the catalyst bed in combination with a gamma ray detector on the reactor (see for example gamma ray source 22 in the catalyst bed 10 competing with the gamma ray detector 24 on the reactor vessel 10 in FIG. 1) detected that the catalyst bed expanded less than 10% by length over or beyond substantially the full axial length of the catalyst bed in a packed bed state.

After the reactor was on stream for about 1 weeks, approximately 7.25 cubic meters (or about 3.3% by weight of the catalyst bed) of catalytic particulates were laminarly withdrawn in the hydrocarbon feed stream through a J-tube (such as J-tube 29 in FIG. 1) at a flow rate of about 3.6 ft/sec. The withdrawn catalyst in the hydrocarbon feed stream had a concentration of about 0.5 lbs. catalyst/lb. catalyst slurry (i.e. weight of withdrawn catalyst plus weight of hydrocarbon feed stream). When and/or as the volume of catalytic particulates were withdrawn or transferred from the bottom of the catalyst bed, the catalyst bed (i.e. a substantially packed bed of catalyst) began to plug-flow.

The withdrawn catalyst was replaced by introducing a comparable volume of fresh replacement catalyst through the top of the reactor. The fresh replacement catalyst was slurried in a hydrocarbon refined stream (e.g. gas oil) and was introduced into the reactor at a flow catalyst replacement rate of about 3.6 ft/sec., and at a catalyst replacement concentration of about 0.5 lbs. replacement catalyst/lb. catalyst slurry (i.e. weight of replacement catalyst plus the hydrocarbon refined stream (e.g. gas oil) as the slurrying medium).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A method for hydroprocessing a hydrocarbon feed stream that is upflowing through a hydroconversion reaction zone having a substantially packed bed of catalyst comprising the steps of:

(a) forming a plurality of annular mixture zones under the hydroconversion reaction zone having a substantially packed bed of hydroprocessing catalyst such that each of said annular mixture zones contains a hydrocarbon feed stream having a liquid component and a hydrogen containing gas component and wherein said annular mixture zones are concentric with respect to each other and are coaxial with respect to said hydroconversion reaction zone;

(b) introducing said hydrocarbon feed stream from each of said annular mixture zones of step (a) into said substantially packed bed of hydroprocessing catalyst to commence upflowing of said hydrocarbon feed stream from each of said annular mixture zones through said substantially packed bed of the catalyst;

(c) injecting a quenching matter into said substantially packed bed of hydroprocessing catalyst;

(d) withdrawing a volume of particulate catalyst from said hydroconversion reaction zone to commence essentially plug-flowing downwardly said substantially packed bed of hydroprocessing catalyst within said hydroconversion reaction zone; and (e) adding a volume of catalyst to the hydroconversion reaction zone of step (d) to replace the withdrawn volume of particulate catalyst of step (d).

2. A method for hydroprocessing a hydrocarbon feed stream that is upflowing through a hydroconversion reaction zone having a substantially packed bed of catalyst comprising the steps of:

(a) disposing catalyst in a reaction zone to form a substantially packed bed of catalyst, said catalyst comprising catalytic particulates having substantially the same size, shape, and density;

(b) upflowing through said catalytic particulates of step (a) a hydrocarbon feed stream for hydroprocessing the hydrocarbon feed stream while the bed of catalyst remains substantially packed; and (c) injecting a quenching matter into said catalytic particulates.

3. A method for producing an essentially downwardly plug-flowing substantially packed bed of hydroprocessing catalyst within a hydroconversion reaction zone comprising the steps of:

(a) forming a plurality of annular mixture zones under a hydroconversion reaction zone having a substantially packed bed of hydroprocessing catalyst such that each of said annular mixture zones contains a hydrocarbon feed stream having a liquid component and a hydrogen-containing gas component and wherein said annular mixture zones are concentric with respect to each other and are coaxial with respect to said hydroconversion reaction zone;

(b) introducing said hydrocarbon feed stream from each of said annular mixture zones of step (a) into said substantially packed bed of hydroprocessing catalyst to commence upflowing of said hydrocarbon feed stream from each of said annular mixture zones through said substantially packed bed of the catalyst;

(c) injecting a quenching matter into said substantially packed bed of hydroprocessing catalyst;

(d) withdrawing a volume of particulate catalyst from said hydroconversion reaction zone to produce an essentially downwardly plug-flowing substantially packed bed of hydroprocessing catalyst within said hydroconversion reaction zone.

4. A method for hydroprocessing a hydrocarbon feed stream that is upflowing through a hydroconversion reaction zone having a substantially packed bed of catalyst comprising the steps of:

(a) forming a plurality of annular mixture zones under a hydroconversion reaction zone having a substantially packed bed of hydroprocessing catalyst such that each of said annular mixture zones contains a hydrocarbon feed stream having a liquid component and a hydrogen-containing gas component and wherein said annular mixture zones are concentric with respect to each other and are coaxial with respect to said hydro-conversion reaction zone, and wherein said hydroprocessing catalyst comprises a plurality of catalytic particulates having substantially the same size, shape, and density;

(b) introducing said hydrocarbon feed stream from each of said annular mixture zones of step (a) into said substantially packed bed of hydroprocessing catalyst to commence upflowing of said hydrocarbon feed stream from each of said annular mixture zones through said substantially packed bed of the catalyst; and (c) injecting a quenching matter into said substantially packed bed of hydroprocessing catalyst.

5. The method of claim 1, wherein said quenching matter of step (c) is a liquid hydrocarbon quench.

6. The method of claim 2 wherein said quenching matter of step (c) is a liquid hydrocarbon quench.

7. The method of claim 3 wherein said quenching matter of step (c) is a liquid hydrocarbon quench.

8. The method of claim 4 wherein said quenching matter of step (c) is a liquid hydrocarbon quench.

9. A method for reducing the gas velocity of a hydrogen-containing gas component contained within a hydrocarbon feed stream having a liquid component and upflowing through a hydroconversion reaction zone including a substantially packed bed of hydroprocessing catalyst, while simultaneously increasing the residence time and reducing the liquid velocity of the liquid component within the substantially packed bed of catalyst, said method comprising the steps of:

(a) disposing a substantially packed bed of hydroprocessing catalyst in a hydroconversion reaction zone;

(b) introducing into said substantially packed bed of hydroprocessing catalyst of step (a) a hydrocarbon feed stream comprising a hydrogen-containing gas component and a liquid component having a liquid viscosity;

(c) upflowing said hydrocarbon feed stream of step (b) through said substantially packed bed of hydroprocessing catalyst such that said hydrogen-containing gas component has a gas velocity and said liquid component has a liquid velocity; and (d) injecting at least once into said substantially packed bed of hydroprocessing catalyst a liquid quench having a quench viscosity that is less than said liquid viscosity such that the gas velocity and the liquid velocity are reduced and a residence time of the liquid component within said substantially packed bed of hydroprocessing catalyst is increased.

10. A method for increasing penetration and contact of a liquid component of a hydrocarbon feed stream into and on the surface area of a plurality of catalytic particulates contained within a substantially packed bed of hydroprocessing catalyst having the hydrocarbon feed stream upflowing therethrough while simultaneously decreasing the viscosity of the liquid component, said method comprising the steps of:

(a) disposing in a hydroconversion reaction zone a substantially packed bed of hydroprocessing catalyst having a plurality of catalytic particulates that include a surface area;

(b) upflowing through said substantially packed bed of hydroprocessing catalyst a hydrocarbon feed stream having a liquid component with a liquid viscosity such that said liquid component penetrates into and contacts a first portion of the surface area; and (c) injecting at least once into said substantially packed bed of hydroprocessing catalyst a liquid quench having a quench viscosity that is less than said liquid viscosity such that a mixture of liquid quench and liquid component is formed having a mixture viscosity less than said liquid viscosity and said liquid component within said mixture penetrates into and contacts a second portion of said surface area wherein said second portion includes said first portion and an additional portion of surface area beyond said first portion.

* * * * *